US009986204B2

(12) United States Patent
Nagase et al.

(10) Patent No.: US 9,986,204 B2
(45) Date of Patent: May 29, 2018

(54) TRANSMISSION TERMINAL, PROGRAM, IMAGE DISPLAY METHOD AND TRANSMISSION SYSTEM

(71) Applicants: Tatsuya Nagase, Kanagawa (JP); Yoshinaga Kato, Kanagawa (JP)

(72) Inventors: Tatsuya Nagase, Kanagawa (JP); Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days. days.

(21) Appl. No.: 14/897,544

(22) PCT Filed: Jun. 18, 2014

(86) PCT No.: PCT/JP2014/066749
§ 371 (c)(1),
(2) Date: Dec. 10, 2015

(87) PCT Pub. No.: WO2014/208569
PCT Pub. Date: Dec. 31, 2014

(65) Prior Publication Data

US 2016/0127686 A1 May 5, 2016

(30) Foreign Application Priority Data

Jun. 28, 2013 (JP) ................................ 2013-136213
Apr. 4, 2014 (JP) ................................ 2014-078007

(51) Int. Cl.
*H04N 7/14* (2006.01)
*H04N 7/15* (2006.01)
(Continued)

(52) U.S. Cl.
CPC ............ *H04N 7/15* (2013.01); *G06F 3/1454* (2013.01); *H04L 12/1827* (2013.01);
(Continued)

(58) Field of Classification Search
CPC combination set(s) only.
See application file for complete search history.

(56) References Cited

U.S. PATENT DOCUMENTS 6,584,493 B1 * 6/2003 Butler ..................... G06F 3/038 709/204
8,558,864 B1 * 10/2013 Koller ...................... H04N 7/14 348/14.01
(Continued)

FOREIGN PATENT DOCUMENTS

JP H02-067889 3/1990
JP H09-238318 9/1997
(Continued)

OTHER PUBLICATIONS

Extended European Search Report dated Apr. 5, 2016 in Patent Application No. 14818431.0.
(Continued)

*Primary Examiner* — Duc Nguyen
*Assistant Examiner* — Assad Mohammed
(74) *Attorney, Agent, or Firm* — Oblon, McClelland, Maier & Neustadt, L.L.P.

(57) ABSTRACT

A transmission terminal connected in communication with another transmission terminal via a network. The transmission terminal includes a reception part that externally receives data to be displayed for being displayed on a display part connected with the transmission terminal; a terminal information acquisition part that acquires terminal information of the other transmission terminal which transmits the data to be displayed, received by the reception part, from an information storage area previously associated with the transmission terminal; and an image display control part that displays the data to be displayed, received by the reception part, and the terminal information acquired by the terminal information acquisition part in a manner of asso-
(Continued)

ciating them with one another on the display part in a manner depending on a type of the data to be displayed, received by the reception part.

4 Claims, 38 Drawing Sheets

(51) Int. Cl.

| | |
|---|---|
| ***H04L 29/06*** | (2006.01) |
| ***H04L 12/18*** | (2006.01) |
| ***G06F 3/14*** | (2006.01) |
| *G09G 5/00* | (2006.01) |
| *G09G 5/14* | (2006.01) |

(52) U.S. Cl.

CPC ........... *H04L 65/403* (2013.01); *H04N 7/147* (2013.01); *G09G 5/00* (2013.01); *G09G 5/14* (2013.01); *G09G 2340/02* (2013.01); *G09G 2340/0407* (2013.01); *G09G 2340/0464* (2013.01); *G09G 2340/10* (2013.01); *G09G 2340/14* (2013.01); *G09G 2350/00* (2013.01)

(56) References Cited

U.S. PATENT DOCUMENTS

| | | | | |
|---|---|---|---|---|
| 2004/0033478 | A1* | 2/2004 | Knowles ................ | G07C 13/00 434/350 |
| 2008/0136898 | A1* | 6/2008 | Eisenberg .............. | H04N 7/152 348/14.09 |
| 2010/0226546 | A1* | 9/2010 | Tanaka .................... | G06T 11/00 382/118 |
| 2011/0271210 | A1* | 11/2011 | Jones .................. | H04L 12/1827 715/753 |
| 2013/0222526 | A1* | 8/2013 | Miyazawa ............. | H04N 7/155 348/14.08 |
| 2013/0242034 | A1 | 9/2013 | Kato et al. | |
| 2013/0314489 | A1 | 11/2013 | Sakai et al. | |
| 2014/0043431 | A1 | 2/2014 | Kato | |
| 2014/0118476 | A1 | 5/2014 | Nagase et al. | |
| 2014/0253676 | A1 | 9/2014 | Nagase et al. | |
| 2015/0222851 | A1 | 8/2015 | Sakai et al. | |

FOREIGN PATENT DOCUMENTS

| | | |
|---|---|---|
| JP | 9-271006 A | 10/1997 |
| JP | 2001-333400 | 11/2001 |
| JP | 2005-033828 | 2/2005 |
| JP | 2011-061314 | 3/2011 |
| JP | 2012-195926 | 10/2012 |
| JP | 2013-065125 | 4/2013 |
| JP | 2014-174847 | 9/2014 |
| JP | 2015-015698 | 1/2015 |
| WO | WO 2012/046432 A1 | 4/2012 |
| WO | WO 2012/118105 A1 | 9/2012 |
| WO | WO 2012/147535 A1 | 11/2012 |
| WO | 2014/196654 A1 | 12/2014 |

OTHER PUBLICATIONS

International Search Report dated Sep. 30, 2014 in PCT/JP2014/066749 filed on Jun. 18, 2014.

* cited by examiner

FIG.6

<CHANGING QUALITY MANAGEMENT TABLE>

| IP ADDRESS OF RELAY DESTINATION TERMINAL | IMAGE QUALITY (QUALITY OF IMAGE) OF RELAYED IMAGE DATA |
|---|---|
| 1.3.2.4 | HIGH IMAGE QUALITY |
| 1.3.1.3 | LOW IMAGE QUALITY |
| 1.3.4.3 | MEDIUM IMAGE QUALITY |
| ... | ... |

FIG.7

<RELAY APPARATUS MANAGEMENT TABLE>

| RELAY APPARATUS ID | OPERATIONAL STATE | RECEIVED DATE AND TIME | IP ADDRESS OF RELAY APPARATUS | HIGHEST DATA TRANSMISSION RATE (Mbps) |
|---|---|---|---|---|
| 111a | ONLINE | 2009.11.10.13:00 | 1.2.1.2 | 100 |
| 111b | ONLINE | 2009.11.10.13:10 | 1.2.2.2 | 1000 |
| 111c | OFFLINE | 2009.11.10.13:20 | 1.3.1.2 | 100 |
| 111d | ONLINE | 2009.11.10.13:30 | 1.3.2.2 | 10 |

FIG.8

<TERMINAL AUTHENTICATION MANAGEMENT TABLE>

| TERMINAL ID | PASSWORD |
|---|---|
| 01aa | aaaa |
| 01ab | abab |
| 01ba | baba |
| ... | ... |

FIG.9

<TERMINAL MANAGEMENT TABLE>

| TERMINAL ID | OPERATIONAL STATE | RECEIVED DATE AND TIME | IP ADDRESS OF TERMINAL |
|---|---|---|---|
| 01aa | ONLINE | 2009.11.10.13:40 | 1.2.1.3 |
| 01ab | OFFLINE | 2009.11.09.12:00 | 1.2.1.4 |
| 01ba | ONLINE | 2009.11.10.13:45 | 1.2.2.3 |
| ... | ... | ... | ... |
| 01db | ONLINE | 2009.11.10.13:50 | 1.3.2.4 |

FIG.10

<DESTINATION LIST MANAGEMENT TABLE>

| REQUEST SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.11

<SESSION MANAGEMENT TABLE>

| SELECTION SESSION ID | RELAY APPARATUS ID | REQUEST SOURCE TERMINAL ID | DESTINATION TERMINAL ID | DELAY TIME (ms) | DELAY INFORMATION RECEIVED DATE AND TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.12

<QUALITY MANAGEMENT TABLE>

| DELAY TIME (ms) | IMAGE QUALITY (QUALITY OF IMAGE) OF IMAGE DATA |
|---|---|
| BETWEEN 0 AND 100 | HIGH IMAGE QUALITY |
| BETWEEN 100 AND 300 | MEDIUM IMAGE QUALITY |
| BETWEEN 300 AND 500 | LOW IMAGE QUALITY |
| 500 AND MORE | (INTERRUPT) |

FIG.13A

| TRANSMISSION SOURCE TERMINAL ID 08aa | |
|---|---|
| TERMINAL ID | BASE NAME |
| 01aa | GINZA |
| 01ab | OOMORI |
| 01ba | EBINA |
| 01db | SHINYOKOHAMA |
| .... | TOOHOKU |
| .... | TOTTORI |
| .... | TAIWAN |

FIG.13B

| TRANSMISSION SOURCE TERMINAL ID 09aa | |
|---|---|
| TERMINAL ID | BASE NAME |
| 01aa | GINZA HEAD OFFICE |
| 02aa | ABC |
| 03aa | DEF |
| 04aa | HIJ |

FIG.14

| AREA | TRANSMISSION DATA ID | TERMINAL ID | BASE NAME |
|---|---|---|---|
| AREA 1 | IMAGE DATA 1 | 01aa | GINZA |
| AREA 2 | IMAGE DATA 2 | 01ab | OOMORI |
| AREA 3 | IMAGE DATA 3 | 01ba | EBINA |
| AREA 4 | DISPLAY DATA 4 | 01db | SHINYOKOHAMA |

FIG.15

| TERMINAL ID | TRANSMISSION DATA ID |
|---|---|
| 01aa | IMAGE DATA 1 |
| 01ab | IMAGE DATA 2 |
| 01ba | IMAGE DATA 3 |
| 01db | DISPLAY DATA 4 |

FIG.22A
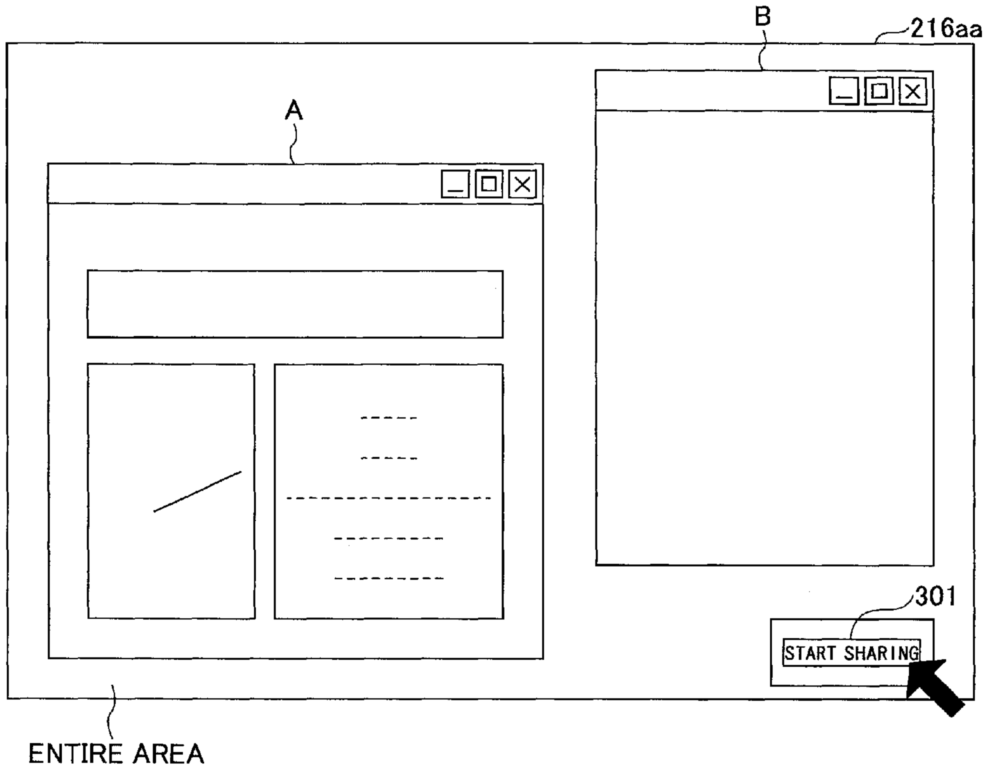
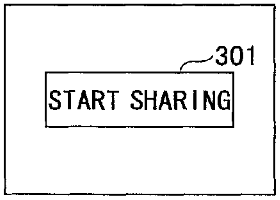
FIG.22B
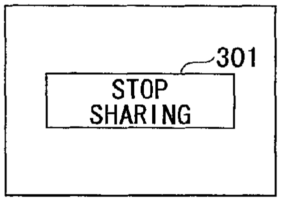
FIG.22C

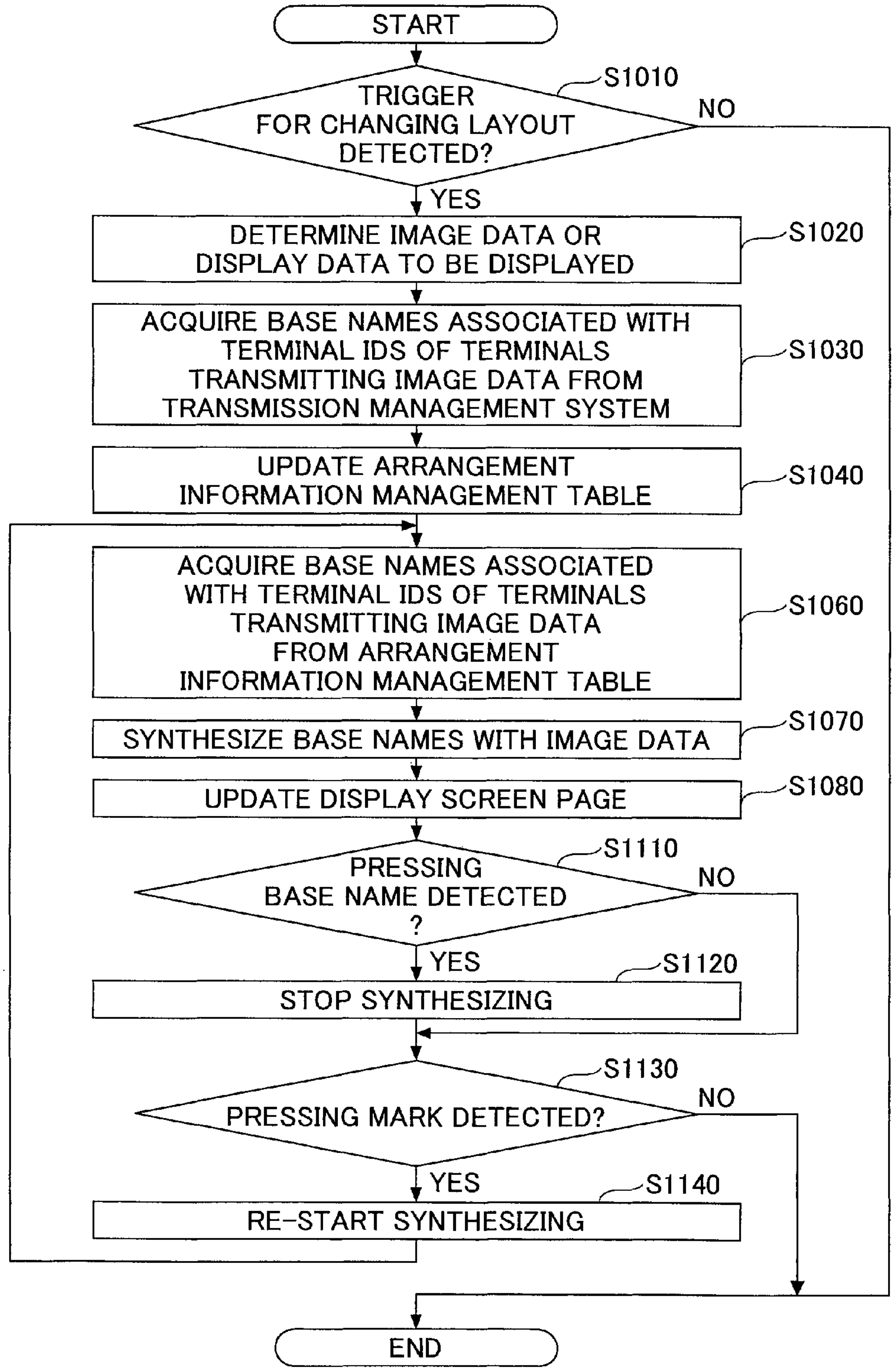
START
TRIGGER FOR CHANGING LAYOUT DETECTED?
S1010
NO
YES
DETERMINE IMAGE DATA OR DISPLAY DATA TO BE DISPLAYED
S1020
ACQUIRE BASE NAMES ASSOCIATED WITH TERMINAL IDS OF TERMINALS TRANSMITTING IMAGE DATA FROM TRANSMISSION MANAGEMENT SYSTEM
S1030
UPDATE ARRANGEMENT INFORMATION MANAGEMENT TABLE
S1040
ACQUIRE BASE NAMES ASSOCIATED WITH TERMINAL IDS OF TERMINALS TRANSMITTING IMAGE DATA FROM ARRANGEMENT INFORMATION MANAGEMENT TABLE
S1060
SYNTHESIZE BASE NAMES WITH IMAGE DATA
S1070
UPDATE DISPLAY SCREEN PAGE
S1080
PRESSING BASE NAME DETECTED ?
S1110
NO
YES
STOP SYNTHESIZING
S1120
PRESSING MARK DETECTED?
S1130
NO
YES
RE-START SYNTHESIZING
S1140
END

TRANSMISSION TERMINAL, PROGRAM, IMAGE DISPLAY METHOD AND TRANSMISSION SYSTEM

TECHNICAL FIELD

The present invention relates to a transmission terminal connected in communication with another transmission terminal via a communication network, and so forth.

BACKGROUND ART

Transmission systems have been widespread for video conferences between remote places via networks such as the Internet. In such a transmission system, image data and sound data are transmitted and received among a plurality of transmission terminals and a video conference can be implemented. Further, due to recent improvements of broadband environments, transmission and reception of image data having high image quality and sound data having high sound quality can be implemented. Thereby, it is easier to understand a state of another participant of a video conference and it is possible to improve fulfillment of communication using conversation.

On a display device of a transmission terminal, image data obtained from taking an image of another participant of a conference is displayed. However, it is not so easy for a user of the transmission terminal to determine from which participant among those of the conference the displayed image data is transmitted. Therefore, the name of the transmission terminal of the transmission source or the like is added to displayed image data (for example, see Patent Reference No. 1). Patent Reference No. 1 discloses a video conference system in which, when images transferred from a plurality of video conference terminals are displayed in a form of a multiple image, corresponding information of the video conference terminals are displayed at parts of image areas.

However, in the video conference system according to Patent Reference No. 1, the name of each video conference terminal overlaps with the image and the image may be difficult to see on a display device.

SUMMARY OF INVENTION

According to one aspect of the present invention, a transmission terminal connected in communication with another transmission terminal via a network includes a reception part that externally receives data to be displayed ("image data" or "display data", described later) for being displayed on a display part connected with the transmission terminal; a terminal information acquisition part that acquires terminal information of the other transmission terminal which transmits the data to be displayed, received by the reception part, from an information storage area previously associated with the other transmission terminal; and an image display control part that displays the data to be displayed, received by the reception part, and the terminal information acquired by the terminal information acquisition part in a manner of associating them with one another on the display part in a manner depending on a type of the data to be displayed, received by the reception part.

Other objects, features and advantages of the present invention will become more apparent from the following detailed description when read in conjunction with the accompanying drawings.

BRIEF DESCRIPTION OF DRAWINGS

FIG. 6 shows one example of a changing quality management table;

FIG. 7 shows one example of a relay apparatus management table;

FIG. 8 shows one example of a terminal authentication management table;

FIG. 9 shows one example of a terminal management table;

FIG. 10 shows one example of a destination list management table;

FIG. 11 shows one example of a session management table;

FIG. 12 shows one example of a quality management table;

FIGS. 13A and 13B show examples of a base name management table;

FIG. 14 shows one example of an arrangement information management table;

FIG. 15 shows one example of a conference image management table;

FIGS. 22A, 22B and 22C show one example of a desktop screen page displayed by the external input apparatus and so forth;

FIG. 37 is one example of a flowchart showing a procedure of displaying a display screen page by the image display control part;

DESCRIPTION OF EMBODIMENTS

The embodiments of the present invention will now be described using the figures. However, the scope of the present invention is not limited to the embodiments.

Note that an object of the embodiments of the present invention is to provide a transmission terminal in which it is possible to avoid information displayed interfering with a user's ability to see an image displayed by the transmission terminal.

Figure 1:
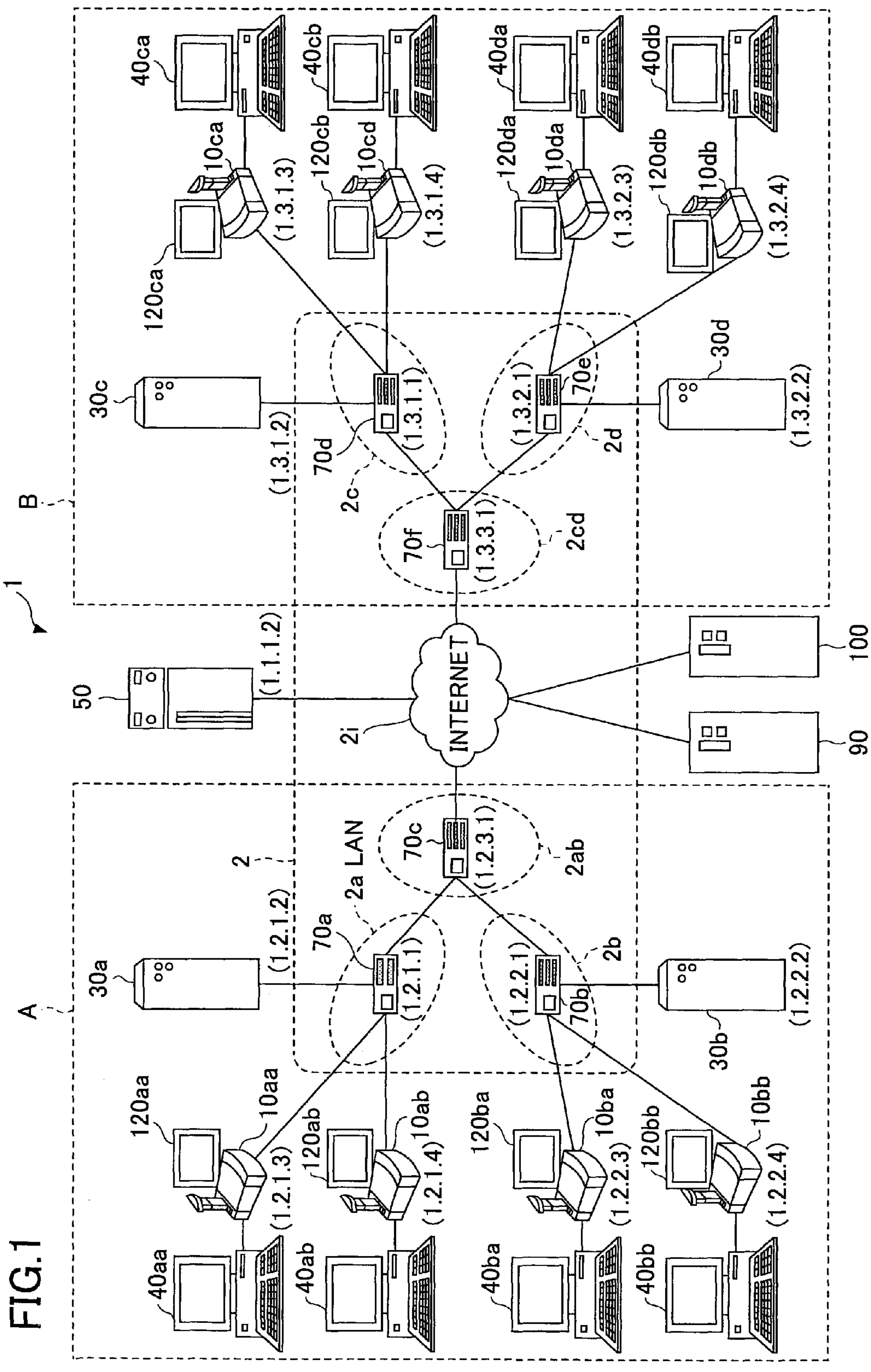
FIG. 1 generally illustrates the entirety of a transmission system according to one embodiment of the present invention.

FIG. 1 generally illustrates the entirety of a transmission system according to one embodiment of the present invention. Below, using FIG. 1, the embodiment will be described.

Generally speaking, a transmission system can be a data provisioning system in which content data is unilaterally transmitted from one transmission terminal to another transition terminal via a transmission management system and also can be a communication system in which, via a transmission management system, information, feelings and/or the like is/are transmitted among a plurality of transmission terminals. This communication system is a system for mutually transmitting information, feelings and/or the like among a plurality of communication terminals via a communication management system (corresponding to a "transmission management system"). The communication system can be, for example, a television or video conference system, a television telephone system, a voice conference system, a voice telephone system, a personal computer (PC) screen sharing system or the like.

Concerning the present embodiment, a transmission system, a transmission management system and a transmission terminal will now be described assuming that a television or video conference system is one example of a communication system, a television or video conference management system is one example of a communication management system and a television or video conference terminal is one example of a communication terminal. In other words, a transmission terminal and a transmission management system according to the present embodiment can be applied, not only to a television or video conference system but also to a communication system or a transmission system.

A transmission system 1 according to the present embodiment includes a plurality of transmission terminals 10*aa*, 10*ab*, 10*ba*, 10*bb*, 10*ca*, 10*cb*, 10*da* and 10*db*; a plurality of display devices 120*aa*, 120*ab*, 120*ba*, 120*bb*, 120*ca*, 120*cb*, 120*da* and 120*db* for the respective transmission terminals, external input apparatuses 40*aa*, 40*ab*, 40*ba*, 40*bb*, 40*ca*, 40*cb*, 40*da* and 40*db* such as PCs connected with the respective transmission terminals; a plurality of relay apparatuses 30*a*, 30*b*, 30*c* and 30*d*, a transmission management system 50, a program provisioning system 90 and a maintenance system 100.

Note that, in the description below, unless otherwise stated, any transmission terminal(s) of the plurality of transmission terminals 10*aa*, . . . and 10*db* will be referred to as a "transmission terminal(s) 10". Similarly, any display device(s) of the plurality of display devices 120*aa*, . . . and 120*db* will be referred to as a "display device(s) 120". Similarly, any external input apparatus(es) of the plurality of external input apparatuses 40*aa*, . . . and 40*db* will be referred to as an "external input apparatus(es) 40". Similarly, any relay apparatus(es) of the plurality of relay apparatuses 30*a*, . . . and 30*d* will be referred to as a "relay apparatus(es) 30". Further, the "display device 120" means one example a display device of the transmission terminal 10. Note that, in FIG. 1, the transmission terminal 10 and the display device 120 are separate bodies. However, the transmission terminal 10 and the display device 120 can be a single body. In other words, the transmission terminal 10 can include the display device 120 inside. Further, in a case where the transmission terminal 10 and the display device 120 are a single body, the transmission terminal 10 can have a function of a projector, and thus, can have the equivalent function as the display device 120 by projecting a video image.

The transmission terminal 10 is configured to transmit and receive image data, sound data and so forth to and from another transmission terminal 10. According to the present embodiment, description will be made assuming that image data is data of a moving picture. However, image data handled in the embodiment can be data of not only a moving picture but also a still picture. Further, images (pictures) of image data handled in the embodiment can include a moving picture and a still picture at the same time.

The relay apparatus 30 is configured to relay image data and sound data among the respective transmission terminals 10. The transmission management system 50 unitarily manages the plurality of transmission terminals 10 and the plurality of relay apparatuses 30.

The external input apparatus 40 is connected with the transmission terminal 10 and is configured to transmit display data that indicates an image displayed on a display device (i.e., a display device 216, described later) of the external input apparatus 40 to the transmission terminal 10. At least one of display data and image data is one example of "data to be displayed".

Further, a plurality of routers 70*a*, 70*b*, 70*c*, 70*d*, 70*e* and 70*f* shown in FIG. 1 are used to select optimum paths for transmitting or receiving image data and sound data. Hereinafter, unless otherwise stated, any router(s) of the plurality of routers 70*a*, . . . and 70*f* will be referred to as a "router(s) 70". Further, the program provisioning system 90 includes a Hard Disk (HD) (not shown). The HD stores a program for a transmission terminal to be used for implementing various functions or various parts of the transmission terminal 10; a program for a relay apparatus to be used for implementing various functions or various parts of the relay apparatus 30; and a program for transmission management to be used for implementing various functions or various parts of the transmission management system 50. The program provisioning system 90 is configured to transmit the program for a transmission terminal, the program for a relay apparatus and the program for transmission management stored in the HD to the transmission terminal 10, the relay apparatus 30 and the transmission management system 50, respectively.

Further, the transmission terminals 10*aa* and 10*ab*, the relay apparatus 30*a* and the router 70*a* are connected in communication via a Local Area Network (LAN) 2*a*. The transmission terminal 10*ba* and the transmission terminal 10*bb*, the relay apparatus 30*b* and the router 70*b* are connected in communication via a LAN 2*b*. The LAN 2*a* and the LAN 2*b* are connected in communication via a dedicated line 2*ab* that includes a router 70*c*, and are built in a predetermined area A. For example, the area A is Japan, the LAN 2*a* is built in an office of Tokyo and the LAN 2*b* is built in an office of Osaka.

On the other hand, the transmission terminals 10*ca* and 10*cb*, the relay apparatus 30*c* and the router 70*d* are connected in communication via a LAN 2*c*. The transmission terminals 10*da* and 10*db*, the relay apparatus 30*d* and the router 70*e* are connected in communication via a LAN 2*d*. The LAN 2*c* and the LAN 2*d* are connected in communication via a dedicated line 2*cd* that includes a router 70*f*, and are built in a predetermined area B. For example, the area B is USA, the LAN 2*c* is built in an office of New York, and the LAN 2*d* is built in an office of Washington, D.C. The area A and the area B are connected in communication via the Internet 2*i* through the routers 70*c* and 70*f*, respectively.

Further, the transmission management system 50, the program provisioning system 90 and the maintenance system 100 are connected in communication with the transmission terminals 10 and the relay apparatuses 30 via the Internet 2*i*. The transmission management system 50, the program provisioning system 90 and the maintenance system 100 can be installed in the area A or the area B, or can be installed in another area(s).

According to the present embodiment, the LAN 2*a*, the LAN 2*b*, the dedicated line 2*ab*, the Internet 2*i*, the dedicated line 2*cd*, the LAN 2*c* and the LAN 2*d* are used to construct the communication network 2.

Further, in FIG. 1, four digits shown below (inside a parenthesis) each of the transmission terminals 10, the relay apparatuses 30, the transmission management system 50, the routers 70, the program provisioning system 90 and the maintenance system 100 simply denote an IP address according to a common Internet Protocol version 4 (IPv4). For example, the IP address of the transmission terminal 10*aa* is "1.2.1.3". It is also possible to use IPv6 instead of IPv4. However, for the sake of simplifying the description, the description will be made assuming to use IPv4.

<<Hardware Configuration of the Embodiment>>

Next, a hardware configuration of the present embodiment will be described.

Figure 2:
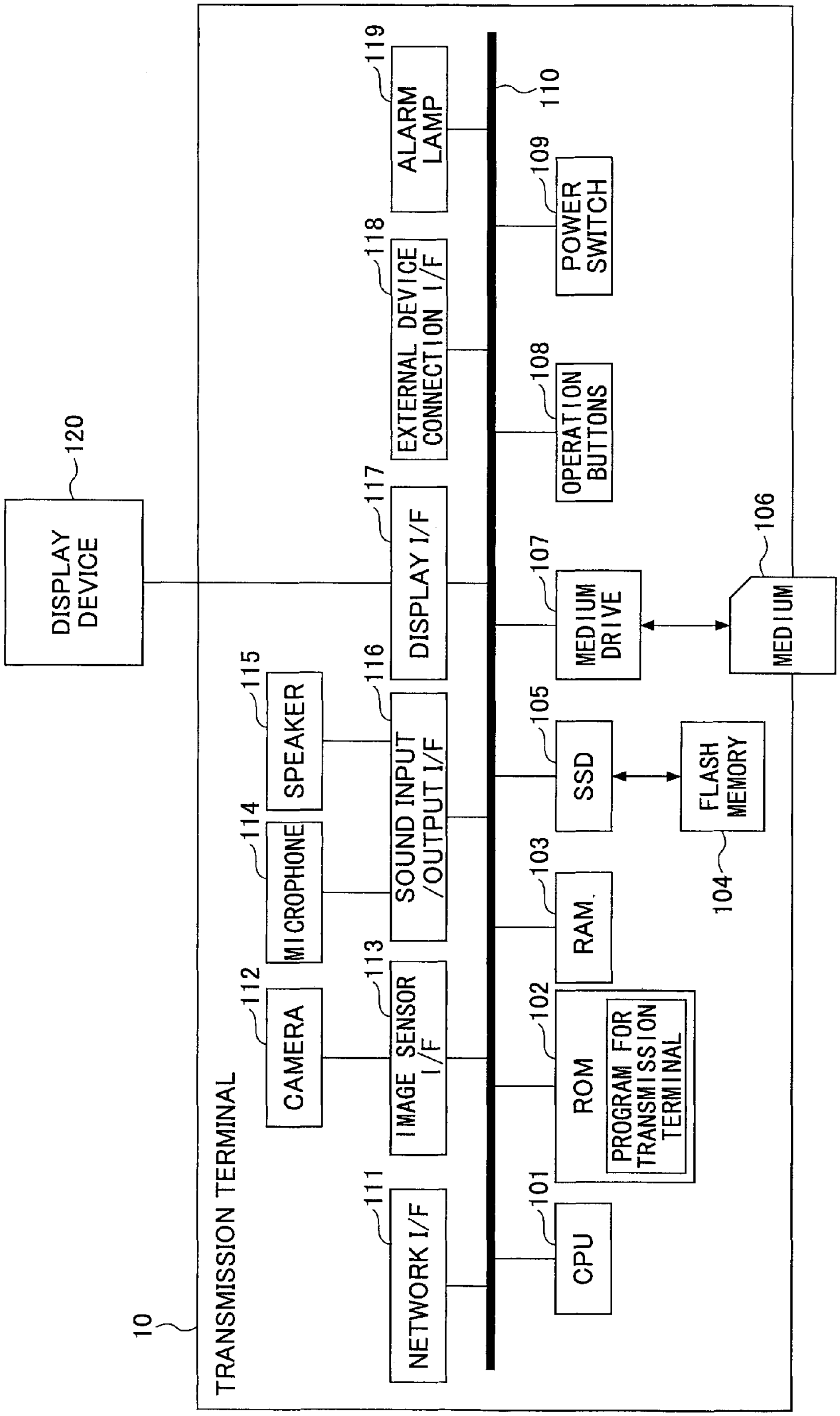
FIG. 2 is one example of a hardware configuration diagram of a transmission terminal included in the transmission system according to the present embodiment.

FIG. 2 is one example of a hardware configuration diagram of a transmission terminal 10 included in the transmission system 1 according to the present embodiment. As shown in FIG. 2, the transmission terminal 10 includes a Central Processing Unit (CPU) 101 that controls the entirety of the transmission terminal 10, a Read-Only Memory (ROM) 102 storing the program for a transmission terminal, a Random Access Memory (RAM) 103 used as a work area of the CPU 101, a flash memory 104 storing various data such as image data and sound data, a Solid State Drive (SSD) 105 that controls reading and writing the various data from and to the flash memory 104 under the control of the CPU 101, a medium drive 107 that controls reading and writing (storing) data from and to a recording medium 106 such as a flash memory, operation buttons 108 operated by a user to select a destination of the transmission terminal 10 or the like, a power switch 109 for turning on the transmission terminal 10, a network I/F 111 for transmitting data through the communication network 2 described later, a camera 112 that takes an image of a subject and acquires image data under the control of the CPU 101, an image sensor I/F 113 that controls driving of the camera 112, a microphone 114 for inputting sound, a speaker 115 for outputting sound, a sound input and output I/F 116 that processes inputting a sound signal from with the microphone 114 and outputting a sound signal to the speaker 115 under the control of the CPU 101, a display I/F 117 for transmitting image data to an external display device 120 under the control of the CPU 101, an external apparatus I/F 118 that transmits and receives various data to and from an external apparatus, an alarm lamp 119 for showing faults concerning various functions of the transmission terminal 10 and a bus line 110 such as an address bus, a data bus and so forth for mutually connecting the above-mentioned parts of the transmission terminal 10 electrically.

Note that the recording medium 106 is detachably mounted in the transmission terminal 10. Further, as long as it is a nonvolatile memory for reading and writing data under the control of the CPU 101, the flash memory 104 can be replaced by an Electrically Erasable and Programmable ROM (EEPROM) or the like. Further, the camera 112 includes a solid-state imaging device that converts light into electric charge and generates electronic data of a subject (video) image such as a Charge Coupled Device (CCD), a Complementary Metal Oxide Semiconductor (CMOS) device or the like. It is also possible to use a hard Disk Drive (HDD) instead of or in addition to the SSD 105.

Further, the display device 120 includes a liquid crystal device, an organic electroluminescence (EL) device or the like for displaying an image of a subject, an icon for operating and so forth.

Further, the program for a transmission terminal can be a file of an installable or executable type and can be circulated in a form of being recorded in a computer readable information recording medium such as the recording medium 106.

Note that the camera 112, the microphone 114 and the speaker 115 are not necessarily those of a built-in type, and can be those of an externally mounted type. Further, the transmission terminal 10 can be provided as a dedicated apparatus, or a PC, a smartphone, a tablet, a Personal Data Assistant (PDA) or the like.

Figure 3:
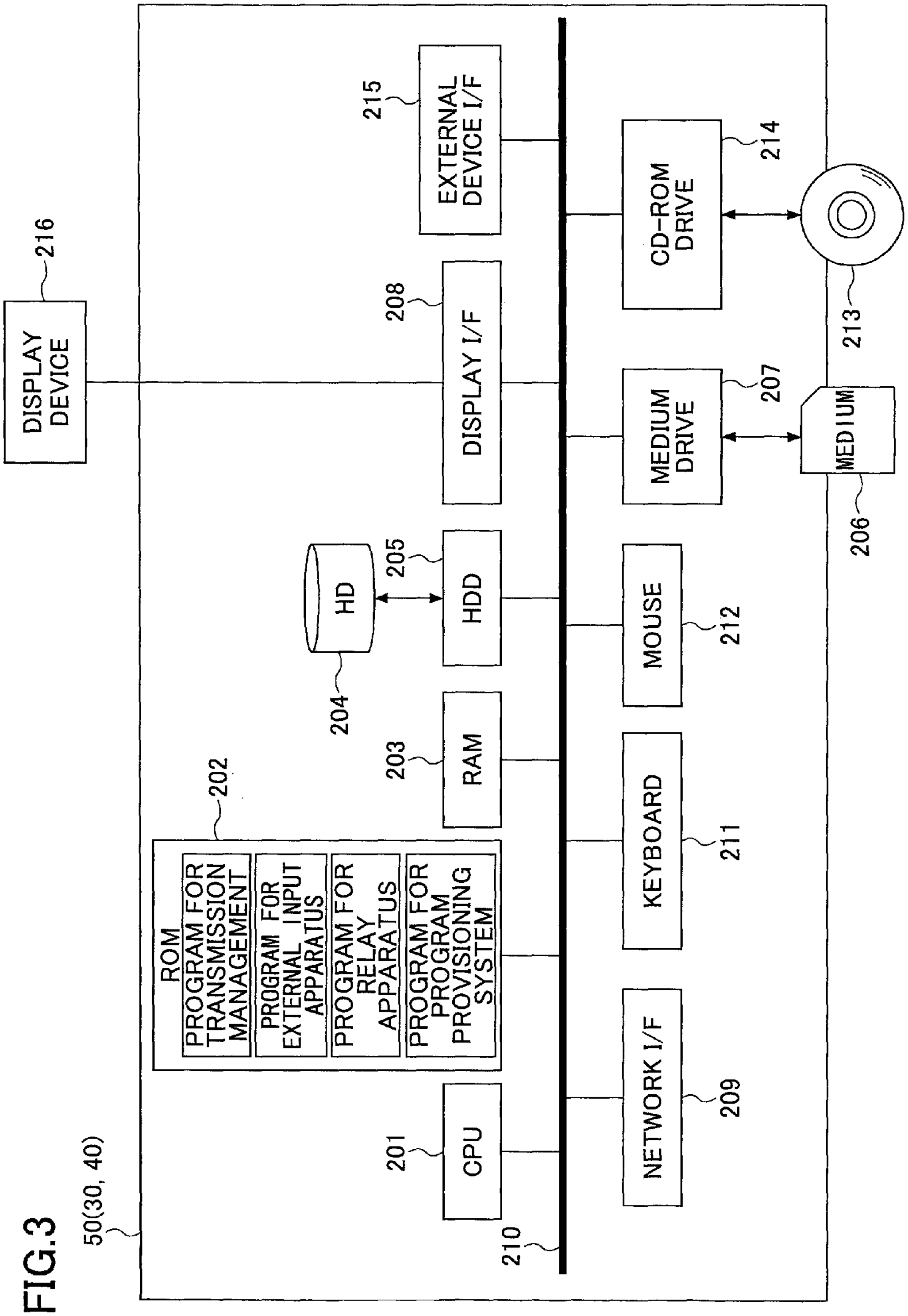
FIG. 3 is one example of a hardware configuration diagram of a transmission management system included in the transmission system according to the present embodiment.

FIG. 3 is one example of a hardware configuration diagram of the transmission management system 50 included in the transmission system 1 according to the present embodiment. The transmission management system 50 includes a CPU 201 controlling the entirety of the transmission management system 50, a ROM 202 storing the program for transmission management, a RAM 203 used as a work area of the CPU 201, a HD 204 storing various data, a HDD 205 controlling reading and writing various data from and to the HD 204 under the control of the CPU 201, a medium drive 207 controlling reading and writing (storing) data from and to a recording medium 206 such as a flash memory, a display I/F 208 for displaying various information such as a cursor, a menu, a window, characters/letters, images and so forth on the display device 216, a network I/F 209 for transmitting data using the communication network 2 described later, a keyboard 211 including a plurality of keys for inputting characters/letters, numerals, various instructions and so forth, a mouse 212 for selection or execution of various instructions, selection of a target to process, movement of the cursor, and so forth, a CD-ROM drive 214 controlling reading and writing data from and to a Compact Disc Read Only Memory (CD-ROM) 213 as one example of a detachable recording medium, an external apparatus I/F 215 for transmitting and receiving information to and from an external apparatus and a bus line such as an address bus, a data bus and so forth for mutually connecting the above-mentioned parts electrically.

Further, the program for transmission management can be one of an installable or executable type and can be circulated in a form of being recorded in a computer readable recording medium such as the recording medium 206 or the CD-ROM 213. The program for transmission management can be stored in the HD 204.

Further, the external input apparatus 40 has a hardware configuration the same as or similar to the transmission management system 50 described above using FIG. 3. Therefore, duplicate description will be omitted. However, in the ROM 202, a program for an external input apparatus for controlling the external input apparatus 40 is stored. Also in this case, the program for an external input apparatus can be one of an installable or executable type and can be circulated in a form of being recorded in a computer readable recording medium such as the recording medium 206 or the CD-ROM 213.

Further, the relay apparatus 30 has a hardware configuration the same as or similar to the transmission management system 50 described above using FIG. 3. Therefore, duplicate description will be omitted. However, in the ROM 202, the program for a relay apparatus for controlling the relay apparatus 30 is stored. Also in this case, the program for a relay apparatus can be one of an installable or executable type and can be circulated in a form of being recorded in a computer readable recording medium such as the recording medium 206 or the CD-ROM 213.

Further, the program provisioning system 90 has a hardware configuration the same as or similar to the transmission management system 50 described above using FIG. 3. Therefore, duplicate description will be omitted. However, in the ROM 202, a program for a program provisioning system for controlling the program provisioning system 90 is stored. Also in this case, the program for a program provisioning system can be one of an installable or executable type and can be circulated in a form of being recorded in a computer readable recording medium such as the recording medium 206 or the CD-ROM 213. Note that it is also possible that the program for a program provisioning system is stored in the HD 204 instead of the ROM 202.

Further, the maintenance system 100 has a hardware configuration the same as or similar to the transmission management system 50 described above using FIG. 3. Therefore, duplicate description will be omitted. The maintenance system 10 is a computer for managing or maintaining at least one of the transmission terminals 10, the relay apparatuses 30, the transmission management system 50 and the program provisioning system 90. For example, when the maintenance system 100 is installed in the own country whereas the transmission terminals 10, the relay apparatuses 30, the transmission management system 50 or the program provisioning system 90 is installed in a foreign country, the maintenance system 100 manages or maintains, remotely via the communication network 2, at least one of the transmission terminals 10, the relay apparatuses 30, the transmission management system 50 and the program provisioning system 90.

Further, it is also possible that, without using the communication network 2, the maintenance system 100 carries out maintenance of at least one of the transmission terminals 10, the relay apparatuses 30, the transmission management system 50 and the program provisioning system 90 such as management or the like of a type number, a serial number, a sales destination, a test and maintenance or a fault history.

Note that, as another form of the above-mentioned detachable recording medium, it is also possible to store and provision the programs in a computer readable recording medium (media) such as a Compact Disc(s) Recordable (CD-R), a Digital Versatile Disk(s) (DVD), a Blu-ray disc(s) or the like.

<<Functional Configuration of the Embodiment>>

Figure 4:
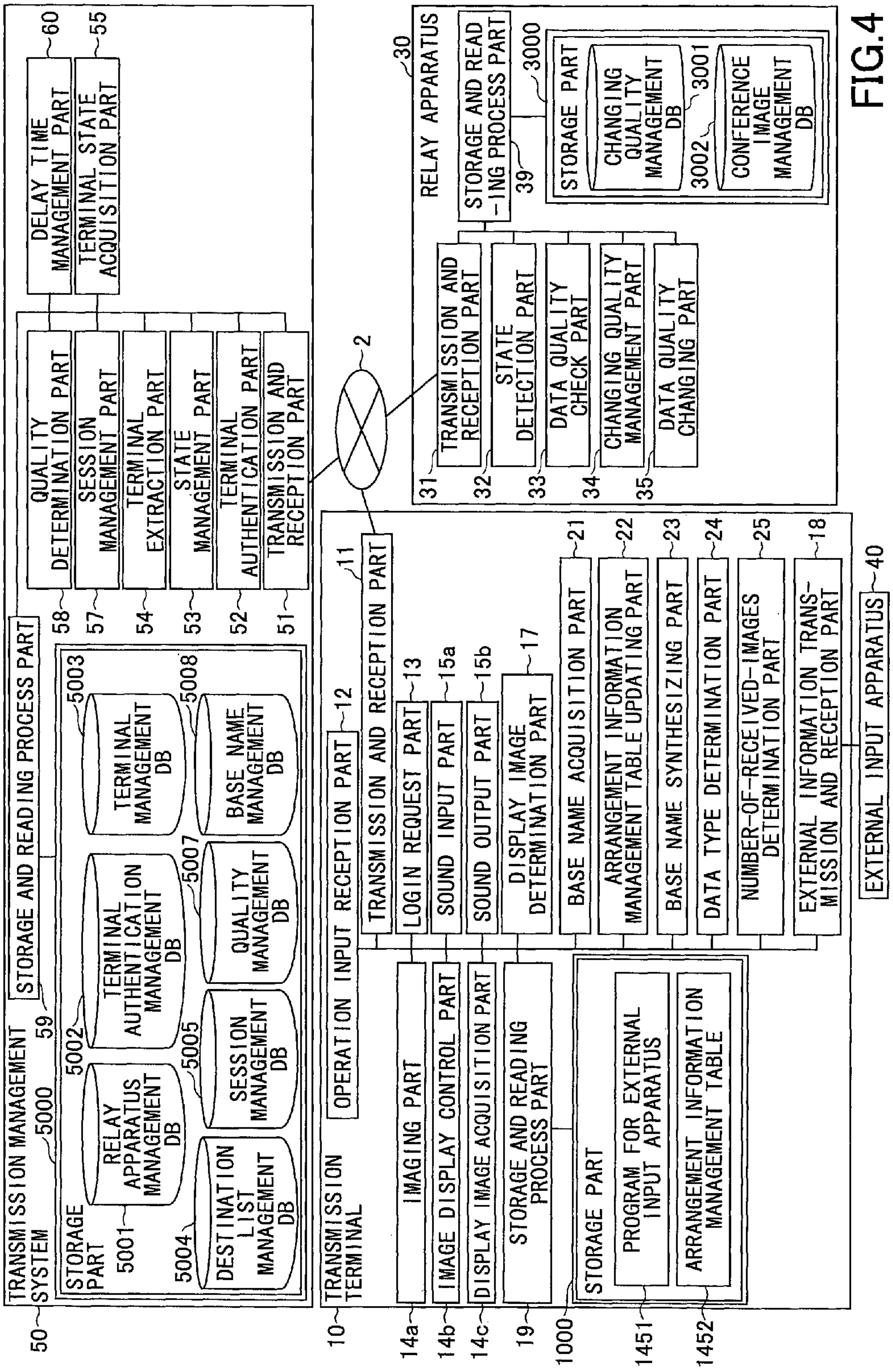
FIG. 4 is one example of a functional block diagram of the transmission terminal, a relay apparatus and the transmission management system included in the transmission system according to the present embodiment.

Next, a functional configuration of the present embodiment will be described using FIGS. 4 to 16. FIG. 4 is one example of a functional block diagram of the transmission terminal 10, the relay apparatus 30 and the transmission management system 50 included in the transmission system 1 according to the present embodiment. In an example shown in FIG. 4, the transmission terminal 10, the relay apparatus 30 and the transmission management system 50 are connected via the communication network 2 in such a manner that data communication can be carried out thereamong. Further, the external input apparatus 40 is connected with the transmission terminal 10 in such a manner that data can be transmitted and received therebetween. Note that the program provisioning system 90 and the maintenance system 100 shown in FIG. 1 are not directly relevant to communication in a video conference. Therefore, the program provisioning system 90 and the maintenance system 100 are omitted in FIG. 4.

Figure 5C:
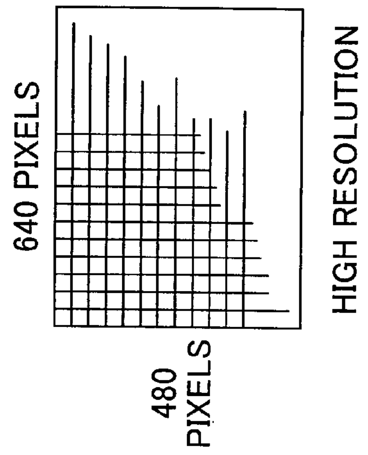
FIGS. 5A, 5B and 5C illustrate image quality of image data.
Figure 5B:
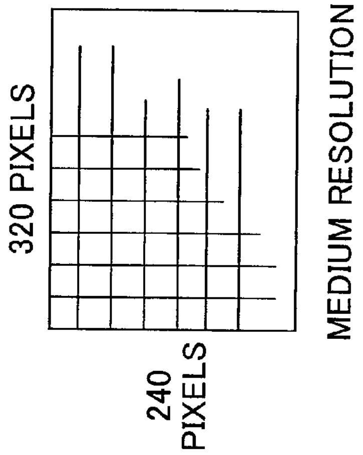
Figure 5A:
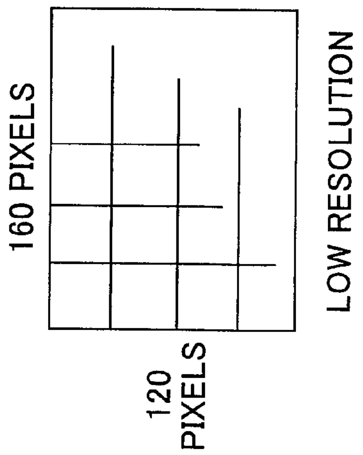
Figure 16:
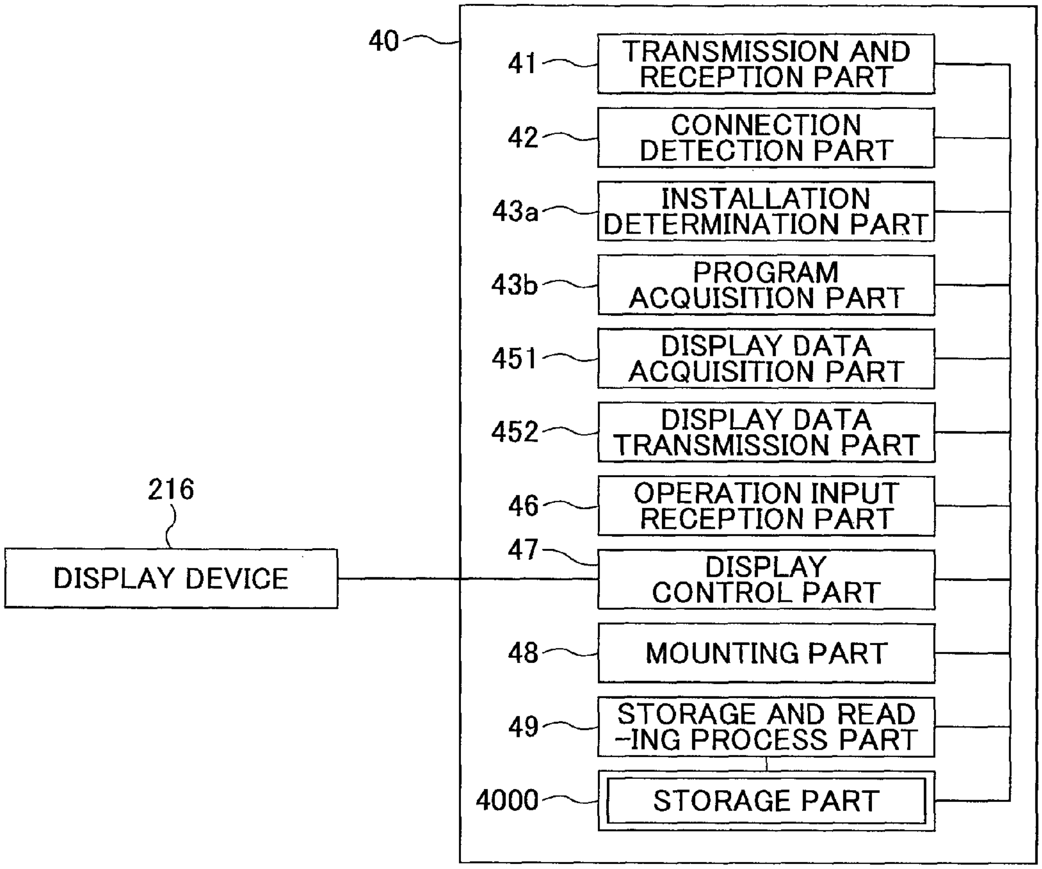
FIG. 16 shows a functional block diagram of one example of an external input apparatus.

Note that FIGS. 5A, 5B and 5C illustrate image quality of image data. FIG. 6 shows one example of a changing quality management table. FIG. 7 shows one example of a relay apparatus management table. FIG. 8 shows one example of a terminal authentication management table. FIG. 9 shows one example of a terminal management table. FIG. 10 shows one example of a destination list management table. FIG. 11 shows one example of a session management table. FIG. 12 shows one example of a quality management table. FIGS. 13A and 13B show examples of a base name management table. FIG. 14 shows one example of an arrangement information management table. FIG. 15 shows one example of a conference image management table. FIG. 16 shows a functional block diagram of one example of the external input apparatus 40.

<Functional Configuration of Transmission Terminal>

As shown in FIG. 4, the transmission terminal 10 includes a transmission and reception part 11, an operation input reception part 12, a login request part 13, an imaging part 14*a*, an image display control part 14*b*, a display image acquisition part 14*c*, a sound input part 15*a*, a sound output part 15*b*, a display image determination part 17, a base name acquisition part 21, an arrangement information management table updating part 22, a base name synthesizing part 23, a data type determination part 24, a number-of-received images determination part 25, an external information transmission and reception part 18 and a storage and reading process part 19. These respective functional parts are functions or parts implemented as a result of any of the elements shown in FIG. 2 operating according to instructions provided by the CPU 101 according to the program stored in the ROM 102. Further, the transmission terminal 10 has a storage part 1000 provided by the SSD 105 shown in FIG. 2.

<<Arrangement Information Management Table>>

In the storage part 1000, an arrangement information management table 1452 such as that shown in FIG. 14 is stored. The arrangement information management table is a table for associating respective areas in the display device 120 of each transmission terminal 10 with the terminal IDs, the transmission data IDs and the base names. An arrangement of image data or display data is determined by the arrangement information management table and a layout described below. In an "area" field, identification information of the area is registered. In a "transmission data ID" field, identification information of data transmitted by the relay apparatus 40 including whether the data is image data or display data is registered. In a "terminal ID" field, the terminal ID of the transmission terminal 40 that transmits the image data or the display data is registered. In a "base name" field, a base name with which the terminal ID in the base name management table is associated is registered.

The arrangement information management table is created when a conference is started, and thereafter, is updated when the layout of a display screen page on the display device 120 is changed (i.e., image data or display data allocated to an area on the display device 120 is changed, a transmission terminal 10 newly participates in the conference, a transmission terminal 10 logs off from the conference, or the like).

<<Respective Functional Parts of Transmission Terminal>>

Next, the respective functional parts of the transmission terminal 10 will be described in detail. The transmission and reception part 11 of the transmission terminal 10 is implemented by the network I/F 111 shown in FIG. 2 and transmits and receives various data to and from the other transmission terminals 10, the relay apparatuses 30 and the transmission management system 50. The operation input reception part 12 is implemented by the operation buttons 108 and the power switch 109 shown in FIG. 2 and receives various inputs performed by a user. For example, when a user turns on the power switch of the transmission terminal 10, the operation input reception part 12 receives the power-on operation and actually turns on the power.

The login request part 13 is implemented by instructions provided by the CPU 101 shown in FIG. 2 and automatically transmits, in response to the reception of the power-on operation, login request information indicating to request login and the IP address of the transmission terminal 10 at the present time to the transmission management system 50 from the transmission and reception part 11 via the communication network 2.

The imaging part 14*a* is implemented by the camera 112 and the image sensor I/F 113 shown in FIG. 2 and generates image data indicating a taken image of a subject. The image display control part 14*b* is implemented by the display I/F 117 shown in FIG. 2, renders image data and carries out control for displaying an image indicated by the image data on the display device 120. The display image acquisition part 14*c* acquires the image data that indicates the image displayed on the display device 120. According to the present embodiment, data indicating an image taken by the camera 112 is referred to as "image data". Further, data indicating an image displayed on the display device 216 of the external input apparatus 40, described later in detail, is referred to as "display data". Note that image data and display data are data of a format of, for example, Joint Photographic Experts Group (JPEG), Bitmap, Graphics Device Interface (GDI) or the like.

The sound input part 15*a* is implemented by the microphone 114 and the sound input and output I/F 116, shown in FIG. 2, inputs a user's voice and outputs sound data concerning a sound signal by converting the voice into the sound signal. The sound output part 15*b* is implemented by the speaker 115 and the sound input and output I/F 116 shown in FIG. 2 and outputs sound by converting a sound signal concerning sound data into the sound.

The external information transmission and reception part 18 transmits and receives data to and from the external input apparatus 40 via the external apparatus I/F 118 shown in FIG. 2.

The storage and reading process part 19 is implemented by the SSD shown in FIG. 2, stores various data in the storage part 1000 or reads various data from the storage part 1000.

The display image determination part 17 determines image data to be displayed on the display device 120 according to a layout described later. In a, case of a layout displaying display data, the display image determination part 17 determines display data and image data to be displayed on the display device 120. Further, the display image determination part 17 determines which transmission terminal's image data or display data is to be displayed in an area obtained from dividing according to the layout.

The base name acquisition part 21 acquires, from the transmission management system, a base name or a base name management table. The base name management table is previously registered by a user in the transmission management system.

The arrangement information management table updating part 22 creates an arrangement information management table after the transmission terminal 10 is started until a conference is started. When a layout is changed and it is necessary to update the arrangement information management table, the arrangement information management table updating part 22 updates the arrangement information management table.

The data type determination part 24 determines whether image data or display data is displayed on the display device 120. The number-of-received images determination part 25 determines the number of sets of image data or display data to be displayed on the display device 120.

The base name synthesizing part 23 synthesizes the respective sets of image data or display data to be displayed in the areas with the base names that are read out from the arrangement information management table. In other words, the base name synthesizing part 23 associates the transmission terminals for which the sets of image data or display data are displayed and the base names of the transmission terminals with the areas.

Although not shown, the storage part 1000 stores a terminal identification (ID) and a password for identifying the transmission terminal 10; a relay apparatus ID for identifying the relay apparatus 30 that transmits image data, sound data and/or various data; the IP address of the destination terminal, and so forth. Further, in the storage part 1000, the program for an external input apparatus 1451 and the arrangement information management table 1452 are stored.

As a result of the program for an external input apparatus 1451 being transmitted to the external input apparatus 40 and being installed in the external input apparatus 40, the external input apparatus 40 has respective functions described below. For details, a description will be made later for <Respective Functional Parts of External Input Apparatus> using FIG. 16.

Further, the terminal ID and the relay apparatus ID according to the present embodiment which will be described later mean languages, characters/letters, marks, various signs or the like to be used for identifying the transmission terminal 10 and the relay apparatus 30, respectively. Further, the terminal ID and the relay apparatus ID can be identification information obtained from combining at least two of the above-mentioned language(s), character(s)/letter(s), mark(s) and various sign(s). Hereinafter, the transmission terminal 10 as a request source that requests a start of a video conference will be referred to as a "request source terminal". Similarly, the transmission terminal 10 as a request destination will be referred to as a "destination terminal".

<Functional Configuration of Relay Apparatus>

Next, functions (or parts) of the relay apparatus 30 will be described. The relay apparatus 30 includes, as shown in FIG. 4, a transmission and reception part 31, a state detection part 32, a data quality check part 33, a changing quality management part 34, a data quality changing part 35 and a storage and reading process part 39. These respective functional parts are functions or parts implemented as a result of any of the respective elements shown in FIG. 3 operating according to instructions provided by the CPU 201 according to the program stored in the ROM 202. Further, the relay apparatus 30 has a storage part 3000 provided by any of the ROM 202, RAM 203 or the HDD 205 shown in FIG. 3.

<<Changing Quality Management Table>>

In the storage part 3000, a changing quality management DB 3001 is provided which includes a changing quality management table such as that shown in FIG. 6. In the changing quality management table, the IP addresses of the transmission terminals 10 that are the relay destinations of respective sets of image data and image qualities of the respective sets of image data which the relay apparatus 30 relays to the relay destinations are managed in a manner of being associated with each other.

The resolution of an image processed by the transmission system 1 according to the present embodiment will now be described. An image of a low resolution as a base image as shown in FIG. 5A having 160 pixels in the horizontal direction and 120 pixels in the vertical direction; an image of a medium resolution as shown in FIG. 5B having 320 pixels in the horizontal direction and 240 pixels in the vertical direction; and an image of a high resolution as shown in FIG. 5C having 640 pixels in the horizontal direction and 480 pixels in the vertical direction are used. Thereamong, when a narrow band is used, image data of low image quality including only image data of the low resolution as a base image is relayed. When a relatively wide band is used, image data of medium image quality including image data of the low resolution as a base image and image data of the medium resolution is relayed. When a very wide band is used, image data of high image quality including image data of the low resolution as a base image, image data of the medium resolution and image data of the high resolution is relayed. According to the changing quality management table shown in FIG. 6, for example, when the relay apparatus 30 relays image data for a destination terminal 10*db* having the IP address "1. 3. 2. 4", the image data is relayed having an image quality (quality of an image) of "high quality".

<<Conference Image Management Table>>

In the storage part 3000, a conference image management DB 3002 that includes a conference image management table such as that shown in FIG. 15 is stored. As shown in FIG. 15, in the conference image management table, the terminal IDs and the transmission data IDs are registered in a manner of being associated with each other. In the conference image management table, which image data or display data is transmitted by each transmission terminal is registered in each conference. According to the conference image management table, it is possible to determine data that is distributed to each transmission terminal by the relay apparatus. For example, the relay apparatus transmits image data 1 to the transmission terminal 01aa and the relay apparatus transmits display data 4 to the transmission terminal 01db. Further, from the transmission data ID (i.e., one example of "type information"), it is determined whether data transmitted is image data or display data.

<Respective Functional Parts of Relay Apparatus>

Next, respective functional parts of the relay apparatus 30 will be described in detail. Note that, hereinafter, when respective functional parts of the relay apparatus 30 will be described, also relationship with main elements shown in FIG. 3 to be used for implementing the respective functional parts of the relay apparatus 30 will be described.

The transmission and reception part 31 in the relay apparatus 30 is implemented by the network I/F 209 shown in FIG. 3 and transmits and receives various data to and from, via the communication network 2, the transmission terminals 10, the other relay apparatuses 30 and the transmission management system 50. The state detection part 32 is implemented by instructions provided by the CPU 201 shown in FIG. 3 and detects the operational state of the relay apparatus 30 that has this state detection part 32. The operational state can be any one of respective states of "online", "offline", "busy" and "out of order".

The data quality check part 33 is implemented by instructions provided by the CPU 201 shown in FIG. 3, searches the changing quality management table by using the IP address of the destination terminal 10 as a search key and determines the image quality of image data to be relayed by thus extracting the image quality of the image data to be relayed corresponding to the IP address. The changing quality management part 34 is implemented by instructions provided by the CPU 201 shown in FIG. 3 and changes the contents of the changing quality management DB 3001 based on quality information (described later) transmitted by the transmission management system 50. For example, a situation will be assumed where, during a video conference being carried out while image data of high image quality is transmitted and received between the request source terminal 10*aa* having the terminal ID of "01aa" and the destination terminal 10*db* having the terminal ID of "01db" via the communication network 2, a delay occurs in reception of the image data at the destination terminal 10*db* due to a start of another video conference between the request source terminal 10*bb* and the destination terminal 10*ca* which carry out the other video conference via the communication network 2. In the situation, the relay apparatus 30 needs to reduce the image quality of the image data that the relay apparatus 30 has been relaying from the high image quality to the medium image quality. In such a case, the contents of the changing quality management DB 3001 are changed based on quality information indicating the medium image quality so as to reduce the image quality of the image data that the relay apparatus 30, relays from the high image quality to the medium image quality.

The data quality changing part 35 is implemented by the CPU 201 shown in FIG. 3 and changes the image quality of image data transmitted from the request source terminal 10 based on the thus changed contents of the changing quality management DB 3001. The storage and reading process part 39 is implanted by the HDD 205 shown in FIG. 3, stores various data into the storage part 3000 and reads various data from the storage part 3000.

<Functional Configuration of Transmission Management System>

Next, functions (or parts) of the transmission management system 50 will be described. As shown in FIG. 4, the transmission management system 50 includes a transmission and reception part 51, a terminal authentication part 52, a state management part 53, a terminal extraction part 54, a terminal state acquisition part 55, a session management part 57, a quality determination part 58, a storage and reading process part 59 and a delay time management part 60. These functional pars are functions or parts implemented as a result of any of the respective elements shown in FIG. 3 operating according to instructions provided by the CPU 201 according to the program stored in the ROM 202. Further, the transmission management system 50 includes a storage part 5000 constructed by the ROM 202, the RAM 203 or the HDD 205 shown in FIG. 3.

<<Relay Apparatus Management Table>>

In the storage part 5000, the relay apparatus management DB 5001 including a relay apparatus management table such as that shown in FIG. 7 is provided. In the relay apparatus management table, the operational states of the respective relay apparatuses 30; the received dates and times when the respective sets of state information indicating the operational states are received by the transmission management system 50; the IP addresses of the relay apparatuses 30 and the highest data transmission rates (Mbps) in the relay apparatuses 30 are managed for the relay apparatus IDs of the respective relay apparatuses 30. For example, in the relay apparatus management table shown in FIG. 7, it is shown that the relay apparatus 30*a* having the relay apparatus ID of "111a" has the operational state "ONLINE", the date and time when the transmission management system 50 received the state information is "Nov. 10, 2009, 13:00", the IP address of the relay apparatus 30*a* is "1. 2. 1. 2" and the highest data transmission rate is 100 Mbps.

<<Terminal Authentication Management Table>>

Further, in the storage part 5000, a terminal authentication management DB 5002 is provided which includes a terminal authentication management table such as that shown in FIG. 8. In the terminal authentication management table, respective passwords are managed in a manner of being associated with the terminal IDs of all the transmission terminals 10 managed by the transmission management system 50. For example, in the terminal authentication management table shown in FIG. 8, it is shown that the terminal ID of the transmission terminal 10*aa* is "01aa", and the password thereof is "aaaa".

<<Terminal Management Table>>

Further, in the storage part 5000, a terminal management DB 5003 is provided which includes a terminal management table such as that shown in FIG. 9. In the terminal management table, the operational states of the transmission terminals 10; the received dates and times when respective sets of login request information described later are received by the transmission management system 50; and the IP addresses of the transmission terminals 10 are managed in a manner of being associated with the terminal IDs of the respective transmission terminals 10. For example, in the terminal management table shown in FIG. 9, it is shown that the transmission terminal 10*aa* having the terminal ID "01aa" has the operational state of "online", the transmission management system 50 received the login request information at "Nov. 10, 2009, 13:40" and the IP address of the transmission terminal 10*aa* is "1.2.1. 3".

<<Destination List Management Table>>

Further, in the storage part 5000, a destination list management DB 5004 is provided which includes a destination list management table such as that shown in FIG. 10. In the destination list management table, all the terminal IDs of the destination terminals 10 registered as the candidates for the destination terminal 10 are managed in a manner of being associated with the terminal ID of each request source terminal 10 requesting a start of a video conference. For example, in the destination list management table shown in FIG. 10, it is shown that the candidates for the destination terminal 10 which the request source terminal 10*aa* can request to start a video conference are three, i.e., the transmission terminal 10*ab* having the terminal ID "01ab", the transmission terminal 10*ba* having the terminal ID "01ba" and the transmission terminal 10*db* having the terminal ID "01db". These candidates for the destination terminal 10 are updated as a result of a new candidate(s) being added or an existing candidate(s) being removed implemented by a request for addition or removal sent from the corresponding request source terminal 10 to the transmission management system 50.

<<Session Management Table>>

Further, in the storage part 5000, a session management DB 5005 is provided which includes a session management table such as that shown in FIG. 11. In the session management table, the relay apparatus IDs of the relay apparatuses 30, the terminal IDs of the request source terminals 10, the terminal IDs of the destination terminals 10, delay times (ms) and received dates and times are managed in a manner of being associated with respective selection session IDs to be used for executing sessions for selecting the relay apparatuses 30. The "delay time (ms)" means a delay time in reception occurring when the destination terminal 10 receives image data. "Received date and time" means date and time when delay information indicating the delay time transmitted from the destination terminal 10 is received by the transmission management system 50.

For example, in the session management table shown in FIG. 11, it is shown that the relay apparatus 30*a* (the relay apparatus ID "111a") selected in the session executed by using the selection session ID "se1" relays image data and sound data between the request source terminal 10*aa* having the terminal ID "01aa" and the destination terminal 10*db* having the terminal ID "01db". Further, it is shown that the delay time of image data at a time of "Nov. 10, 2009, 14:00" is 200 (ms) at the destination terminal 10*db*.

Note that when a video conference is carried out between two transmission terminals 10, it is also possible to manage the "received date and time" of delay information based on delay information transmitted from the request source terminal 10 instead of the above-mentioned destination terminal 10. However, when a video conference is carried out among three or more transmission terminals 10, the "received date and time" of delay information is managed based on delay information transmitted from the transmission terminal 10 which receives image data and sound data.

<<Quality Management Table>>

Further, in the storage part 5000, a quality management DB 5007 is provided which includes a quality management table such as that shown in FIG. 12. In the quality management table, image quality (quality of an image) of image data to be relayed by the relay apparatus 30 is managed in a manner of being associated with the delay time (ms) at the request source terminal 10 or the destination terminal 10.

<<Base Name Management Table>>

Further, in the storage part 5000, a base name management DB 5008 is provided which includes base name management tables such as those shown in FIGS. 13A and 13B. As shown in FIGS. 13A and 13B, in each of the base name management table, the base names are managed in a manner of being associated with the respective terminal IDs. The base name management table is transmitted from each transmission terminal 10 to the transmission management system together with the terminal ID. In the base name management DB, the base name management tables are managed in a manner of being associated with the terminal IDs of the transmission terminals 10 of the transmission sources, respectively. It is also possible that the base name management tables are registered in the base name management DB 5008 by a PC operated by a system administrator.

In each base name management table, the base names of the respective transmission terminals are managed in a manner of being associated with the terminal IDs of the respective transmission terminals registered in the destination list management table. The destination list management table is registered in the transmission management system. Further, the destination list management table may be updated. Therefore, it is preferable that the transmission management system has also the base name management tables.

However, it is also possible that base names are associated with not only the terminal IDs registered in the destination list management table but also any other terminal IDs. In this case, it is also possible that the transmission terminals have the base name management tables.

The "base name" can be freely named and set. For example, a user operates the operation buttons 108 of the transmission terminal and inputs a base name to be associated with each terminal ID. The user already knows the base where the transmission terminal is placed (the base associated with the transmission terminal).

The base name management table is provided for each transmission terminal and is a table dedicated to the transmission terminal. Therefore, concerning the same terminal ID, different base names (which may be the same as one another) can be registered in the respective transmission terminals of the transmission sources. For example, in the transmission terminal of the transmission source having the terminal ID "08aa" (see. FIG. 13A), "Ginza" is provided as the base name for the terminal ID "01aa". In contrast thereto, in the transmission terminal of the transmission source having the terminal ID "09aa" (see FIG. 13B), "Ginza head office" is provided as the base name for the same terminal ID of "01aa".

On the other hand, it is also possible that the base name management table is shared by a plurality of transmission terminals 10, the single base name management table is read by the plurality of transmission terminals in the sharing manner.

Because a base name can be freely determined and set by a user, it is possible that, in the base name management table, information other than a base name is registered. For example, the full name and/or a nickname of the user who uses the transmission terminal or the administrator of the transmission terminal, the name of the division the user of the transmission terminal belongs to, any information such as the address, a contact address (a phone number, a mail address or the like), the age or the like of the user who uses the transmission terminal or the administrator of the transmission terminal can be registered in the base name management table. Note that these sorts of information including the base name are examples of "terminal information".

Note that, in FIGS. 13A and 13B, the terminal ID and the base name of the own base are not registered. Whether to resister the terminal ID and the base name of the own base can be selected by the user. When the own base's base name is not registered, the transmission terminal can display, for example, "own base" or can display nothing on the display device 120.

A base name is registered by a character code according to a character code system such as UNICODE. Therefore, which shapes of characters/letters are displayed on the display device 120 depend on a font the transmission terminal has. A base name can be registered not only according to a character code but also by using image data such as a Bitmap, GIF or the like.

<Respective Functional Parts of Transmission Management System>

Next, respective functional parts of the transmission management system 50 will be described. Note that, hereinafter, when respective functional parts of the transmission management system 50 are described, relationships with main elements for implementing the respective functional parts of the transmission management system 50, from among the respective elements shown in FIG. 3, will be described.

First, the transmission and reception part 51 is implemented by the network I/F 209 shown in FIG. 3 and transmits and receives various data to and from, via the communication network 2, the transmission terminals 10, the relay apparatuses 30 or other systems (the program provisioning system 90 and the maintenance system 100). The terminal authentication part 52 uses the terminal ID and the password included in login request information received via the transmission and reception part 51 as search keys and searches the terminal authentication management DB 5002 of the storage part 5000 to carry out terminal authentication by determining whether the terminal authentication management DB 5002 manages the same terminal ID and password. The state management part 53 manages the operational state of the request source terminal 10 that sends the login request information by storing, in the terminal management table, the terminal ID of the request source terminal 10, the operational state of the request source terminal 10 and the received date and time when the transmission management system 50 receives the login request information with the IP address of the request source terminal 10 in a manner of associating them with each other.

The terminal extraction part 54 uses the terminal ID of the request source terminal 10 that sends the login request information as a key, searches the destination list management table and reads out to extract the terminal IDs of the candidates for the destination terminal 10 which can communicate with the request source terminal 10. Further, the terminal extraction part 54 uses the terminal ID of the request source triennial 10 that sends the login request information as a key, searches the destination list management table and extracts also the terminal IDs of the other request source terminals 10 which register the terminal ID of the above-mentioned request source terminal 10 as the candidate for the destination terminal 10.

The terminal state acquisition part 55 uses the terminal IDs of the candidates for the destination terminal thus extracted by the terminal extraction part 54 as search keys, searches the terminal management table and reads out, for each terminal ID extracted by the terminal extraction part 54, the operational state. Thereby, the terminal state acquisition part 55 can acquire the operational states of the candidates for the destination terminal which can communicate with the request source terminal that sends the login request information. Further, the terminal state acquisition part 55 uses the terminal ID of the transmission source terminal 10 that sends the login request information as a search key, searches the terminal management table and acquires also the operational state of the request source terminal 10 that sends the login request information.

The session management part 57 stores and manages the generated selection session ID, the terminal ID of the request source terminal and the terminal ID of the destination terminal in a manner of associating them with each other in the session management DB 5005 (the session management table shown in FIG. 11) of the storage part 5000. Further, the session management part 57 stores the relay apparatus ID of the relay apparatus 30 in the session management table and manages them.

The quality determination part 58 uses the above-mentioned delay time as a search key, searches the quality management table and extracts the image quality of the corresponding image data to determine the image quality of the image data to be relayed by the relay apparatus 30. The storage and reading process part 59 is implemented by the HDD 205 shown in FIG. 3, stores various data in the storage part 5000 and reads various data from the storage part 5000. The delay time management part 60 uses the IP address of the above-mentioned destination terminal 10 as a search key, searches the terminal management table to extract the corresponding terminal ID. Further, the delay time management part 60 stores and manages the delay time indicated by the above-mentioned delay information in the delay time field on the record including the thus extracted terminal ID in the session management table.

<Functional Configuration of External Input Apparatus>

FIG. 16 shows a functional block diagram of one example of the external input apparatus. As shown in FIG. 13, the external input apparatus 40 includes a transmission and reception part 41, a connection detection part 42, an installation determination part 43*a*, a program acquisition part 43*b*, a display data acquisition part 451, a display data transmission part 452, an operation input reception part 46, a display control part 47, a mounting part 48 and a storage and reading process part 49. These respective functional parts are functions or parts implemented as a result of any of the respective elements shown in FIG. 3 operating according to instructions provided by the CPU 201 according to the program stored in the ROM 202. Further, the display data acquisition part 451 and the display data transmission part 452 are implemented as a result of the program for an external input apparatus 1451 stored in the storage part 1000 of the transmission terminal 10 being downloaded and installed. Further, the external input apparatus 40 has a storage part 4000 provided by the ROM 202, RAM 203 or the HDD 205 shown in FIG. 3. Further, although not particularly shown in the figure, the external input apparatus 40 has an Operating System (OS) such as Windows (registered trademark), "Mac (registered trademark) OS", "Mac (registered trademark) OS X Lion", "Mac (registered trademark) OS X", "OSX" or the like, and thereby, has a function of executing a program when being connected with another apparatus.

<Respective Functional Parts of External Input Apparatus>

Next, respective functional parts of the external input apparatus 40 will be described in detail. First, the transmission and reception part 41 is implemented by the external apparatus I/F 215 shown in FIG. 3 and transmits and receives various data (information) to and from the transmission terminal 10. The connection detection part 42 detects that transmission and reception of various data with the transmission terminal 10 is made possible by using the external apparatus I/F 215 shown in FIG. 3.

The installation determination part 43*a* determines whether the program for an external input apparatus 1451 is already installed in the external input apparatus 40. When it is not installed yet, the program acquisition part 43*b* installs the program for an external input apparatus 1451 from the storage part 1000 of the transmission terminal 10 which the mounting part 48 mounts via the transmission and reception part 41.

The operation input reception part 46 receives information that is input through operation of a user. The display control part 47 displays an image or a menu that is read out by the storage and reading process part 49 described later on the display device 216. The mounting part 48 mounts the storage part 1000 of the transmission terminal 10. Thereby, the external input apparatus 40 can install the program for an external input apparatus 1451.

The display data acquisition part 451 acquires display data indicating an image displayed on the display device 216 of the external input apparatus 40. The display data transmission part 452 transmits the display data acquired by the display data acquisition part 451 to the transmission terminal 10.

The storage and reading process part 49 is implemented by the HDD 205 shown in FIG. 3, stores various data in the storage part 4000 and reads various data from the storage part 4000.

<<Processing and Operations in the Embodiment>>

Figure 17:
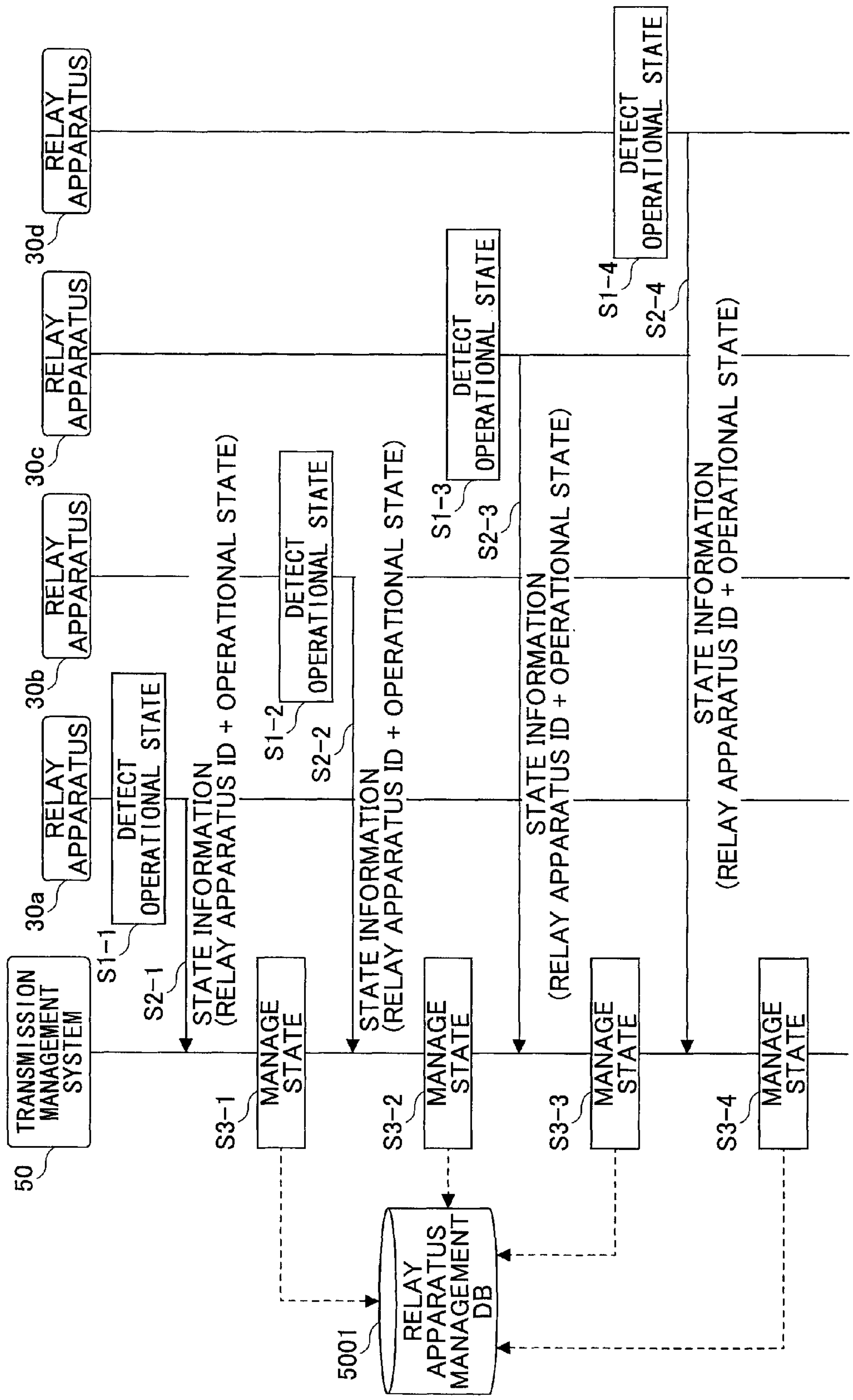
FIG. 17 is a sequence diagram showing one example of a process of managing state information indicating operational states of the respective relay apparatuses transmitted to the transmission management system from the respective relay apparatuses.
Figure 18:
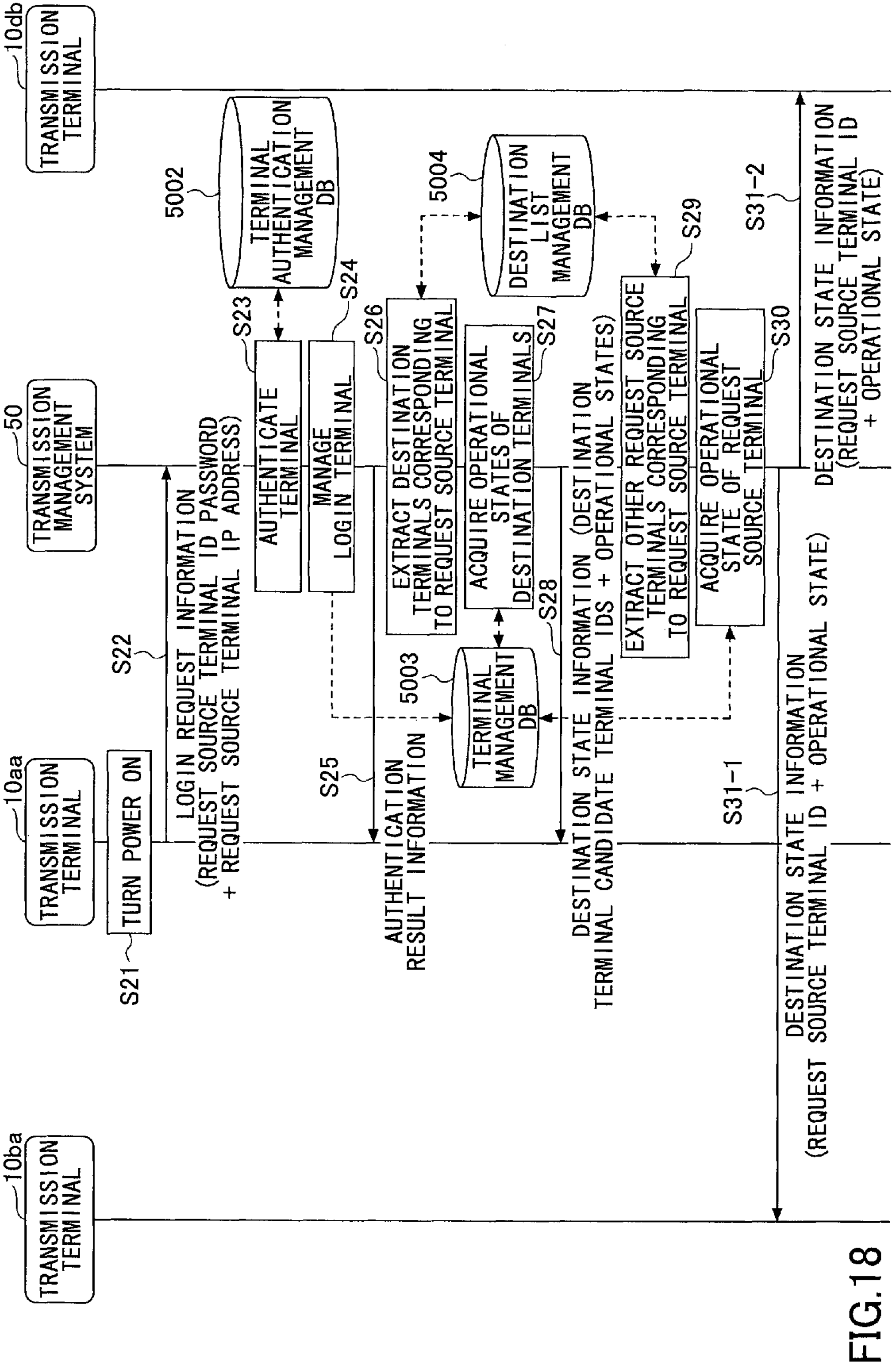
FIG. 18 is a sequence diagram of one example of a process of a preparation stage for starting communication among the respective transmission terminals.
Figure 19:
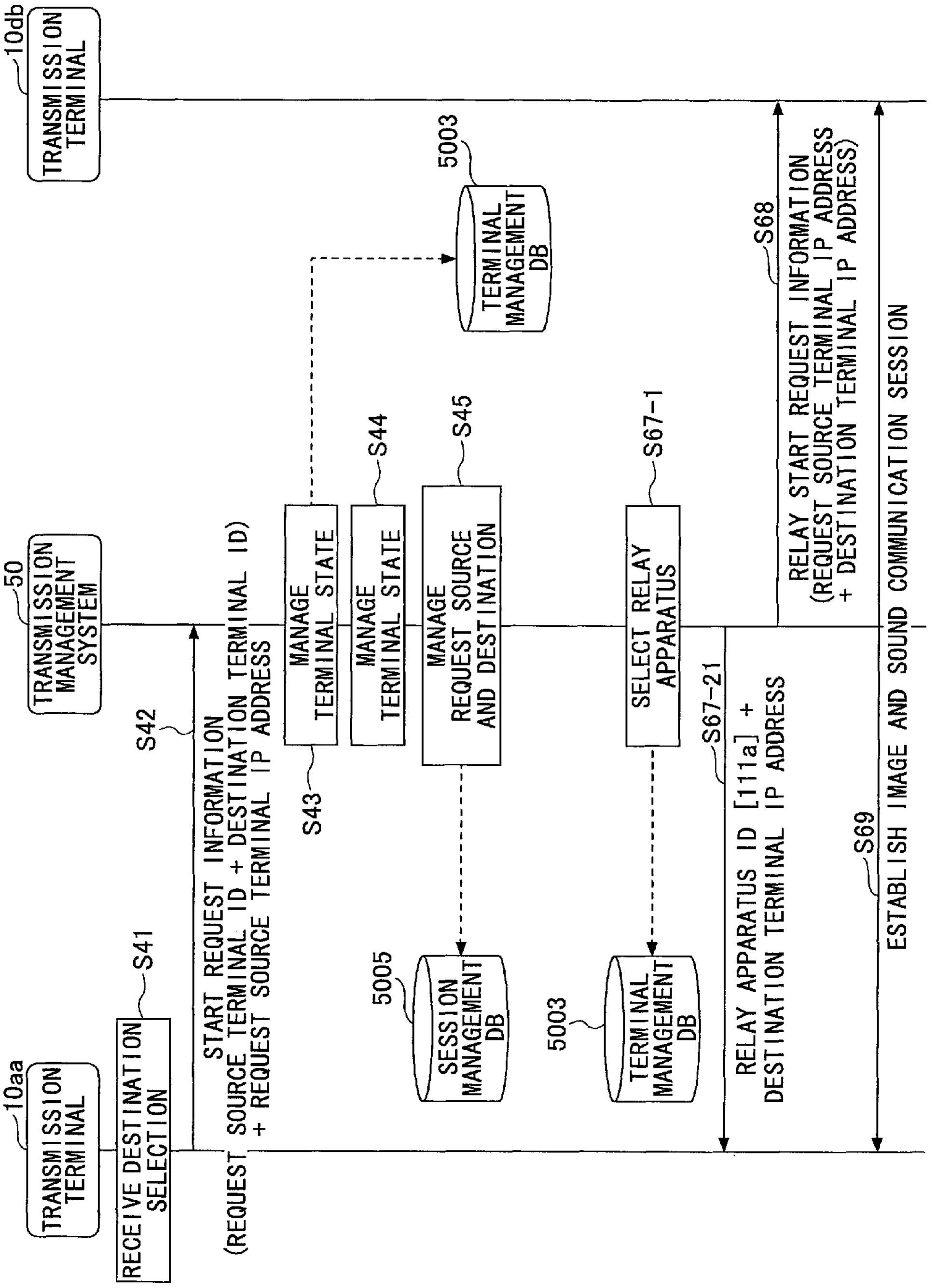
FIG. 19 is a sequence diagram of one example of a process of establishing a session by the transmission terminal.
Figure 20:
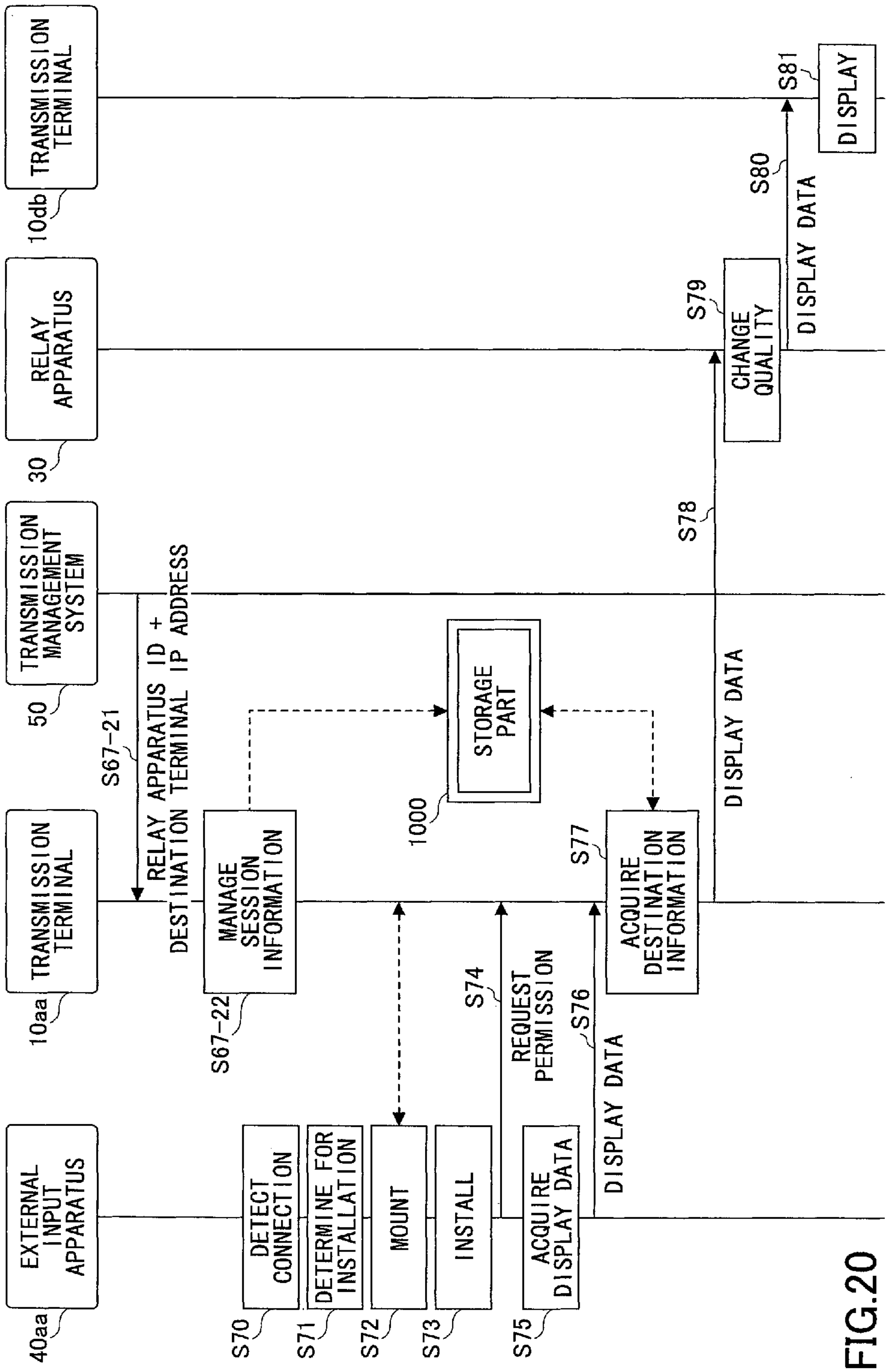
FIG. 20 is a sequence diagram of one example of a process of causing display data displayed by the external input apparatus to be displayed on the transmission terminal of another participant of a conference.
Figure 21:
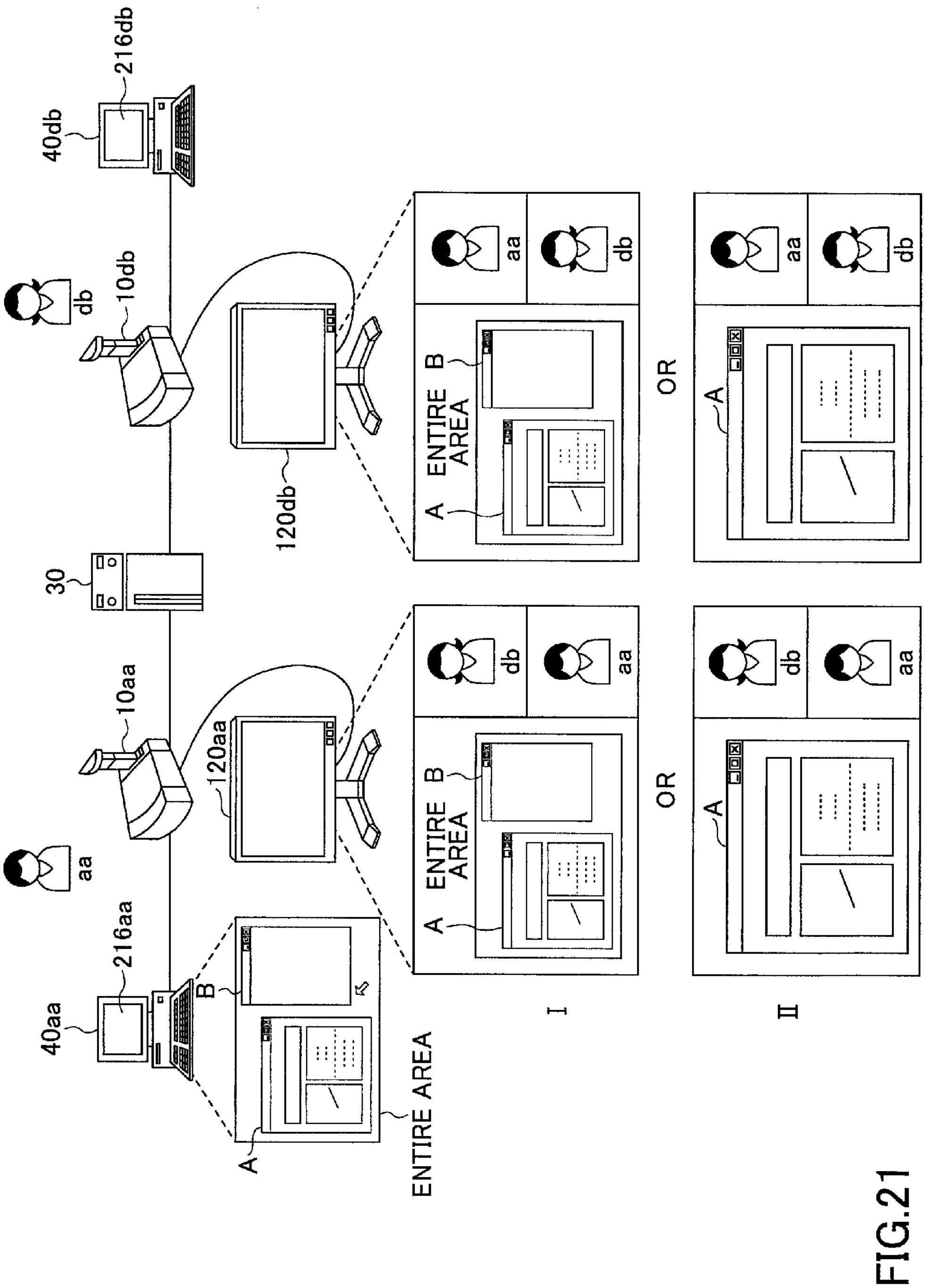
FIG. 21 illustrates one example of screen pages displayed on the display devices 216*aa* and 216*db* of the external input apparatuses 40*aa* and 40*db* and the display devices 120*aa* and 120*db* in the entirety of the transmission system.

Next, using FIGS. 17 to 21, various processes and operations carried out in the transmission system 1 according to the present embodiment will be described. Note that FIG. 17 is a sequence diagram showing one example of a process of managing state information indicating the operational states of the respective relay apparatuses 30 transmitted to the transmission management system 50 from the respective relay apparatuses 30. FIG. 18 is a sequence diagram of one example of a process of a preparation stage for starting communication among the respective transmission terminals 10. FIG. 19 is a sequence diagram of one example of a process of establishing a session by the transmission terminal 10. FIG. 20 is a sequence diagram of one example of a process of causing display data displayed by the external input apparatus to be displayed on the transmission terminal 10 of another participant of a conference. FIG. 21 illustrates one example of screen pages displayed on the display devices 216*aa*, 216*db* of the external input apparatuses 40*aa*, 40*db* and the display devices 120*aa*, 120*db* in the entirety of the transmission system 1.

First, using FIG. 17, a process of managing state information indicating the operational state of each relay apparatus 30 transmitted from the relay apparatus 30 to the transmission management system 50 will be described. First, in each of the relay apparatuses 30 (30*a* to 30*d*), the state detection part 32 periodically detects the operational state of this relay apparatus 30 (steps S1-1 to S1-4). Then, in order that the transmission management system 50 manages the operational state of each relay apparatus 30 in a real-time manner, the transmission and reception part 31 in each relay apparatus 30 periodically transmits the state information to the transmission management system 50 via the communication network 2 (steps S2-1 to S2-4). The state information includes the relay apparatus ID of the corresponding relay apparatus 30 and the operational state detected by the state detection part 32 of the corresponding relay apparatus 30 concerning the relay apparatus ID. Note that it is assumed that the relay apparatuses 30*a*, 30*b* and 30*d* normally operate and have the operational states of "online", while the relay apparatus 30*c* operates but has the operational state of "offline" because a certain problem occurs in the program for carrying out a relay operation there.

Next, in the transmission management system 50, the transmission and reception part 51 receives the respective sets of state information transmitted by the respective relay apparatuses 30*a* to 30*d*, stores them in the relay apparatus management DB 5001 (the relay apparatus management table shown in FIG. 7) of the storage part 5000 via the storage and reading process part 59 for the respective relay apparatus IDs and manages them (steps S3-1 to S3-4). Thus, in the relay apparatus management table, the operational state of any one of "online", "offline" or "out of order" is stored for each relay apparatus ID and is managed. At this time, also received date and time when the transmission management system 50 receives the state information is stored for each relay apparatus ID and is managed. Note that when no state information is transmitted from the relay apparatus 30, the corresponding field of received date and time in the relay apparatus management table on the corresponding record becomes blank or the previous operational state and received date and time are kept and managed.

Next, using FIG. 18, a process at a stage of preparing to start communication between the transmission terminal 10*aa* and the transmission terminal 10*db* will be described. First, when a user turns on the power switch 109, the operation input reception part 12 receives the power-on operation and turns the power on (step S21). Next, the login request part 13 responds to the reception of the power-on operation and automatically transmits, from the transmission and reception part 11 to the transmission management system 50 via the communication network 2, login request information indicating a login request (step S22). The login request information includes the terminal ID and the password for identifying the transmission terminal 10*aa* itself that is the request source. Note that the terminal ID and the password are read out from the storage part 1000 via the storage and reading process part 19 and are transmitted to the transmission and reception part 11. Note that, when the login request information is transmitted from the transmission terminal 10*aa* to the transmission management system 50, the transmission management system 50 that is the reception side can acquire the IP address of the transmission terminal 10*aa* that is the transmission side.

Next, the terminal authentication part 52 in the transmission management system 50 uses the terminal ID and the password included in the login request information received via the transmission and reception part 51 as search keys, searches the terminal authentication management DB 5002 (the terminal authentication management table shown in FIG. 8) of the storage part 5000 and determines whether the terminal authentication management DB 5002 manages the same terminal ID and password, to carry out terminal authentication (step S23). When the terminal authentication part 52 determines that the same terminal ID and password are managed and therefore the login request is one from the transmission terminal 10 having an authorized utilization right, the state management part 53 stores the terminal ID of the transmission terminal 10*aa*, the operational state, the received date and time when the above-mentioned login request information is received and the IP address of the transmission terminal 10*aa* in a manner of associating them with each other in the terminal management DB 5003 (the terminal management table shown in FIG. 9) (step S24). Thus, in the terminal management table, the operational state "online", the received date and time "2009.11.10.13:40" and terminal the IP address "1. 2. 1. 3" are managed in a manner of being associated with the transmission terminal ID "01aa".

Next, the transmission and reception part 51 in the transmission management system 50 transmits authentication result information indicating the authentication result acquired by the terminal authentication part 52 to the request source terminal 10*aa* that sent the login request information via the communication network 2 (step S25). The case where the terminal authentication part 52 thus determines that the transmission terminal has an authorized utilization right according to the present embodiment will now be further continued.

The terminal extraction part 54 in the transmission management system 50 uses the terminal ID "01aa" of the request source terminal 10*aa* that sent the login request information as a search key, searches the destination list management table and reads out and extracts the terminal IDs of candidates for the destination terminal 10 which can communicate with the request source terminal 10*aa* (step S26). Here, the respective terminal IDs "01ab", "01ba" and "01db" of the destination terminals 10*ab*, 10*ba* and 10*db* are extracted corresponding to the terminal ID "01aa" of the request source terminal 10*aa*.

Next, the terminal state acquisition part 55 uses these terminal IDs ("01ab", "01ba" and "01db") of the candidates for the destination terminal 10 extracted by the terminal extraction part 54 as search keys, searches the terminal management table and reads out the operational states ("offline", "online" and "online") for the respective terminal IDs extracted by the terminal extraction part 54 to acquire the respective operational states of the transmission terminals (10*ab*, 10*ba* and 10*db*) (step S27).

Next, the transmission and reception part 51 transmits destination state information including the terminal IDs ("01ab", "01ba" and "01db") used in step S27 as the search keys and the operational states ("offline", "online" and "online") of the corresponding destination terminals (10*ab*, 10*ba* and 10*db*) to the request source terminal 10*aa* via the communication network 2 (step S28). Thus, the request source terminal 10*aa* can know the current respective operational states ("offline", "online" and "online") of the transmission terminals (10*ab*, 10*ba* and 10*db*) that are the candidates for the destination terminal 10 which can communicate with the request source terminal 10*aa*.

Further, the terminal extraction part 54 in the transmission management system 50 uses the terminal ID "01aa" of the request source terminal 10*aa* that sent the login request information as a search key, searches the destination list management table and extracts the terminal IDs of other request source terminals 10 that register the terminal ID "01aa" of the request source terminal 10*aa* as candidates for the destination terminals 10 (step S29). In the destination list management table shown in FIG. 10, the extracted terminal IDs of the other request source terminal 10 are "01ab", "01ba" and "01db".

Next, the terminal state acquisition part 55 in the transmission management system 50 uses the terminal ID "01aa" of the request source terminal 10*aa* that sent the login request information as a search key, searches the terminal management table and acquires the operational state of the request source terminal 10*aa* (step S30).

Next, the transmission and reception part 51 transmits, to the transmission terminals (10*ba* and 10*db*) from among the transmission terminals (10*ab*, 10*ba* and 10*db*) of the terminal IDs ("01ab", "01ba" and "01db") extracted in step S29 having the operational states of "online" in the terminal management table, the destination state information including the terminal ID "01aa" and the operational state "online" of the request source terminal 10*aa* acquired in step S30 (steps S31-1 and S31-2). Note that, when the transmission and reception part 51 is to transmit the destination state information to the transmission terminals (10*ba* and 10*db*), the transmission and reception part 51 reads the IP addresses of the transmission terminals managed in the terminal management table based on the respective terminal IDs ("01ba" and "01db"). Thereby, it is possible to send the information of the terminal ID "01aa" and the operational state "online" of the request source terminal 10*aa* that sent the login request information to the other respective destination terminals (10*db* and 10*ba*) that can carry out communication with the request source terminal 10*aa* that sent the login request information as a destination.

On the other hand, also in the other transmission terminals 10, when users turn on the power switches 109 (the above-mentioned step S21), the operation input reception parts 12 receive the power-on operations and carry out the same process as the above-mentioned steps S22 to S31-1 and S31-2. Therefore, the description will be omitted.

Next, using FIG. 19, a process of establishing a session by the transmission terminal will be described. According to the present embodiment, the request source terminal 10*aa* can carry out communication with at least one of the transmission terminals 10*ba* and 10*db*, from among the transmission terminals as the candidates for the destination, having the operational states of "online" according to the destination state information received in the above-mentioned step S28. Therefore, hereinafter, a case where the user of the request source terminal 10*aa* selects to start communication with the destination terminal 10*db* will be described.

First, when the user presses the operation buttons 108 to select the transmission terminal 10*db*, the operation input reception part 12 in the transmission terminal 10*aa* receives the selection of selecting the transmission terminal 10*db* as the destination (step S41). Next, the transmission and reception part 11 in the transmission terminal 10*aa* transmits start request information including the terminal ID "01aa" of the request source terminal 10*aa* and the terminal ID "01db" of the destination terminal 10*db* and indicating to start communication to the transmission management system 50 (step S42). Thereby, the transmission and reception part 51 in the transmission management system 50 receives the start request information and knows the IP address "1. 2. 1. 3" of the request source terminal 10*aa* as the transmission source. Then, the state management part 53 updates, based on the terminal ID "01aa" of the request source terminal 10*aa* and the terminal ID "01db" of the destination terminal 10*db* included in the start request information, the fields of the operational state on the respective records including the terminal ID "01aa" and the terminal ID "01db" into "busy", respectively, in the terminal management table of the terminal management DB 5003 (step S43). In this state, the request source terminal 10*aa* and the destination terminal 10*db* are in "busy" states even through actual communication (call) is not started yet. Therefore, when another transmission terminal 10 intends to communicate with the request source terminal 10*aa* or the destination terminal 10*db*, a voice or a display indicating a so-called "busy" state is output.

The transmission management system 50 generates a selection session ID to be used to execute a session for selecting a relay apparatus 30 (step S44). Then, the session management part 57 stores and manages the selection session ID "set" generated in step S44, the terminal ID "01aa" of the request source terminal 10*aa* and the terminal ID "01db" of the destination terminal 10*db* in a manner of associating them with each other in the session management table of the storage part 5000 (step S45).

Thereafter, the transmission management system 50 narrows down the relay apparatuses 30 for relaying communication between the request source terminal 10*aa* and the destination terminal 10*db* based on the relay apparatus management DB 5001 and the terminal management DB 5003. The details of the narrowing down process will be omitted.

Next, the session management part 57 in the transmission management system 50 stores the relay apparatus ID "111a" of the thus finally selected relay apparatus 30*a* in the field of the relay apparatus ID on the record including the selection session ID "se1" of the session management table in the session management DB 5005 and manage it (step S67-1). The transmission and reception part 51 transmits the relay apparatus ID "111a" and the IP address "1. 3. 2. 4" of the destination terminal 10*db* to the request source terminal 10*aa* (step S67-21). Note that the transmission and reception part 51 in the transmission management system 50 transmits relay start request information indicating a request to start relaying to the relay apparatus 30*a* via the communication network 2 (step S68). In the relay start request information, the respective IP addresses ("1. 2. 1. 3" and "1. 3. 2. 4") of the request source terminal 10*aa* and the destination terminal 10*db* for which relaying is carried out are included. Thereby, the relay apparatus 30*a* establishes a session for communicating three respective sets of image data of the low resolution, the medium resolution and the high resolution and sound data between the transmission terminal 10*aa* and the transmission terminal 10*db* (step S69). Thereby, the respective transmission terminals (10*aa* and 10*db*) can start a video conference. Note that the three sets of image data to be communicated are examples. The number of types of image data to be communicated can be more than the three or less than the three.

Note that the respective transmission terminals 10 transmit and receive the image data by using a video coding standard such as H.264 (H.264/AVC, MPEG-4 part 10, MPEG4 AVC), an extended standard thereof H.264/SVC, Mpeg2 or the like.

Next, a process of transmitting display data indicating an image displayed on the display device 216 of the external input apparatus 40 to the transmission terminal 10 and displaying the display data on the display device 120 after the relay apparatus 30 is determined will be described using FIG. 20. In the description, a case where information displayed by the external input apparatus 40*aa* connected with the transmission terminal 10*aa* is displayed on the transmission terminal 10*db* that is the destination terminal will be used as an example.

When the relay apparatus 30 is thus determined, the transmission and reception part 11 in the transmission terminal 10*aa* receives the relay apparatus ID "111a" and the IP address "1. 3. 2. 4." of the destination terminal 10*db* transmitted by the transmission management system 50 in step S67-21. Then, the storage and reading process part 19 stores the received relay apparatus ID "111a" and the IP address "1. 3. 2. 4." in the storage part 1000 (step S67-22).

Further, when the external input apparatus 40*aa* is connected with the transmission terminal 10*aa*, the connection detection part 42 in the external input apparatus 40*aa* detects the connection (step S70). Note that, when the external input apparatus 40*aa* is started, the display control part 47 displays a screen page including at least an entire area. When the connection detection part 42 detects the connection between the external input apparatus 40*aa* and the transmission terminal 10*aa*, the installation determination part 43*a* determines whether the external input apparatus 40*aa* has the display data acquisition part 451 and the display data transmission part 452 (step S71). Specifically, the installation determination part 43*a* determines whether the program for an external input apparatus 1451 is installed in the external input apparatus 40*aa*. When the program for an external input apparatus 1451 is installed, the installation determination part 43*a* determines that the external input apparatus 40*aa* has the respective functional parts corresponding thereto.

On the other hand, when the installation determination part 43*a* determines that the external input apparatus 40*aa* does have either one of the display data acquisition part 451 and the display data transmission part 452, the mounting part 48 mounts the storage part 1000 of the transmission terminal 10*aa* (step S72). Then, the program acquisition part 43*b* acquires the program for an external input apparatus 1451 stored in the storage part 1000 of the transmission terminal 10 and installs the program for an external input apparatus 1451 (step S73). Thus, the external input apparatus 40*aa* has the display data acquisition part 451 and the display data transmission part 452. Note that it is also possible that the external input apparatus 40*aa* previously has the program for an external input apparatus 1451.

When the process in step S73 is finished, the transmission and reception part 41 transmits information for requesting permission of transmitting display data to the transmission terminal 10*aa* (step S74). Then, when the transmission and reception part 41 receives information indicating permission of the request from the transmission terminal 10*aa*, the display data acquisition part 451 acquires display data indicating an image displayed on the display device 216 (step S75).

At this stage, the resolution of the display data can be changed. Thereby, it is possible to display the display data appropriately if the resolution is different between the display device 216 and the display device 120.

When the external information transmission and reception part 18 in the transmission terminal 10*aa* of the transmission source receives the display data from the external input apparatus 40*aa*, the storage and reading process part 19 reads out the relay apparatus ID "111a" and the IP address "1. 3. 2. 4." of the transmission terminal 10*db* that is the destination from the storage part 1000 (step S77).

Then, the transmission and reception part 11 transmits the display data having the resolution thus changed, if necessary, and the IP address "1. 3. 2. 4." of the transmission terminal 10*db* that is the destination to the relay apparatus 30 indicated by the relay apparatus ID "111a" read out in step S77 (step S78).

When the relay apparatus 30 receives the display data thus transmitted from the transmission terminal 10*aa* in step S78, the relay apparatus 30 changes the image quality of the display data based on the IP address "1. 3. 2. 4." of the transmission terminal 10*db* of the destination (step S79) and transmits the display data to the transmission terminal 10*db* (step S80). Note that, although not clearly seen from the figure, the relay apparatus 30 transmits the display data also to the transmission terminal 10*aa*. This is because, according to the specification of the transmission system 1, also the transmission terminal 10*aa* that is the transmission source of the display data shares the display data transmitted from the relay apparatus 30.

When the transmission and reception part 11 in the transmission terminal 10*db* receives the display data transmitted from the relay apparatus 30, the image display control part 14*b* displays the image indicated by the received display data on the display device 120*db* (step S81).

FIG. 21 illustrates one example of screen pages displayed on the display devices 216*aa* and 216*db* of the external input apparatuses 40*aa* and 40*db* and the display devices 120*aa* and 120*db* in the entirety of the transmission system. On the external input apparatus 40*aa*, a screen page that the user wishes to share with the transmission terminal 10*db* is displayed. Screen pages displayed on the external input apparatus 40*aa* and 40*db* are referred to as "desktop screen pages". Concerning a desktop screen page, the entirety thereof will be referred to as an "entire area" and a plurality of areas can be displayed (although there can be a case where no area is displayed) in the entire area. In FIG. 21, for example, an "entire area", an area "A" and an area "B" are displayed in the desktop screen page of the external input apparatus 40*aa*.

Through the process of FIG. 20, the transmission terminal 10*aa* displays image data and display data on the display device 120*aa*, and the transmission terminal 10*db* displays image data and display data on the display device 120*db*. These screen pages are referred to as "display screen pages".

Each of the display devices 120*aa* and 120*db* is divided into three areas as shown in FIG. 21. In the example of the display screen page of the display device 120*aa*, the display data displayed on the external input apparatus 40*aa* is displayed at a left side in the screen page and the image data taken by the imaging part 14*a* of the transmission terminal 10*db* and received by the transmission and reception part 11 from the transmission terminal 10*db* is displayed at a top right part in the screen page. Further, at a bottom right part in the screen page, the image data taken by the imaging part 14*a* of the transmission terminal 10*aa* is displayed. Similarly, in the example of the display screen page of the display device 120*db*, the display data displayed on the external input apparatus 40*aa* is displayed at a left side in the screen page and the image data taken by the imaging part 14*a* of the transmission terminal 10*aa* and received by the transmission and reception part 11 from the transmission terminal 10*aa* is displayed at a top right part in the screen page. Further, at a bottom right part in the screen page, the image data taken by the imaging part 14*a* of the transmission terminal 10*db* is displayed.

The display screen pages I and II shown in FIG. 21 show, for comparison, a case where, as the display data, the entire area is shared (I) and a case where the area A is shared (II). Each of the users "aa" and "db" can freely select either the entire area or any of the areas A and B to be displayed.

[Control of Sharing Display Data]

FIG. 22A shows one example of a desktop screen page displayed on the external input apparatus 40*aa*. In the external input apparatus 40*aa*, the program for an external input apparatus is installed. Normally or in response to a user's predetermined operation, a sharing setting reception button 301 is displayed at a bottom right part in the desktop screen page, for example. The predetermined operation can be, for example, such that when a user clicks or double-clicks an icon of the program for an external input apparatus, or the user points a cursor (mouse overs) to the icon.

FIGS. 22B and 22C show the sharing setting reception button 301 in a magnified manner. In FIG. 22B, the sharing setting reception button 301 in which the characters "START SHARING" are displayed is shown. In FIG. 22C, the sharing setting reception button 301 in which the characters "STOP SHARING" are displayed is shown. When a user clicks the sharing setting reception button 301 by a pointing device in FIG. 22B, sharing of the display data displayed on the display device 216*aa* of the external input apparatus 40*aa* is started. Specifically, the operation input reception part 46 in the external input apparatus 40*aa* receives the click operation on the sharing setting reception button 301 and the transmission and reception part 41 transmits a delivery request to the transmission terminal 10*aa*. The transmission and reception part 11 in the transmission terminal 10*aa* then sends information of a delivery event to the relay apparatus 30.

As a result, the relay apparatus 30 sends information of a delivery event such that display data transmitted by the external input apparatus 40*aa* is shared by all the transmission terminals. The transmission terminals 10 that receive the information display the display data together with the image data as shown in FIG. 21.

In a state where the display data displayed on the display device 216*aa* of the external input apparatus 40*aa* is shared, the sharing setting reception button 301 of FIG. 22C is displayed. In FIG. 22C, when the user clicks the sharing setting reception button 301 by the pointing device, the sharing of the display data with the transmission terminal 10*db* is stopped. Note that the display data thus shared until then is one displayed on the display device 216*aa* of the external input apparatus 40*aa*. Specifically, the operation input reception part 46 in the external input apparatus 40*aa* receives the click operation on the sharing setting reception button 301 and the transmission and reception part 41 sends a delivery stop request to the transmission terminal 10*aa*. The transmission and reception part 11 in the transmission terminal 10*aa* then sends information of a delivery event (to stop) to the relay apparatus 30. As a result, the relay apparatus 30 sends information of a delivery event such as to stop sharing of the display data transmitted from the external input apparatus 40*aa* to all of the transmission terminals. The transmission terminal 10*db* that receives the information returns the screen page to the layout that is used before entering a "display data sharing mode" described later (as a result, no display data is displayed and one or more sets of image data are displayed). The transmission terminal 10*aa* also returns the screen page to the layout that is used before entering the display data sharing mode in the same way. Note that, due to the delivery event (to stop), the transmission terminal 10*aa* stops transmitting the display data and the relay apparatus 30 stops delivering the display data.

Note that, in the transmission system 1 according to the present embodiment, a configuration is provided such that the display data of the entire area or of an area of the external input apparatus 40 having the sharing setting reception button 301 of "START SHARING" finally clicked is shared. Therefore, when the user "db" clicks the sharing setting reception button 301 having "START SHARING" displayed as shown in FIG. 22B, the sharing of the display data displayed on the display device 216 of the external input apparatus 40*aa* is automatically stopped even when the user "aa" does not click the sharing setting reception button 301 having "STOP SHARING" displayed as shown in FIG. 22C.

[Examples of Screen Page Displayed by Transmission Terminal]

The layout in the screen page displayed on the display device 120 by the transmission terminal 10 is changeable. For example, the layout changes according to the following modes:

Multi-view mode (the image of another participant is displayed in a main area, and the images of the remaining bases (including the own base) are displayed at right, bottom and left areas in a smaller size)

P and P mode (the participating bases including the own base are arranged in the same size)

Full screen mode

Display data sharing mode (switched according to a start or a stop of sharing display data)

Figure 23A:
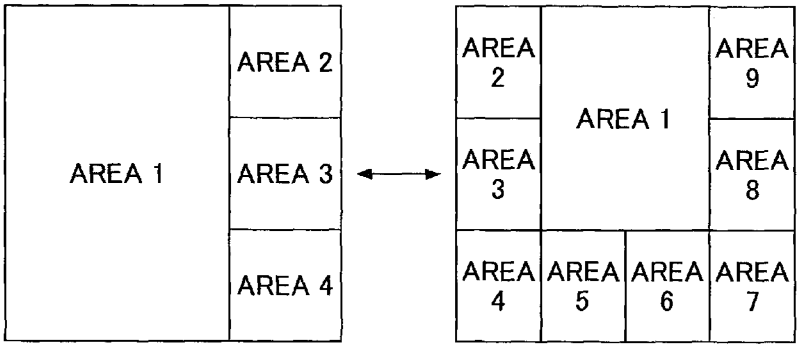
FIGS. 23A, 23B and 23C show examples of layouts of respective display screen pages.
Figure 23B:
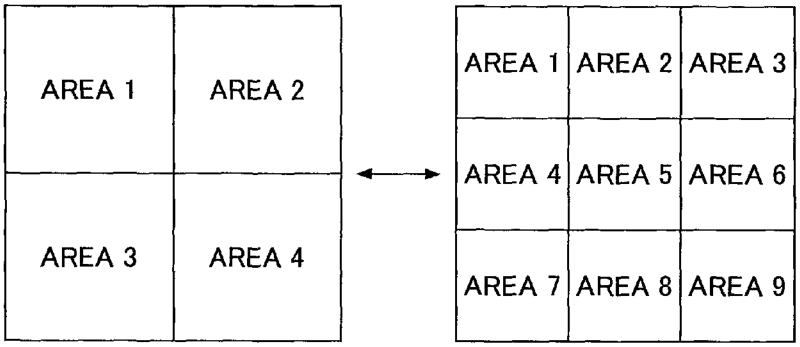
Figure 23C:
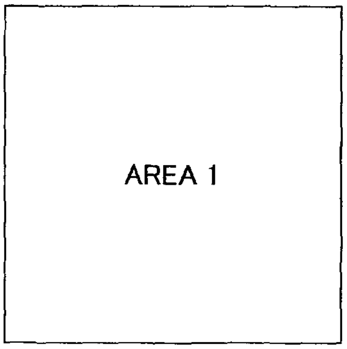

FIGS. 23A, 23B and 23C show examples of the respective layouts of a display screen page. FIG. 23A shows a layout of the multi-view mode, FIG. 23B shows a layout of the P and P mode and FIG. 23C shows a layout of the full screen mode. A user can select the layout of a display screen page.

In the display data sharing mode, in the same manner as the multi-view mode, display data is placed in a main area and the images of the remaining bases are displayed in a smaller size at right, bottom and left areas. Also in the display data sharing mode, the user can display the display data in full screen or display the display data in the same size as the image data.

The maximum number of the participating transmission terminals 10 is limited by the network band, the transmission management system, the specification of the relay apparatus 30 and/or the like. Also, the maximum number of areas displayable at a time by each transmission terminal is limited by the specification of the transmission terminal and/or the like. However, the practically sufficient maximum number of the participating transmission terminals 10 and the practically sufficient maximum number of areas displayable at a time by each transmission terminal are ensured. Here, description will be made for a case where the number of bases is less than the number of areas displayable at a time. The display image determination part 17 determines the following correspondence between areas and image data or display data.

Multi-View Mode

The display image determination part 17 determines that, for example, image data or display data of the transmission terminal having the greatest volume of sound data is displayed in area 1. Thereby, it is possible to display, in the greatest size, the image data of the transmission terminal used by the user who is speaking.

As to the areas having the equal sizes (areas 2 to 4 or areas 2 to 9), the display image determination part 17 allocates the areas to the transmission terminals, for example, in the order of participation in the conference. Thereby, the areas are filled from the top or from an end, and the user can easily confirm the respective participants.

Note that a previously determined area is allocated to the image data of the own base, from among areas 2 to 4 or areas 2 to 9 (for example, the bottom right area 4 or 7).

P and P Mode

As to the areas having the equal sizes (areas 1 to 4 or areas 1 to 9), the display image determination part 17 allocates the areas to the transmission terminals in the order to participating in the conference, for example. Further, as to area 1, it is possible to determine to display in area 1 the image data of the transmission terminal having the greatest volume of sound data. In this case, it is possible to display the image data of the transmission terminal used by the user who is speaking although the sizes of the areas are equal to each other. The previously determined area (area 4 or 9), for example, the bottom right area, is allocated to the image data of the own base.

Full Screen Mode

The display image determination part 17 determines to display, for example, the image data of the transmission terminal having the greatest volume of sound data in area 1.

Display Data Sharing Mode

The display image determination part 17 determines to display the display data in the greatest area 1 (although not shown, area 1 in the multi-view mode, for example). As to the other areas, the display image determination part 17 allocates the areas to the respective sets of image data of the transmission terminals in the order of participating in the conference, for example.

Note that, in any mode, the correspondence between the areas and the bases once determined by the display image determination part 17 needs not be fixed. For example, a user can allocate the image data or display data transmitted by any base to any area.

[Creation of Arrangement Information Management Table]

Figure 24:
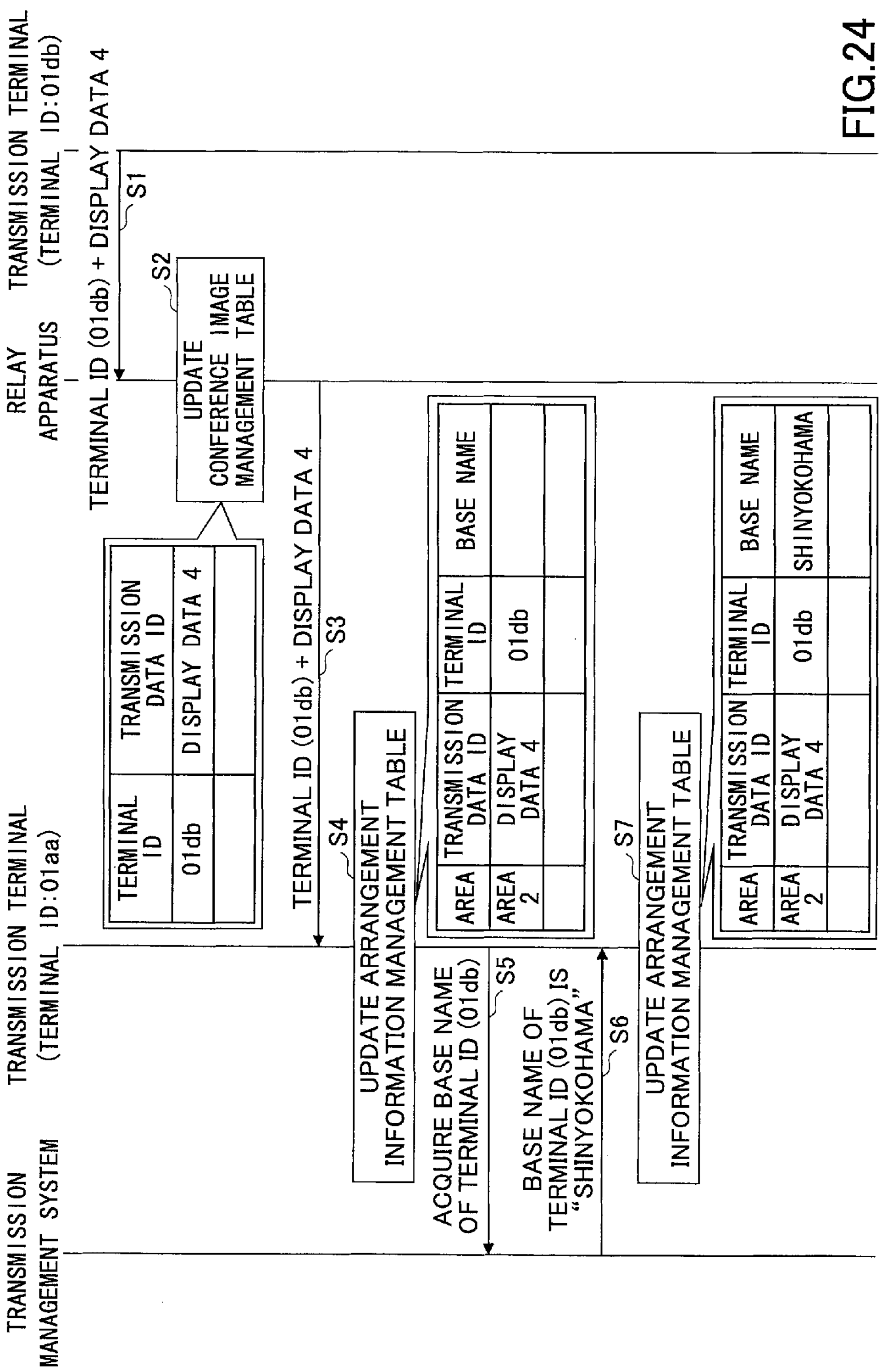
FIG. 24 is one example of a sequence diagram showing a procedure of creating the arrangement information management table by the arrangement information management table updating part.

FIG. 24 is one example of a sequence diagram showing a procedure of creating the arrangement information management table by the arrangement information management table updating part 22. As mentioned above, the arrangement of image data or display data is determined according to the arrangement information management table and the layout. Note that, here, it is assumed that a session is already established between two or more transmission terminals 10*aa* and 10*db*.

S1: The transmission terminal "01db" transmits image data or the display data (in FIG. 24, display data 4) via the relay apparatus 30. Information as to whether only image data is transmitted or image data and display data are transmitted from the transmission terminal "01db" to the relay apparatus 30 is sent to the relay apparatus 30 by the above-mentioned delivery event. The relay apparatus 30 delivers image data to all the transmission terminals for which the session is established, and also, delivers, if necessary according to the delivery event, display data to all the transmission terminals for which the session is established.

S2: When newly receiving image data or display data, the relay apparatus 30 updates the conference image management table. When receiving image data, the relay apparatus 30 gives a transmission data ID to the image data transmitted by the transmission terminal "01db".

S3: The relay apparatus 30 transmits the terminal ID and the display data to which the transmission data ID, i.e., "display data 4", is given to all the transmission terminals 10, including the transmission terminal "01aa", for which the session is established.

S4: The arrangement information management table updating part 22 in the transmission terminal "01aa" updates the arrangement information management table. Since the display image determination part 17 determines an area to which image data or display data is allocated, respective values are registered in "AREA", "TRANSMISSION DATA ID" and "TERMINAL ID" in the arrangement information management table.

S5: The base name acquisition part 21 requests the base name associated with the terminal ID "01db" from the base name management table (corresponding to an "information storage area"), the transmission management system has, corresponding to the transmission source of the terminal ID "01aa". It is also possible that the base name management table itself corresponding to the transmission source of the terminal ID "01aa" is previously downloaded at the timing of step S5 or at an earlier timing from the transmission management system.

S6: The base name acquisition part 21 acquires, for example, the base name "Shinyokohama" from the transmission management system.

S7: The arrangement information management table updating part 22 uses the base name and updates the arrangement information management table. That is, the arrangement information management table updating part 22 registers "Shinyokohama" as "BASE NAME" in the arrangement information management table.

These processes are repeated also for the other transmission terminals for which the session is established. Thereby, the areas to which all the transmission terminals for which the session is established are allocated, the terminal IDs, the transmission data IDs and the base names are registered in the arrangement information management table.

Thus, when a conference starts and the relay apparatus 30 delivers the terminal ID and the display data to which the transmission data ID "display data 4" is given to the transmission terminal 10*aa*, the transmission terminal 10*aa* can determine the base name based on the terminal ID or the transmission data ID "display data 4" and synthesize the display data with the base name "Shinyokohama".

As a result of the transmission terminal 10*aa* having the arrangement information management table, it is possible to considerably reduce a delay in comparison to querying the transmission management system each time when the transmission terminal 10*aa* synthesizes image data or display data with a base name.

Note that it is also possible that the transmission terminal 10 constantly has the arrangement information management table. However, the transmission data ID is given by the relay apparatus 30 dynamically, and therefore, the correspondence between the transmission data ID and the terminal ID may be changed. Further, the correspondence between the area and the terminal ID is dynamically changed. Therefore, it is preferable that, according to the present embodiment, the transmission terminal 10 creates the arrangement information management table when a conference is started.

Note that, in this sequence diagram, a procedure of acquiring the base name of the own base is not clearly seen. However, the base name of the own base is previously acquired from the transmission management system when the transmission terminal is started. Alternatively, it is also possible that, for the own base, a base name (for example, "BASE Name") is previously set in the transmission terminal and is displayed without being acquired from the transmission management system. Further, it is also possible that the base name is not displayed in the area in which image data or display data of the own base is displayed.

[Display Examples of Base Name]

Figure 25:
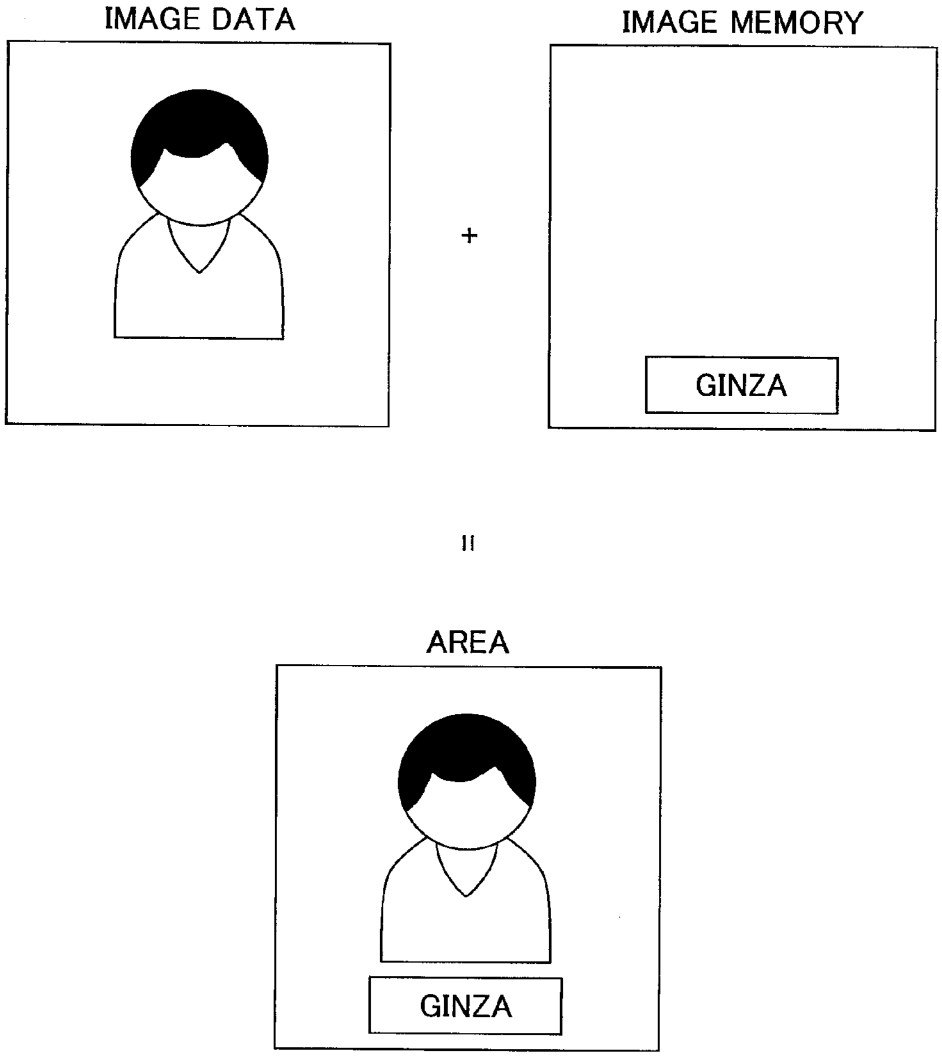
FIG. 25 schematically illustrates one example of synthesizing a base name.

FIG. 25 schematically illustrates one example of synthesizing a base name. FIG. 25 shows image data in one area of a display screen page. The base name synthesizing part 23 synthesizes, by carrying out pixel calculation, a base name with image data that is compressed according to H264/SVC or the like or display data that is transmitted in JPEG or BMP. For example, pixel value data in which a base name is rendered is prepared in an image memory having the same size as image data or display data. Note that such an image memory can be called a "layer" in some cases. The base name synthesizing part 23 overwrites (replaces) the pixel values in the image data or display data corresponding to the base name by the pixel values in the image memory.

Instead of overwriting, it is also possible to add or subtract the pixel values. Further, it is also possible to average the pixel values in the image data corresponding to the base name and the pixel values in the image memory to generate a semi-transparent base name, and superposes the semi-transparent base name on the image data. In FIG. 25, image data is used as an example. However, the method of synthesizing is the same also for a case of display data.

Figure 26A:
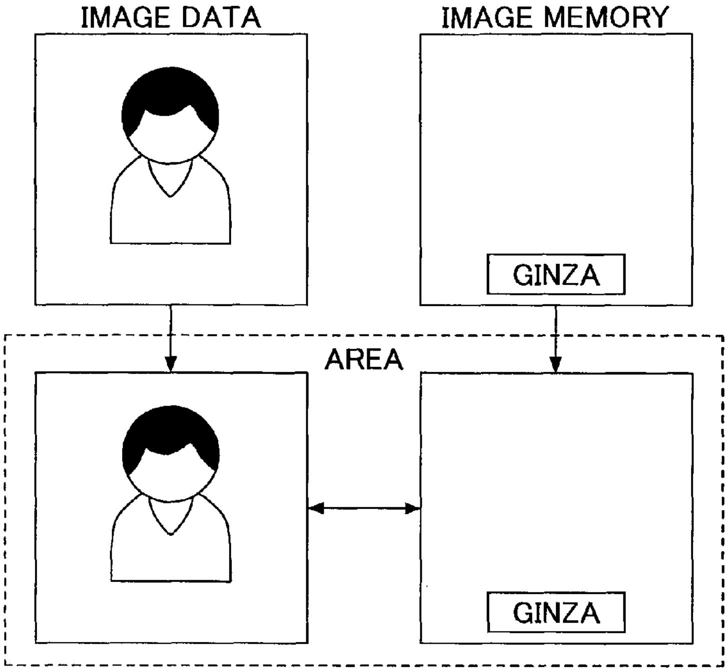
FIGS. 26A and 26B show examples of a screen page displayed on the display device of each terminal.

It is also possible that a base name is not synthesized with image data and is displayed. FIG. 26A shows one example of a base name displayed on the display device 120 of each transmission terminal 10. In the image memory, a base name is rendered. When the image display control part 14*b* displays image data, the base name synthesizing part 23 requests the image display control part 14*b* to display the base name of the image memory in a temporally alternating manner at a predetermined temporal rate, for example. For example, it is possible to display the image data and the base name in the same area in a time-sharing manner by requesting to display the base name for one second after displaying the image data for ten seconds, for example. In this case, since it is possible to omit a process of synthesizing or the like, it is possible to reduce the processing load.

Figure 26B:
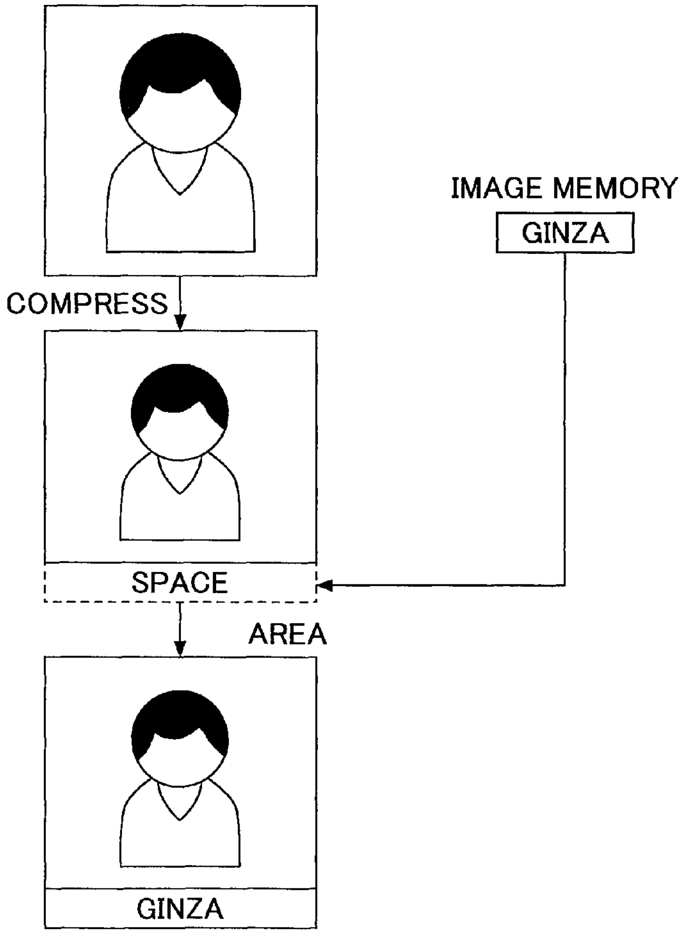

It is also possible that, as shown in FIG. 26B, a base name is displayed in a space created as a result of compressing image data. Although the base name is rendered in the image memory, the size of image data of the base name can be smallest possible as long as it can be displayed.

The base name synthesizing part 23 vertically compresses the image data transmitted by the transmission terminal to create a space to be able to display the base name. Then, the base name synthesizing part 23 places image data of the base name in the space to create a page of image data. Thus, it is possible to display the base name to be associated with the image data even without carrying out a process of synthesizing.

Figure 27A:
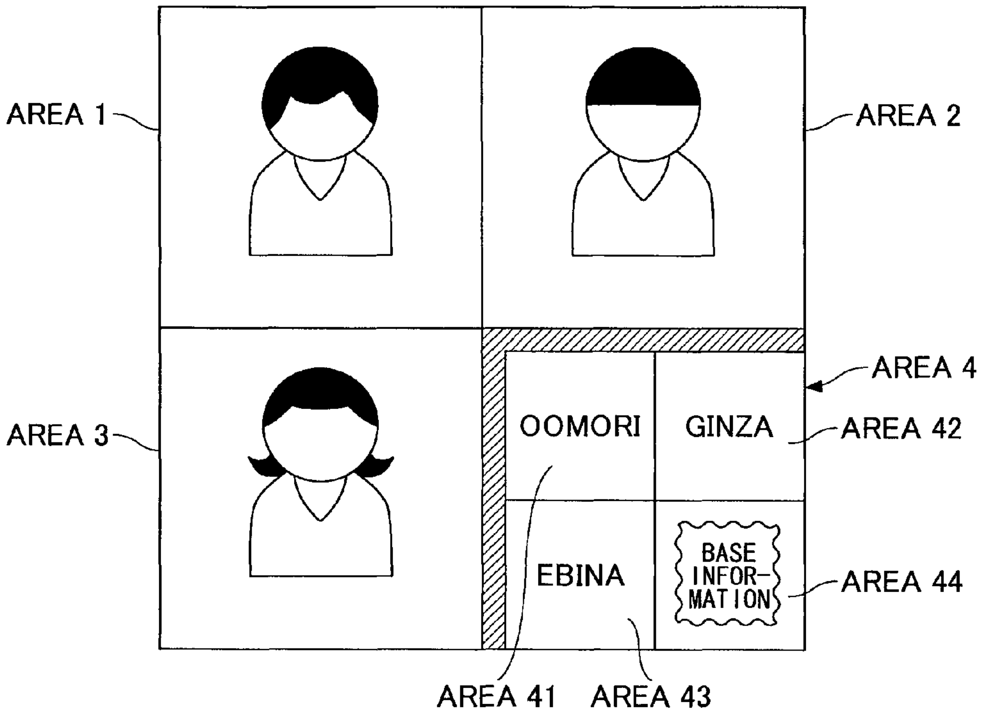
FIGS. 27A and 27B show examples of a screen page in which base names and image data are displayed separately.

Further, it is also possible that a base name and image data are not displayed in the same area. FIG. 27A shows one example of a display screen page where base names and image data are displayed separately. In FIG. 27A, respective sets of image data are displayed in three of the four areas 1 to 4. In such a case, the base name synthesizing part 23 displays the base names of the three areas 1 to 3 collectively in area 4. At this, time, the base name synthesizing part 23 divides area 4 in the same layout as areas 1 to 3 (in a similar figure), generates areas 41 to 44, displays the base name of area 1 in the area 41 corresponding to area 1, displays the base name of area 2 in the area 42 corresponding to area 2 and displays the base name of area 3 in the area 43 corresponding to area 3. By displaying the base names in this way, it is possible to display the respective sets of image data of areas 1 to 3 without overlapping the base names therewith.

Figure 27B:
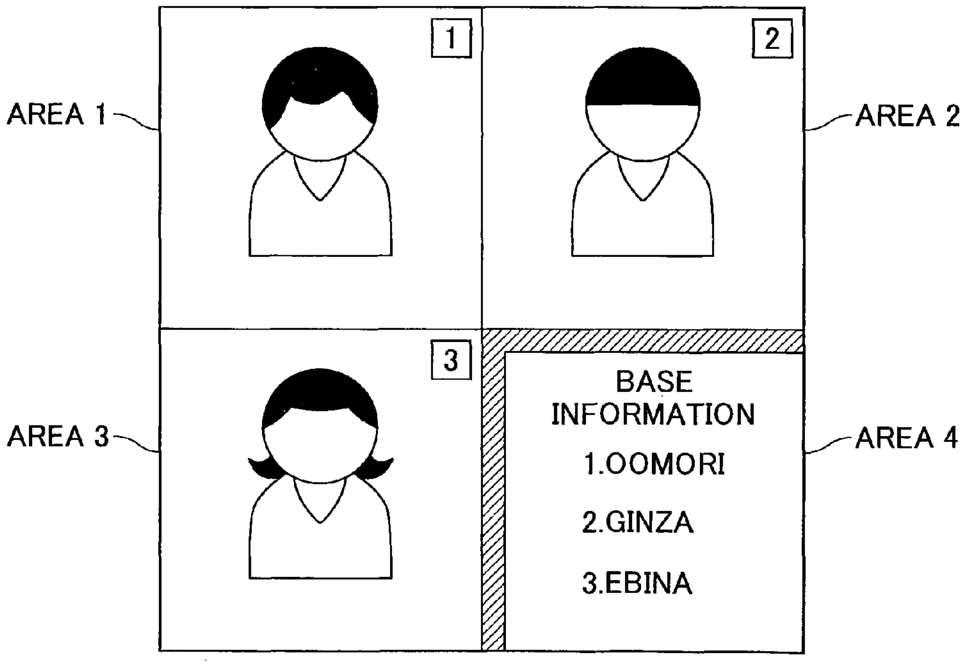

Further, it is also possible that, as shown in FIG. 27B, the areas and the base names are associated with each other by using numbers or the like. In this case, the image display control part 14*b* displays, in each area, identification information such as a numeral, an alphabetic character, a symbol or the like, not in duplication with each other. The base name synthesizing part 23 displays, at a certain position in the display screen page, each base name associated with the corresponding identification information. Also in this case, it is possible to display the respective sets of image data of areas 1 to 3 without overlapping the base names therewith.

Figure 28A:
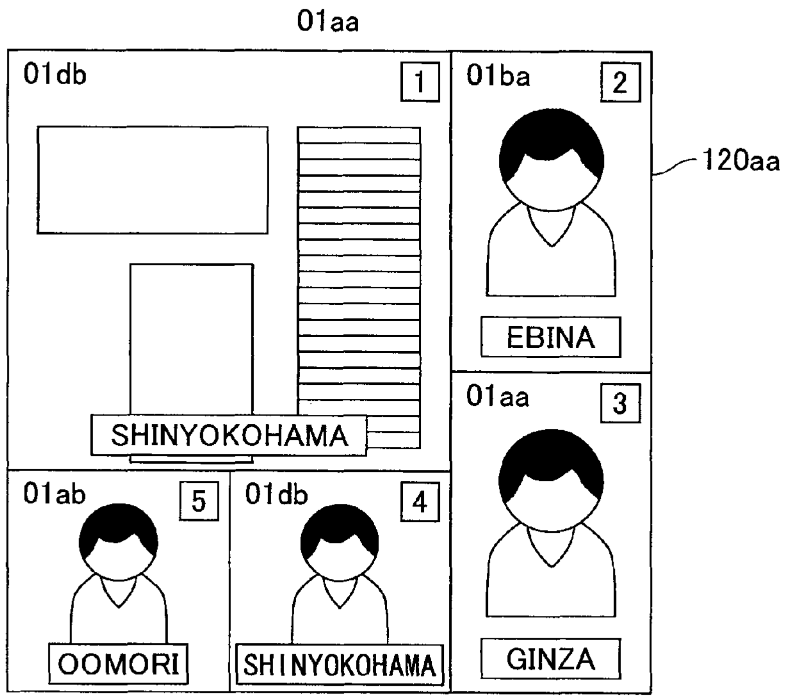
FIGS. 28A and 28B show examples of a display screen page displayed on the display device of each transmission terminal.
Figure 28B:
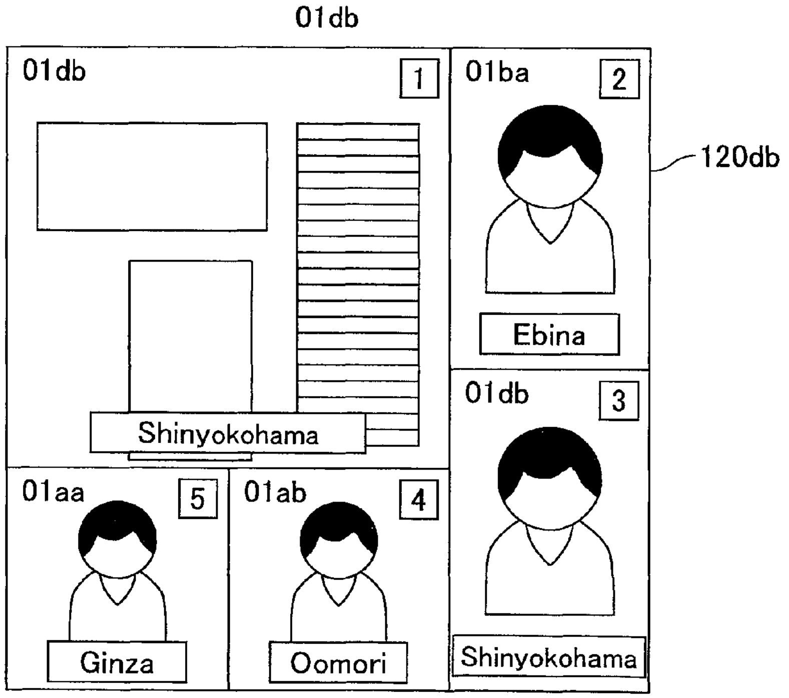

FIGS. 28A and 28B show examples of a display screen page displayed on the display device 120 of each transmission terminal. The base name synthesizing part 23 in each transmission terminal 10 reads the dedicated arrangement information management table, and synthesizes base names with respective sets of image data or display data. FIGS. 28A and 28B show examples of a layout of the display data sharing mode similar to the multi-view mode.

FIG. 28A shows a display screen page at the transmission terminal having the terminal ID "01aa" and FIG. 28B shows a display screen page at the transmission terminal having the terminal ID "01db". At any terminal, the image data of the own base is displayed in area 3 (bottom right).

The other transmission terminals (for example, those having the terminal IDs "01ba" and "01db") with which the transmission terminals having the terminal IDs "01aa" and "01db" hold a conference are the same between the transmission terminals having the terminal IDs "01aa" and "01db". Therefore, the respective sets of image data of the terminal IDs "01aa", "01ab", "01ba" and "01db" are displayed at either one of the transmission terminals having the terminal IDs "01aa" and "01db". However, on the display device 120 of the transmission terminal having the terminal ID "01aa" shown in FIG. 28A, the base names are displayed in capital letters, whereas, on the display device 120 of the transmission terminal having the terminal ID "01db" shown in FIG. 28B, each base name is displayed in such a manner that only the first letter is capitalized.

Thus, it is possible to change (a style of displaying) the base names of the transmission terminals 10 for each user of the transmission terminal. Further, it is also possible that a user freely changes (a style of displaying) the base names of the transmission terminals 10 and registers the changed result in the transmission management system.

In this regard, FIGS. 28A and 28B show examples where the base names are displayed in roman letters ("romaji") of the respective Japanese city names. It is also possible to display these base names in Chinese characters ("Kanji"), for example. In this case, in FIG. 28A, "SHINYOKOHAMA" is replaced by "新横浜" in area 1; "EBINA" is replaced by "海老名" in area 2; "GINZA" is replaced by "銀座" in area 3; "SHINYOKOHAMA" is replaced by "新横浜" in area 4; and "OOMORI" is replaced by "大森" in area 5.

[Overlap of Base Name and Display Data]

By displaying a base name and an area in a manner of associating them with one another as in FIG. 26A and FIGS. 28A and 28B, the correspondence between image data or display data and the corresponding base name is quite obvious. However, such a situation may occur that, as a result of the base name overlapping with the display data, the user cannot read a necessary part in the display data. FIGS. 28A and 28B show the example of the multi-view mode. However, also in the full screen mode, the relative positional relationship and relative size relationship between display data and the corresponding base name are approximately the same. Therefore, the same situation where the base name overlaps with the display data can occur.

By using the displaying way such as that shown in FIG. 26B while associating the base name with the area, the base name does not overlap with image data or display data. However, in the configuration of FIG. 26B, image data or display data may be distorted. Further, by using the displaying way such as that shown in FIG. 27A or 27B while associating the base names with the areas, the base names do not overlap with image data or display data. However, a space for displaying the base names is separately needed.

Therefore, according to the present embodiment, a display method for avoiding overlap between display data and the corresponding base name will now be described. Note that there is no intention to exclude the display methods of FIG. 26B, FIGS. 27A and 27B, and so forth. It is also possible to use the display methods of FIG. 26B, FIGS. 27A and 27B, and so forth while associating the base names with the areas. Further, below, avoiding overlap between display data and the corresponding base name will be described. However, not only avoiding overlap between display data and the corresponding base name but also avoiding overlap between image data and the corresponding base name can be achieved in the same way.

[Deletion of Base Name No. 1]

Figure 29A:
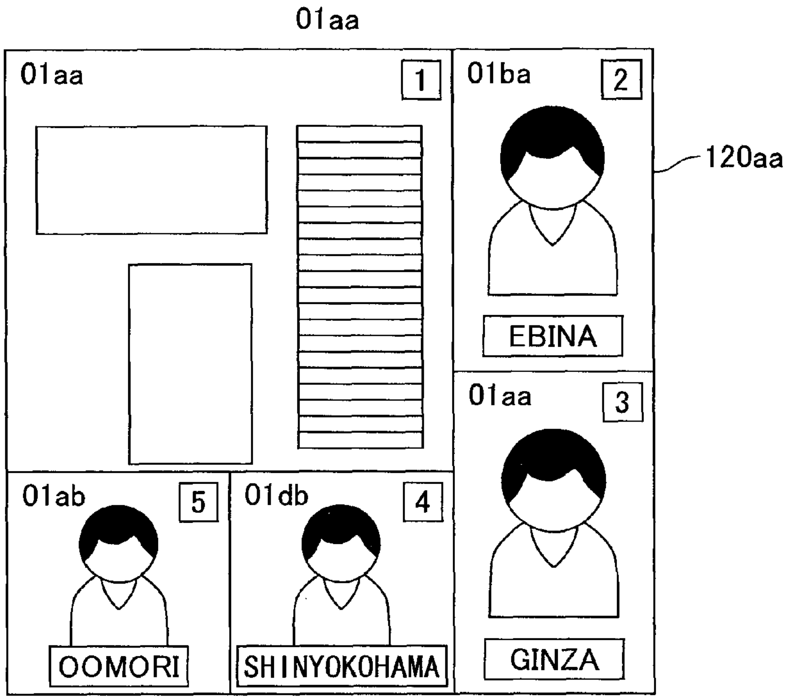
FIGS. 29A and 29B show examples of a display screen page in which base names are removed from display data.
Figure 29B:
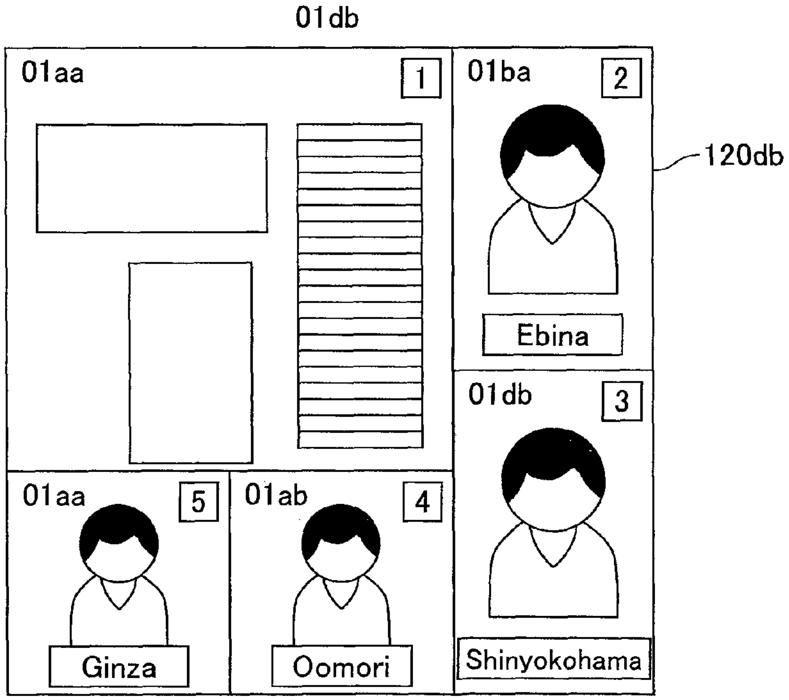

FIGS. 29A and 29B show examples of a display screen page in which base names are removed from display data. In FIG. 29A, in the display data sharing mode, respective sets of image data of four bases and one set of display data are displayed in a display screen page on the display device 120*aa*. Because the user of the transmission terminal 10*aa* in Ginza as a base starts sharing the display data, the display data of the external input apparatus 40*aa* is shared, and is displayed in area 1 of the display device 120*aa*. Also on the display device 120*db* of the transmission terminal 10*db*, the same display data is displayed in area 1 (see FIG. 29B).

However, in FIGS. 29A and 29B, the base name is not displayed in the display data. Therefore, the users who participate in the conference can see the material (shown in the display data of area 1) while the material is not blocked by the base name.

Figure 30:
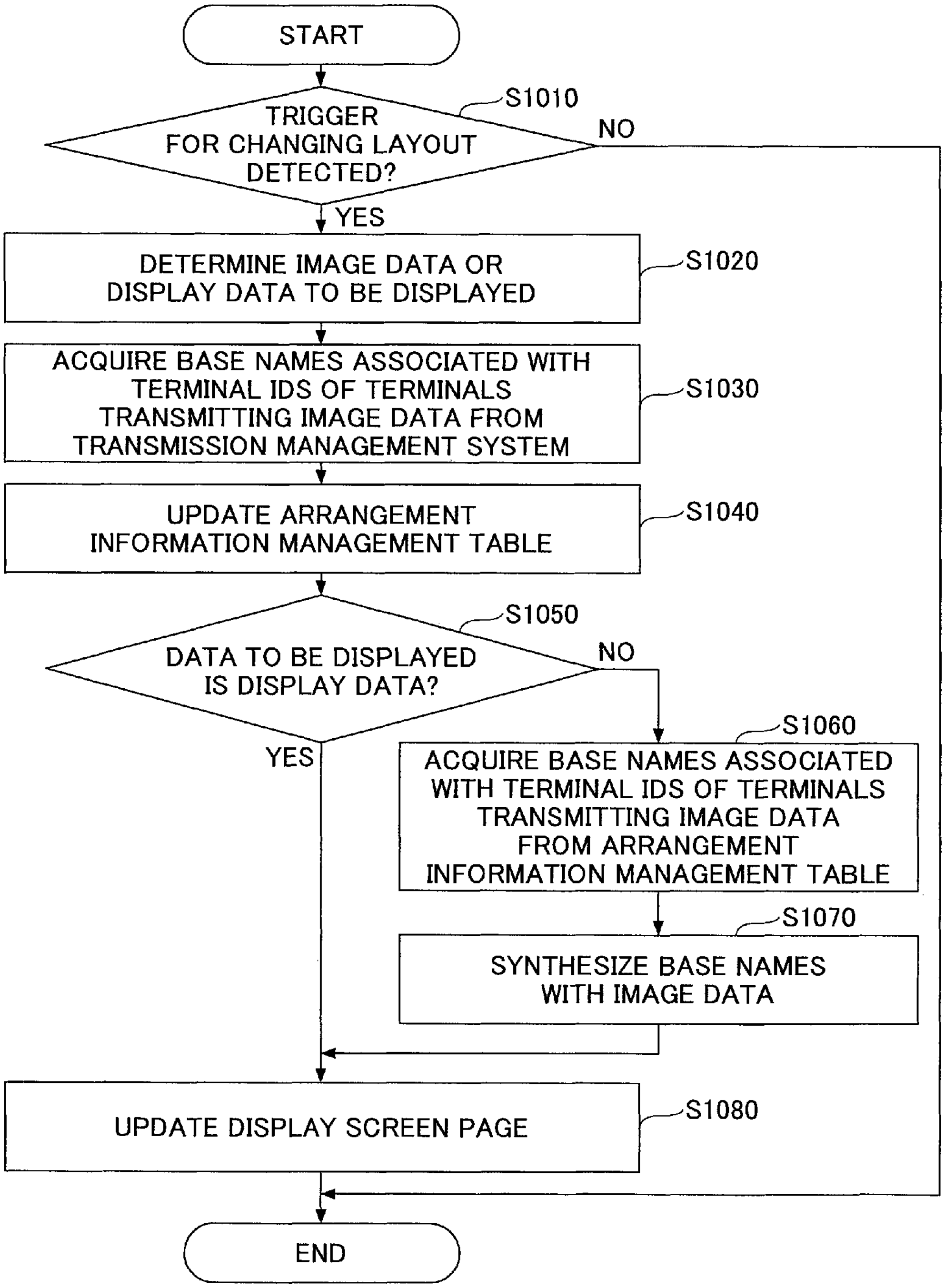
FIG. 30 is one example of a flowchart showing a procedure of displaying a screen page by an image display control part.

FIG. 30 is one example of a flowchart showing a procedure of displaying a screen page by the image display control part 14*b*. The transmission terminal 10 displays a display screen page in such a manner as to properly associate base names with areas each time when the layout is changed.

First, the arrangement information management table updating part 22 determines whether a trigger for changing the layout is detected (S1010). There can be the following triggers for changing the layout:

a. a case where the user changes the mode;

b. a case where the user performs an operation to share display data;

c. a case where the user performs an operation to finish sharing display data and displaying image data;

d. a case where the number of bases increases; and e. a case where the number of bases is reduced.

The operation of “a” is detected by the operation input reception part 12. The operations of “b” and “c” include operations in a case where the user in the own base performs the operation and a case where the user in another base performs the operation. However, in any case, the relay apparatus 30 sends information of the corresponding delivery event. In the cases of “b” and “c”, as described above using FIG. 24, the relay apparatus 30 sends information of new transmission data ID and terminal ID to each transmission terminal. As to the case of “d”, the detection is carried out by acquiring from the relay apparatus 30 the terminal ID and the transmission data ID of the new base. As to the case of “e”, the detection can be carried out by, for example, detecting disconnection of the session or using the corresponding information sent from the transmission management system 50.

When a trigger for changing the layout is detected (YES in S1010), the display image determination part 17 determines image data or display data to be displayed (S1020).

First, when the mode is changed, the layout of the mode after the change is determined. When the mode after the change is other than the display data sharing mode, it is determined to display one set (in a case of the full screen mode) or the number of sets same as the number of bases (in the range not exceeding the displayable upper limit) of image data. Further, in the display data sharing mode, it is determined to display one set of display data (there is only one set of display data) and the number of sets same as the number of bases (in the range not exceeding the displayable upper limit) of image data. When display data is displayed in full screen, only display data is determined.

The base name acquisition part 21 acquires, from the base name management table associated with the terminal ID of the own base, the base names associated with the terminal IDs of the transmission terminals that transmit the image data or display data thus determined to be displayed (S1030). As mentioned above, the relay apparatus 30 transmits the terminal IDs and the transmission data IDs. Therefore, the terminal IDs of the transmission terminals that transmit the image data or the display data are obvious.

The arrangement information management table updating part 22 updates the arrangement information management table (S1040). That is, the arrangement information management table updating part 22 determines the areas to display the image data or the display data thus determined to be displayed and registers the transmission data IDs, the terminal IDs and the base names while associating them with each other. The method of determining the areas has been mentioned above.

Next, the data type determination part 24 determines, for each record registered in the arrangement information management table, whether data to be displayed is display data (S1050). Whether data is display data can be determined based on the transmission data ID.

In the case of display data (YES in S1050), the process proceeds to step S1080, and thus, the base name is not synthesized with the display data.

In a case of other than display data (NO in S1050), the base name synthesizing part 23 reads, from the arrangement information management table, the base name associated with the terminal ID or the transmission data ID transmitted from the relay apparatus 30 together with the image data (S1060).

Then, the base name synthesizing part 23 synthesizes the base name with the image data for each area (S1070).

The image display control part 14*b* determines the areas of image data and, if any, display data with which the base names are synthesized based on the arrangement information management table, places these areas according to the layout after the change and thus, displays a display screen page on the display device 120 (S1080). That is, the positions of the respective areas are determined based on the layout, reduces sizes or magnifies the image data or display data according to the sizes of the respective areas, and/or the like, and then, places the image data with which the base names are synthesized and the display data in the respective areas.

Thus, by determining in step S1050 whether data to be displayed is display data, it is possible to avoid synthesizing the base name with the display data. Because the arrangement information management table is updated each time when the layout is changed, it is possible to keep the correspondence between the areas and the base names properly even when the layout is changed during the conference.

Figure 31A:
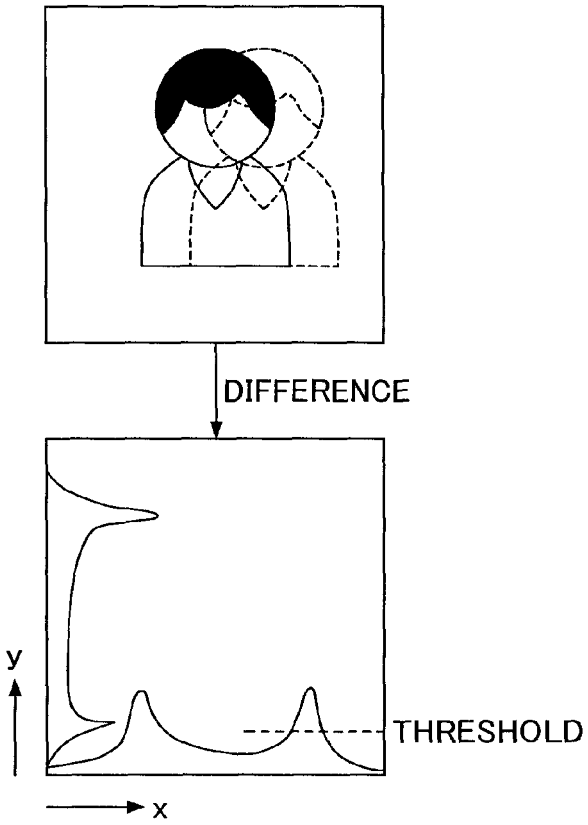
FIGS. 31A and 31B illustrate one example of determining whether given data is display data or image data.
Figure 31B:

Using FIGS. 31A and 31B, the determination in step S1050 will be supplemented. FIG. 31A is one example of a diagram concerning a determination as to whether data is display data. Because it is difficult take a completely static image of a user, the pixel values vary even in the same pixels. Therefore, in comparison to the background, the pixel values of the taken pixels of the user vary, and therefore, the variations in the pixel values are greater in particular on the boundary with the background. In contrast thereto, the variations in the pixel values of display data are small unless the corresponding material is changed or so.

Therefore, the data type determination part 24 carries out differential calculation on data taken in a time-series manner for the same pixels. Thereby, in a case of image data, the differences in the pixel values on the boundary are greater. Then, the calculation results are projected onto the x-axis and the y-axis and are summed up (added together). Because the summed up value becomes greater with time at the x-coordinates and the y-coordinates corresponding to the boundary, it is possible to determine that the data is image data when the summed up value exceeds a threshold.

Further, it is also possible to determine that data is display data by using a fact that display data includes letters/characters in many cases. For example, the data type determination part 24 uses an Optical Character Recognition (OCR) for data, and determines that the data is display data when recognizing the number of characters equal to or greater than a predetermined number.

Further, it is also possible to detect characters themselves as shown in FIG. 31B. For example, connected components of black pixels are extracted after binarization. In a case of a character, an area in which lines are connected together is one connected component. Since characters are separate from each other, it is possible to determine a rectangular area including one character by acquiring a circumscribed rectangle. Generally speaking, when characters are included, the sizes of the characters are fixed, and a plurality of characters are arranged vertically or horizontally. By using this fact, it is possible to assume that data is display data when the number of similar rectangular areas equal to or greater than a predetermined number (or equal to or greater than a predetermined ratio with respect to the total number of the connected components) are arranged horizontally or vertically.

Instead of thus using image processing, it is also possible to use the fact that image data is taken by the camera. To image data taken by a camera, header information is attached such as taken date and time, a compression format, a frame rate and so forth. In contrast thereto, display data is taken by a capture operation, and therefore, no such header information is attached thereto. Therefore, it is possible to determine whether data is image data or display data by determining whether header information is attached thereto.

Further, when the file format is different between image data and display data, it is possible to make the determination using the file extension. For example, when the file format of image data is MOV or MP4, the extension is ".mov" or ".mp4". When display data is transmitted according to JPEG, the extension is ".jpg".

[Deletion of Base Name No. 2]

According to the above-described "deletion of base name No. 1", the base name is not displayed in display data in a display screen page at each transmission terminal. Thereby, when each user pays attention to display data, the users can see the display name without being blocked by the base name during a discussion. However, as to display data not displayed in full screen, the degree of attention paid thereto may be low, and some users may rather wish to know the base name.

Therefore, a method of synthesizing a base name where the base name is not synthesized only when display data is displayed in full screen will now be described.

Figure 32A:
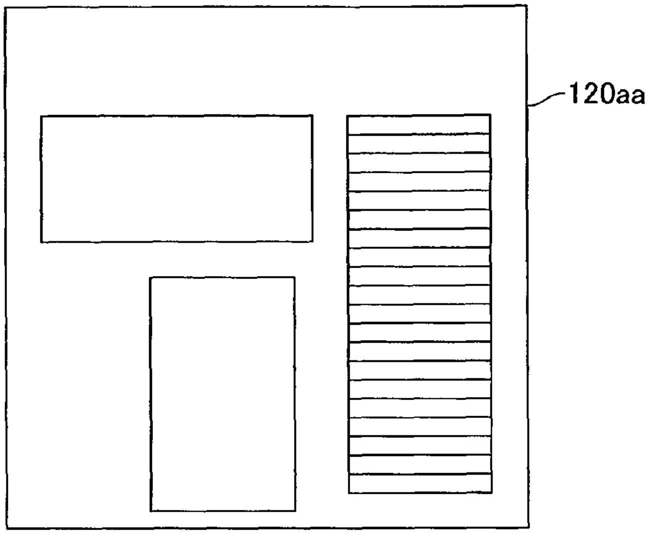
FIGS. 32A, 32B and 32C show examples of displaying base names in a display data sharing mode.
Figure 32B:
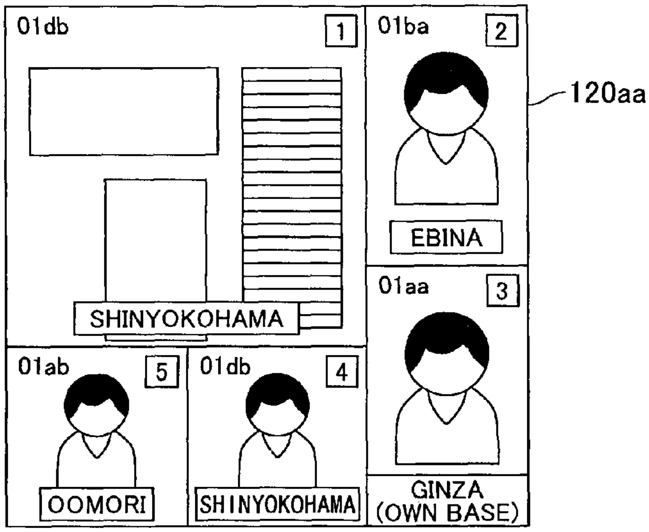
Figure 32C:
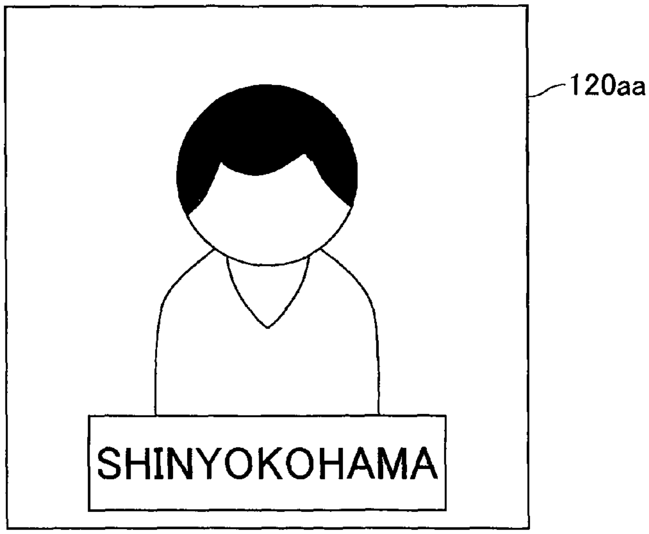

FIGS. 32A, 32B and 32C show examples of displaying or not displaying a base name(s) in the display data sharing mode. FIG. 32A shows a display screen page in which display data is displayed in full screen; FIG. 32B shows a display screen page in which multi-view display is performed in the display data sharing mode; and FIG. 32C shows a display screen page in which image data is displayed in the full screen mode.

In FIG. 32A, the base name is not synthesized with the display data, while, in FIG. 32B, the base name is synthesized with the display data. In the case of FIG. 32A, the user can see the display data in a large size. In the case of FIG. 32B, the user can confirm the base name of the display data. Further, in the case of FIG. 32C, the base name is synthesized with the image data. When the image data is displayed in the full screen mode (FIG. 32C), it is considered that the user regards communication with the other participant as important. In this case, even when the base name is synthesized as shown in FIG. 32C, this does not interfere very much with the communication. Rather, by synthesizing the base name, it is possible to positively understand the base of the other participant.

Figure 33:
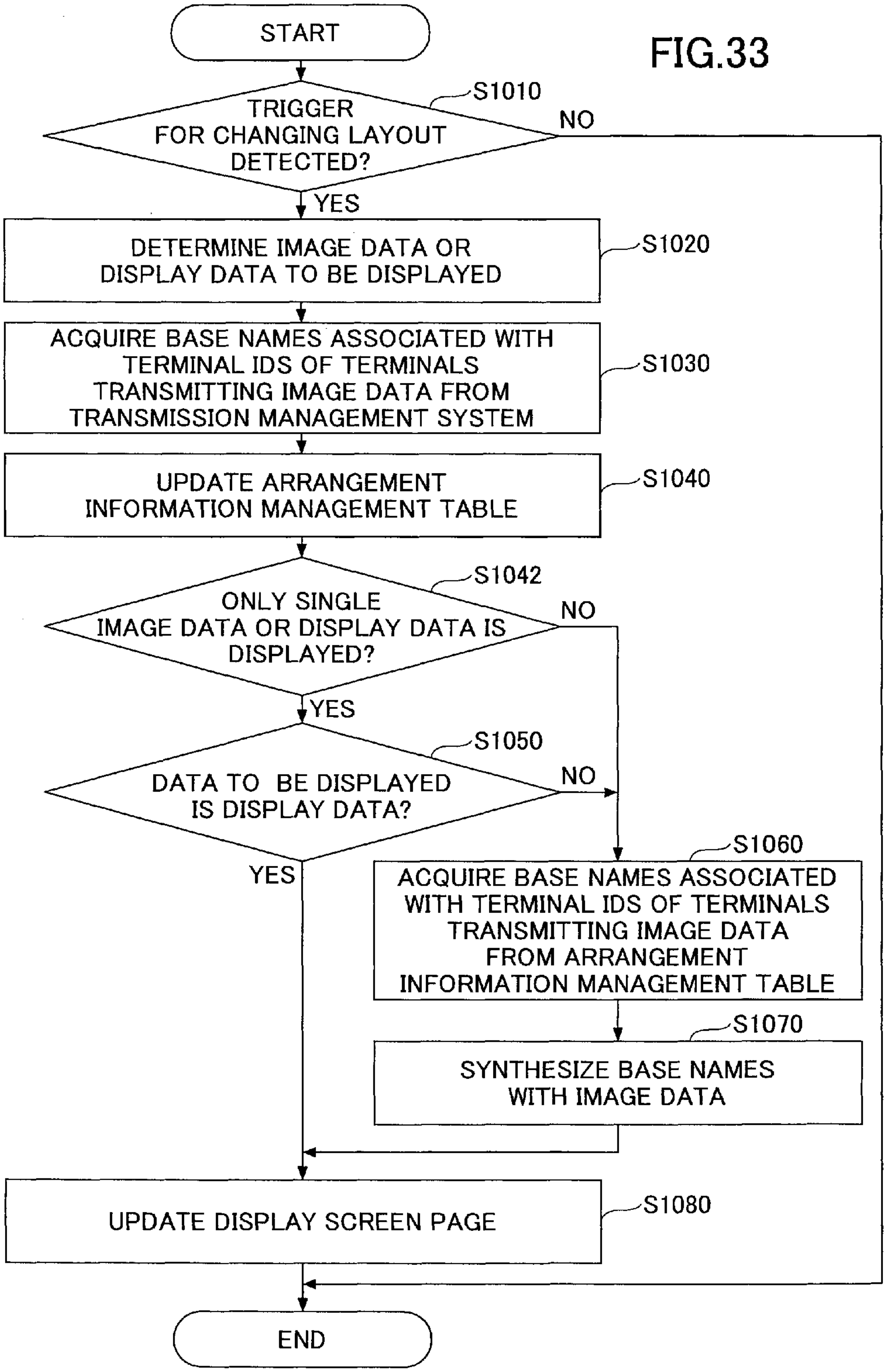
FIG. 33 is one example of a flowchart showing a procedure of displaying a display screen page by the image display control part.

FIG. 33 is one example of a flowchart showing a procedure of displaying a display screen page by the image display control part 14*b*. The processes up to step S1040 are the same as those in FIG. 30.

In step S1040, when the arrangement information management table is updated, the number of records of image data or display data to be displayed in a display screen page are registered in the arrangement information management table.

The number-of-received images determination part 25 determines whether one set of image data or display data only is displayed (S1042). That is, it is determined whether the number of areas (records) registered in the arrangement information management table is one.

When one set of image data or display data only is displayed (YES in S1042), the data type determination part 24 determines whether display data is to be displayed (S1050). When display data is to be displayed, this means that the base name is not synthesized, and therefore, when one set of display data only is displayed, the base name is not synthesized with the display data.

When it is not that one set of image data or display data only is displayed (NO in S1042) or one set of image data only is displayed (NO in S1050), the base name synthesizing part 23 synthesizes the base name with the image data or the display data (S1060, S1070).

Therefore, according to the synthesizing procedure such as that of FIG. 33, it is possible to achieve a way in which a base name is not synthesized only when display data is displayed in full screen.

[Deletion of Base Name No. 3]

In the above-described "deletion of base name No. 2", a base name is not synthesized only when display data is displayed in full screen. However, there can be a case where, when display data displayed in full screen, a user can understand the contents thereof even when they are overlapped somewhat by the base name. On the other hand, when display data is not displayed in full screen, the display data may be difficult to read because the base name is overlapped.

Therefore, a synthesizing method of synthesizing a base name with display data displayed in full screen and not synthesizing a base name with display data not displayed in full screen will now be described.

Figure 34A:
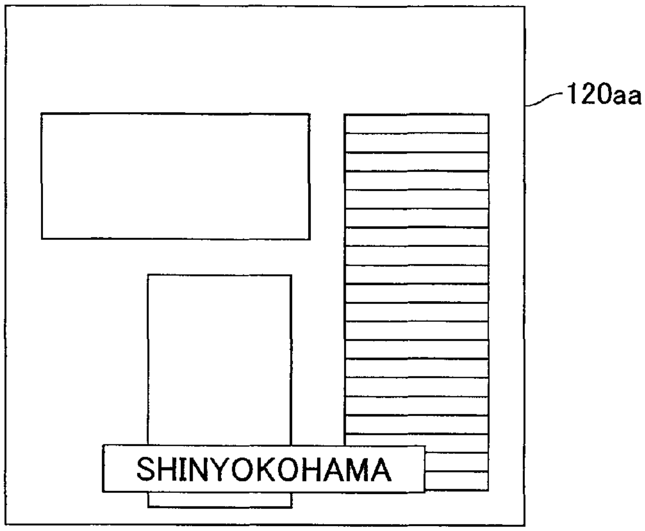
FIGS. 34A, 34B and 34C are examples of displaying base names in the display data sharing mode.
Figure 34B:
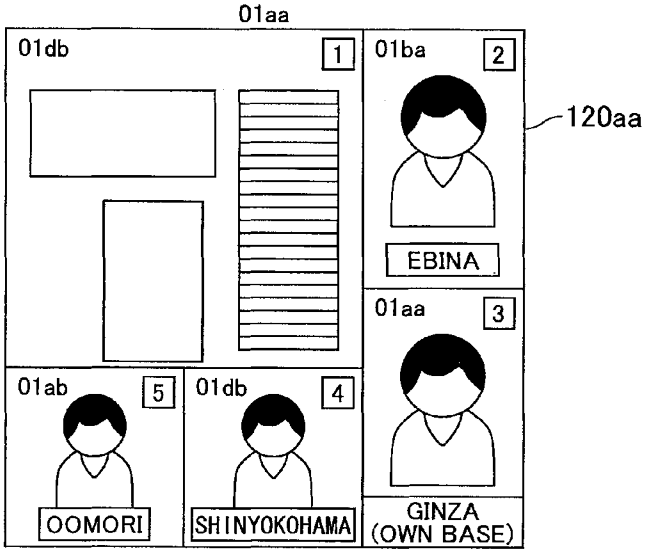
Figure 34C:
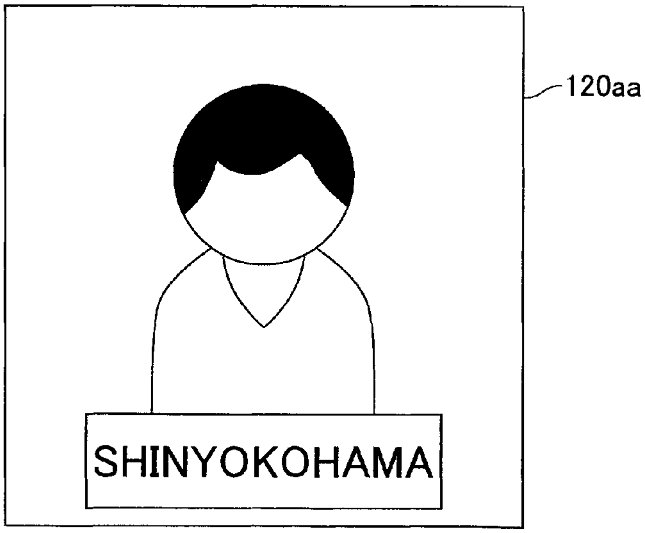

FIGS. 34A, 34B and 34C are examples of displaying or not displaying a base name(s) in the display data sharing mode. FIG. 34A shows a display screen page in which, in the display data sharing mode, display data is displayed in full screen; FIG. 34B shows a display screen page in which, in the display data sharing mode, multi-view display is performed; and FIG. 34C shows a displayed screen mode in which image data is displayed in full screen.

In case of FIG. 34A, a base name is synthesized with display data, while, in FIG. 34B, a base name is not synthesized with display data. In the case of FIG. 34A, the user can see the display data while confirming the base name. In the case of FIG. 34B, the user can see only the display data. As to FIG. 34C, in the same way as FIG. 32C, a base name is synthesized with image data.

Figure 35:
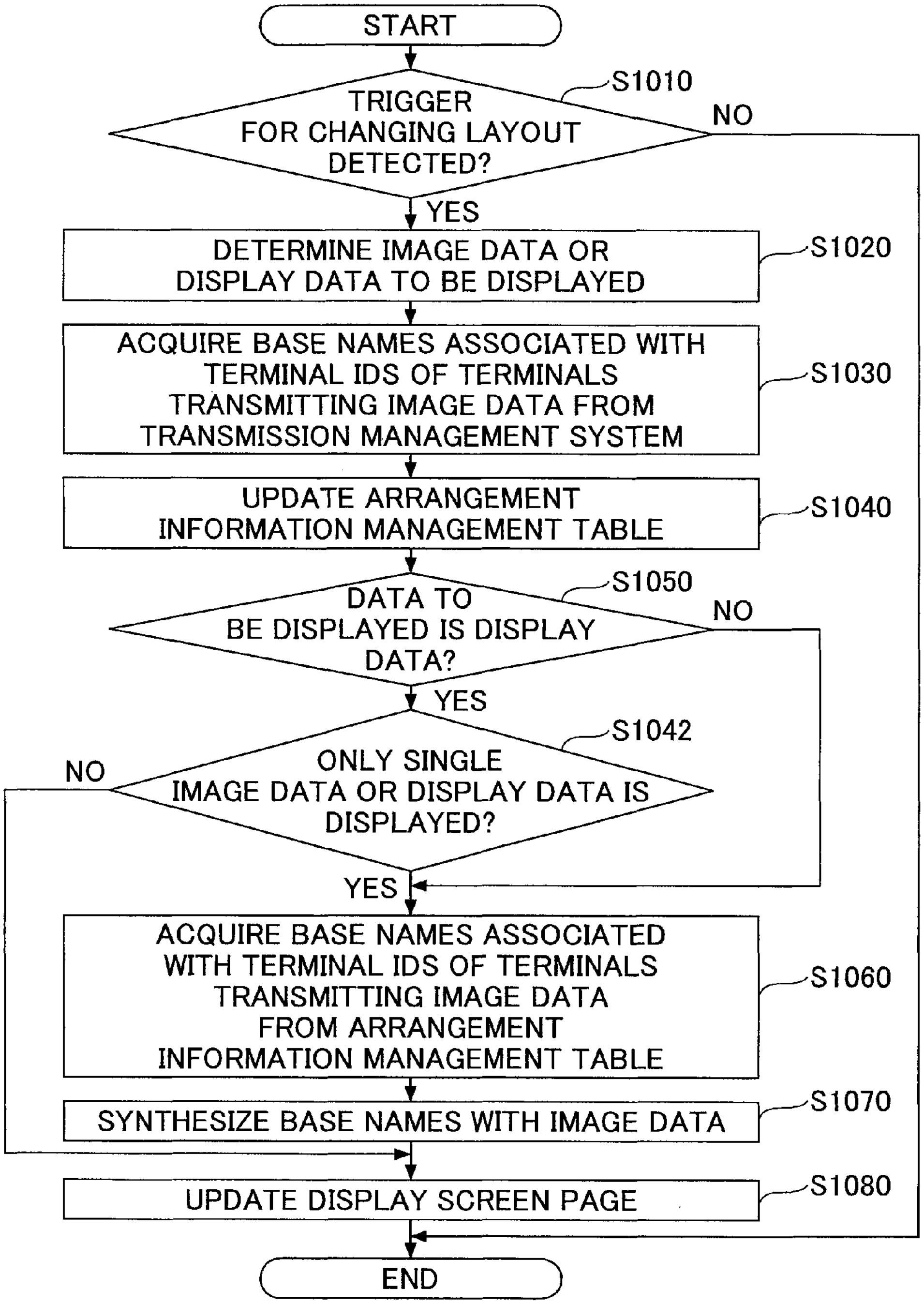
FIG. 35 is one example of a flowchart showing a procedure of displaying a display screen page by the image display control part.

FIG. 35 is one example of a flowchart showing a procedure of displaying a display screen page by the image display control part 14*b*. In the procedure of FIG. 35, the processes up to step S1040 are the same as those in FIG. 33.

In step S1040, when the arrangement information management table is updated, the number of records of image data or display data to be displayed in a display screen page are registered.

The data type determination part 24 determines what is displayed is display data (S1050). When what is displayed is not display data (NO in S1050), the process proceeds to step S1060, and the base name is synthesized with the display data or the image data (S1060, S1070).

When what is displayed is display data (YES in S1050), the number-of-received images determination part 25 determines whether one set of image data or display data only is displayed (S1042). That is, it is determined whether the number of areas (records) registered in the arrangement information management table is one.

When one set of image data or display data only is displayed (YES in S1042), the base name synthesizing part 23 synthesizes the base name with the image data or the display data (S1060, S1070).

When it is not that one set of image data or display data only is displayed (S1042 NO), the base name synthesizing part 23 does not synthesize the base name with display data and the process is finished.

Thus, by the synthesizing procedure such as that of FIG. 35, it is possible that a base name is not synthesized with display data only when the display data is displayed in a layout equivalent to the multi-view mode.

Note that a user can set as to which of the above-mentioned "deletion of base name No. 1" to "deletion of base name No. 3" is used to avoid overlapping a base name with display data in the transmission terminal 10. The setting is stored in the storage part 1000, and the base name synthesizing part 23 reads the setting to switch the method of synthesizing or not synthesizing a base name with display data.

[Deletion of Base Name No. 4]

In the above-mentioned "deletion of base name No. 1" to "deletion of base name No. 3", the base name synthesizing part 23 automatically switches whether a base name is synthesized with display data. However, it is also possible that a user can freely select whether to synthesize a base name with display data.

Figure 36A:
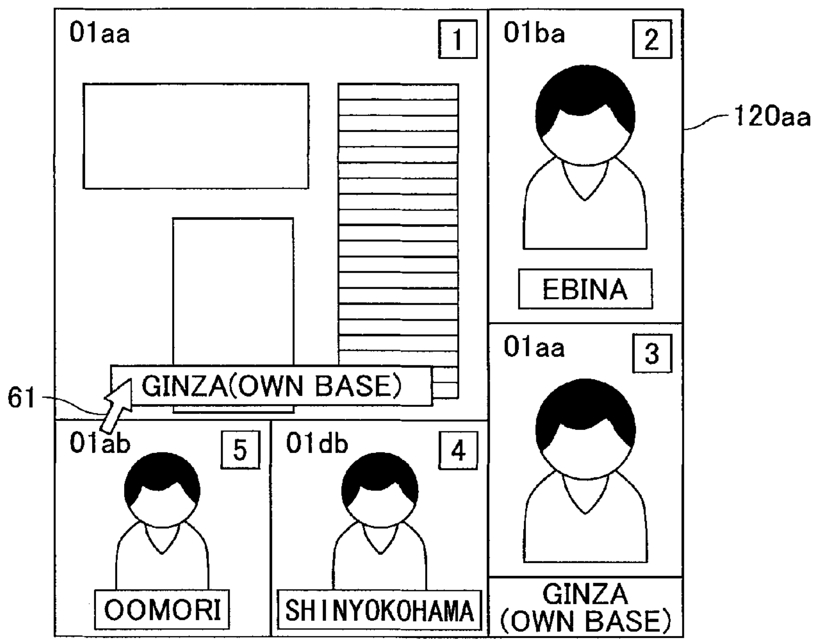
FIGS. 36A and 36B schematically illustrate examples where a user causes a base name to be displayed or not.

FIG. 36A is one example of a diagram schematically illustrating a user's operation to display or not display a base name. A user uses a pointing device 61 such as a mouse or touches a touch panel by a finger to press a base name on a display screen page such as that shown in FIG. 36A. The operation input reception part 12 determines the area from the coordinate of the position at which the user presses. Thereby, the base name synthesizing part 23 can stop synthesizing the base name pressed by the user with the display data (see FIG. 36B). Note that, in the example of FIGS. 36A and 36B, synthesizing a base name with display data is stopped. However, it is also possible to stop synthesizing a base name with image data in the same way.

Figure 36B:
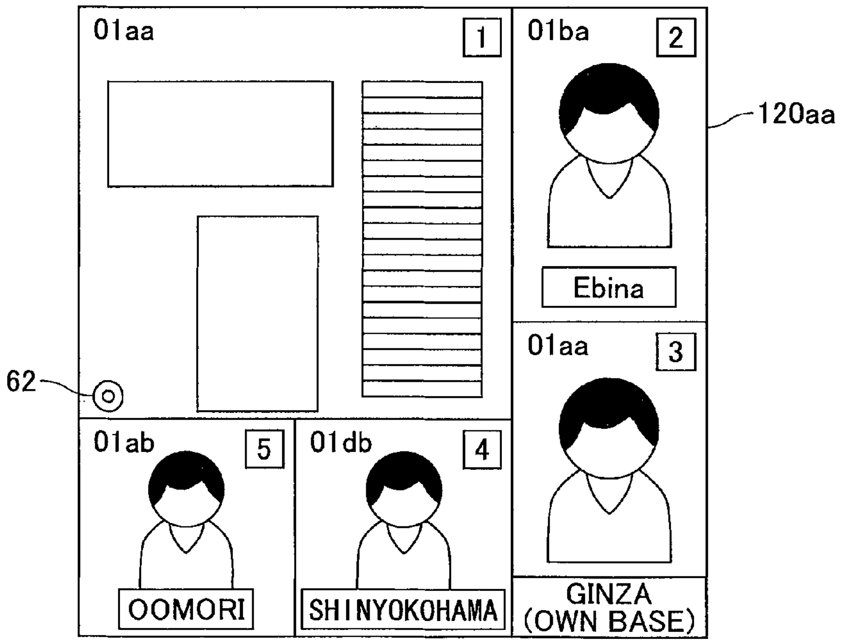

FIG. 36B shows one example of a display screen page in which synthesizing of the base name with the display data is stopped. The base name synthesizing part 23 synthesizes an icon 62 instead of the base name with the display data. The user uses the pointing device 61 or touches a touch panel or the like by a finger to press the icon 62. The operation input reception part 12 determines the area from the coordinate of the position at which the user presses. Thereby, the base name synthesizing part 23 can re-start synthesizing the base name in the area pressed by the user with the display data (see FIG. 36A).

FIG. 37 is one example of a flowchart showing a procedure of displaying a display screen page by the image display control part 14*b*. In the procedure of FIG. 37, the processes up to step S1040 are the same as those in FIG. 33.

In step S1040, when the arrangement information management table is updated, the base name synthesizing part acquires, from the arrangement information management table, the base names associated with the terminal IDs of the transmission terminals that transmit image data or display data (S1060).

Then, the base names are synthesized with the image data or the display data (S1070). Synthesizing the base names is carried out for the respective sets of image data or display data of all the terminal IDs registered in the arrangement information management table.

According to the arrangement information management table, the image display control part 14*b* determines the areas of the respective sets of the image data and the display data with which the base names are synthesized and places the areas according to the changed layout to display the display screen page on the display device 120 (S1080).

During displaying the display screen page, the operation input reception part 12 determines whether pressing a base name is detected (S1110).

When pressing a base name is detected (YES in S1110), the base name synthesizing part 23 stops synthesizing the base name (S1120). That is, the area is determined from the coordinate acquired from the operation input reception part 12, and the terminal ID of the transmission terminal that transmits the image data or display data displayed in the area is determined based on the arrangement information management table. Thereafter, synthesizing the base data with the image data or display data transmitted by the transmission terminal of the terminal ID is stopped.

During displaying the display screen page, the operation input reception part 12 determines whether pressing of the icon 62 is detected (S1130).

When pressing of the icon 62 is detected (YES in S1130), the base name synthesizing part 23 re-starts synthesizing the base name (S1140). That is, the area is determined from the coordinate acquired from the operation input reception part 12, and the terminal ID of the transmission terminal that transmits the image data or display data displayed in the area is determined based on the arrangement information management table. Thereafter, it is possible to synthesize the base data with the image data or display data transmitted by the transmission terminal of the terminal ID in steps S1060 and S1070.

According to the above-described process, a user can stop or re-start displaying (synthesizing) a base name with any set of display data or image data.

Note that in the procedure of FIG. 37, displaying or not displaying a base name can be controlled for each area individually. However, it is also possible that a user controls as to whether to synthesize base names for all the areas by selecting one area or base name.

Thus, according to the transmission terminal of the present embodiment, it is possible to avoid a base name displayed by the transmission terminal making it difficult to see display data. Further, it is possible to avoid a base name displayed by the transmission terminal making it difficult to see not only display data but also image data.

Note that, the relay apparatuses 30, the transmission management system 50, the program provisioning system 90 and the maintenance system 100 according to the embodiment described above can be implemented by single computers, or each thereof can be implemented by a plurality of computers to which the respective parts (functions or the like) thereof are divided, and allocated. Further, it is also possible to implement the relay apparatuses 30, the transmission management system 50, the program provisioning system 90 and the maintenance system 100 using one or more computers by integrating the respective parts thereof. Further, the storage part 1000, the storage part 3000 and the storage part 5000 are to be provided in the network 2 to which the relay apparatuses 30, the transmission management system 50, the program provisioning system 90 and the maintenance system 100 can access.

When the program provisioning system 90 is implemented by a single computer, a program transmitted by the program provisioning system 90 can be transmitted in such a manner that the program is transmitted in a form of a plurality of divided modules from the program or is transmitted without being thus divided.

Further, when the program provisioning system 90 is implemented by a plurality of computers, a program can be transmitted from the respective computers in a state where the program is divided into a plurality of modules.

SUPPLEMENTARY OF THE EMBODIMENT

The present embodiment has been described for a case where the TV (or video) conference system is one example of a transmission system 1. However, the present invention is not limited thereto. The transmission system 1 can also be a telephone system such as an Internet Protocol (IP) telephony system, an Internet telephony system or the like.

Further, the transmission system 1 can be a communication system for cellar phones/portable phones (smart phones or the like). In this case, for example, the transmission terminals 10 correspond to cellular phones/portable phones. When the transmission terminal 10 is a cellular phone/portable phone, the transmission terminal includes the body of cellular phone/portable phone, display buttons provided on the body, a display part (touch panel) provided on the body, a microphone provided on the body, a speaker provided on the body and so forth. In this case, for example, the transmission terminal 10 is connected with the Internet through a cellular phone/portable phone telephone lines (including wireless communication covering wide areas such as mainly outdoor areas thanks to antenna power from base stations).

Figure 38:
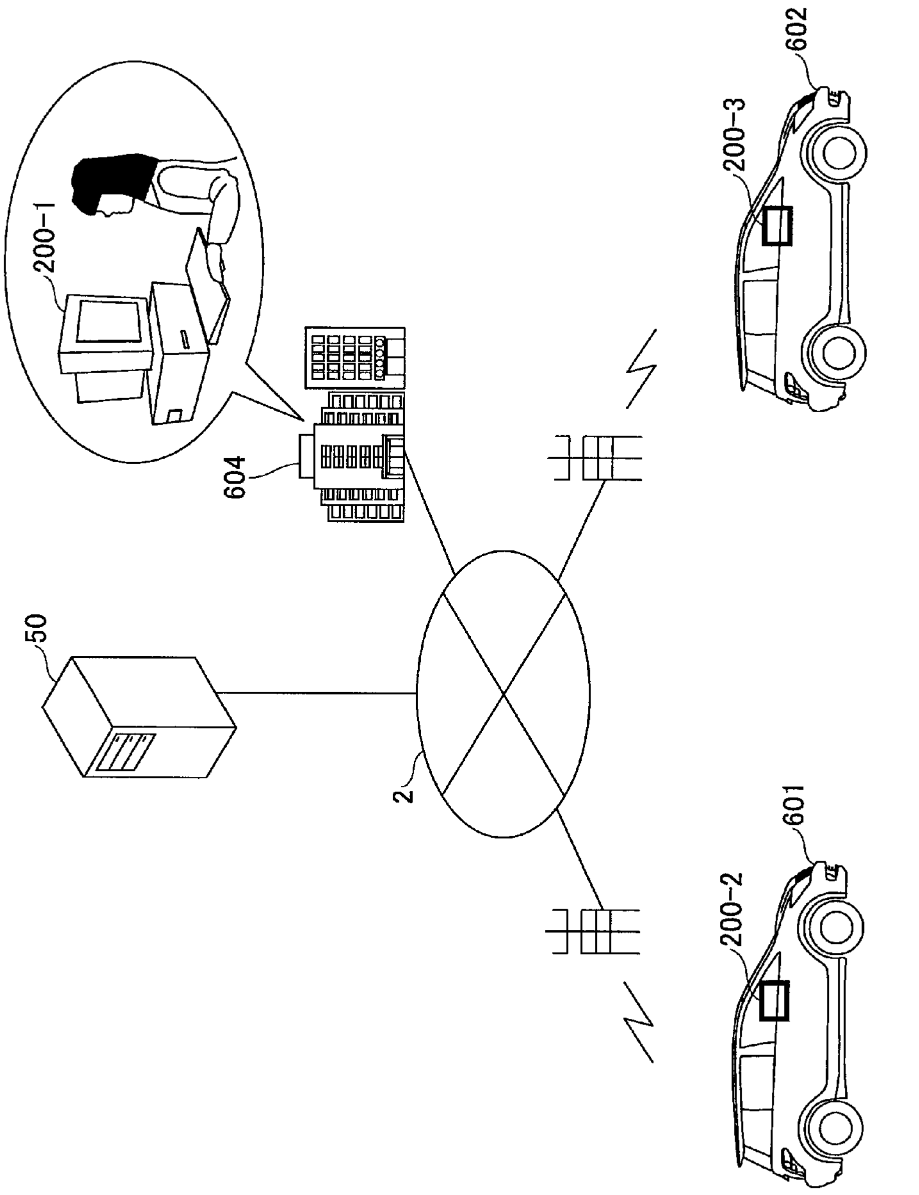
FIG. 38 shows one example of a system configuration for a case where the transmission terminal is applied to a car navigation apparatus.

Further, the transmission system 1 can be a system that includes car navigation apparatuses mounted in mobile bodies. FIG. 38 shows one example of a system configuration for a case where the transmission terminal 10 is applied to a car navigation apparatus 200. Hereinafter, when the car navigation apparatus 200 is distinguished, the reference numeral of the car navigation apparatus 200 is expressed as 200-*i* ("i" denotes a natural number).

In this case, one transmission terminal 10 corresponds to a car navigation apparatus 200-2 mounted in a vehicle 601. Another transmission terminal 10 corresponds to a management terminal 200-1 used by a communicator in a management center 604 or a car navigation apparatus 200-3 mounted in another vehicle 602. The management terminal 200-1, the car navigation apparatus 200-2 and the car navigation apparatus 200-3 are mutually connected via a network 2. Further, for the management terminal 200-1, the car navigation apparatus 200-2 and the car navigation apparatus 200-3, a session is established by a transmission management system 50.

Figure 39:
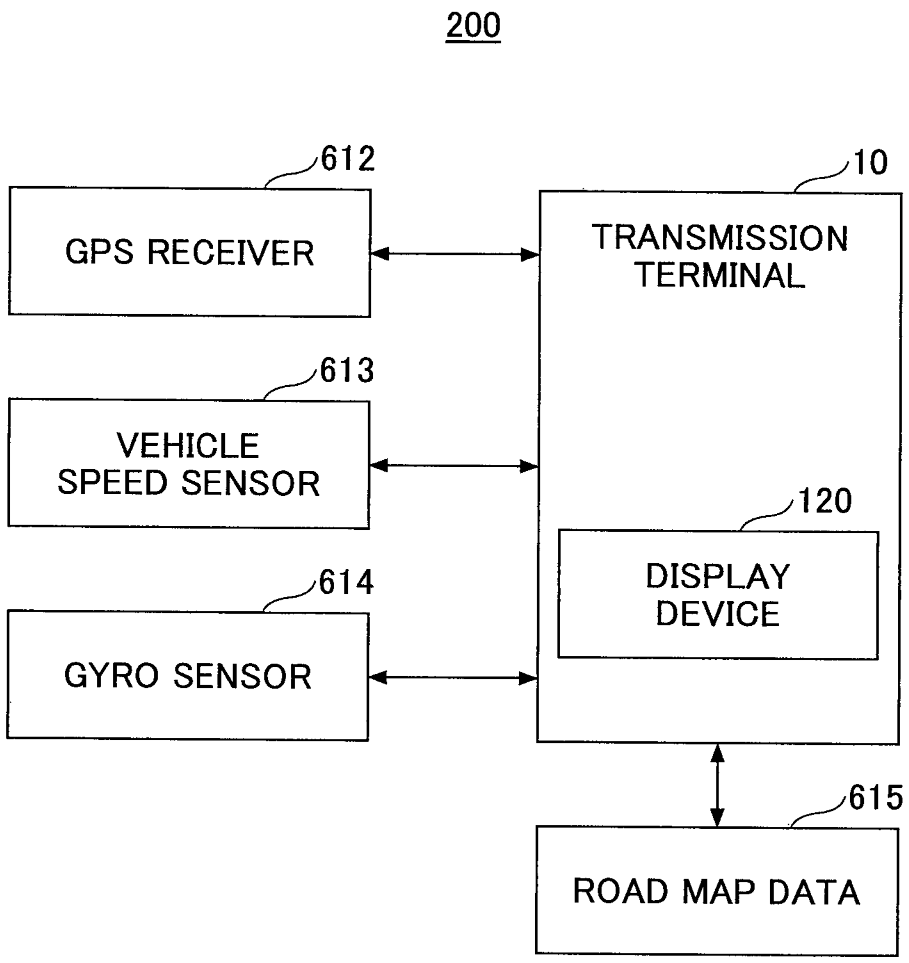
FIG. 39 shows one example of a configuration of the car navigation apparatus.

FIG. 39 shows one example of a configuration of the car navigation apparatus. The car navigation apparatus 200 has such a configuration that a GPS receiver 612, a vehicle speed sensor 613, a gyro sensor 614 and road map data 615 are connected to the transmission terminal 10 described above. Further, the transmission terminal 10 includes an integral display device 120. Note that the display device 120 can be connected with the transmission terminal 10 in a wired or wireless manner, or is detachably mounted on the transmission terminal 10.

The transmission terminal 10 executes a computer-executable program and provides functions as the car navigation apparatus 200. The GPS receiver 612 captures GPS satellites to output the coordinate of the current position. The vehicle speed sensor 613 is a sensor to detect the speed (the rotation speeds of the vehicle wheels) of the vehicle 601 or 602. The gyro sensor 614 is a sensor to detect an angular velocity. By integrating the angular velocity, it is possible to detect the direction in which the vehicle moves.

The load map data 615 is data expressing roads by combinations of nodes and links and can be downloaded from the outside or previously held by the vehicle. A road map is displayed on the display device 120.

Note that, it is possible that a PC can be connected with the transmission terminal 10 for sharing a screen page. Further, in addition to the configuration shown in FIG. 39, the car navigation apparatus 200 can have a tuner function for receiving radio broadcast and/or TV broadcast, an audio function for reproducing music, a function of cooperating with an on-vehicle camera such as a rear view camera or the like, a browser function for displaying Web sites, and so forth.

The transmission terminal 10 estimates the own vehicle position according to an autonomous navigation method of accumulating moving distances detected by the vehicle speed sensor 613 along the moving direction detected by the gyro sensor 614 from a start point of positional information detected by the GPS receiver 612. The own vehicle position is displayed by a vehicle mark or the like on the road map. Further, the transmission terminal 10 searches for a route to a destination and guides it to the driver. Thus, the transmission terminal 10 implements the functions as a car navigation apparatus.

The car navigation apparatus 200 is connected to the network 2 via the transmission terminal 10. For example, the car navigation apparatus 200 is connected using the cellular phone/portable phone with the network 2 through cellular phone/portable phone lines (including wireless communication covering wide areas such as outdoor areas mainly thanks to antenna power from base stations).

The transmission terminal 10 as the car navigation apparatus 200 displays a list of destination terminals including the other transmission terminals 10 connected with the network 2 on the display device 120. A destination terminal is selected from the list of destination terminals displayed on the display device 120. Then, when a session with the destination terminal is established, the transmission terminal 10 (or the car navigation apparatus 200) can transmit image data, sound data and so forth to the selected destination terminal or can receive the same from the selected destination terminal.

Further, because of the user operating the car navigation apparatus 200 or the transmission terminal 10, the transmission terminal 10 can take (or capture) display data such as a road map, a television video image and so forth. The transmission terminal 10 can transmit the display data to the other transmission terminal 10 connected via the network 2.

Further, as a result of the user selecting the management terminal 200-1 used by the communicator in the management center 604 from the list of destination terminals displayed on the display device 120, image data of the communicator is displayed on the display device 120 and a voice of the communicator is output from the speaker. Thereby, the user can have a conversation with the communicator like a case of using a video phone.

As described above, the transmission terminal 10 as the car navigation apparatus 200 mounted in the mobile body transmits and receives image data, sound data, display data and so forth as in the transmission terminal 10 in the video conference system. Therefore, the transmission system 1 according the present embodiment can be the system including the car navigation apparatuses 200 mounted in the mobile bodies.

Further, the present embodiment has been described where the transmission system 1 is used for a video conference. However, the present invention is not limited thereto. For example, the transmission system 1 can also be used for a meeting, a general conversation among family members or friends, or a submission of information unilaterally.

The transmission terminals, the programs, the image display methods and the transmission systems have been described in the embodiments. However, the present invention is not limited to the specifically disclosed embodiment and variations and modifications may be made without departing from the scope of the present invention.

The present application is based on and claims the benefit of priority of Japanese Priority Application No. 2013-136213, dated Jun. 28, 2013 and Japanese Priority Application No. 2014-078007, dated Apr. 4, 2014, the entire contents of which are hereby incorporated herein by reference.

PRIOR ART REFERENCE

Patent Reference No. 1: Japanese Laid-Open Patent Application No. 09-238318

The invention claimed is:

1. A transmission terminal for connection with other transmission terminals via relay apparatuses, comprising:

display image determination processing circuitry configured to, for a case where a change of a layout in a display screen page generated when a conference is started is detected, determine sets of image data or display data to be displayed;

base name acquisition processing circuitry configured to acquire, from a base name management table where base names are associated with corresponding terminal information, base names associated with terminal information of the transmission terminals corresponding to the sets of the image data or the display data that have been determined to be displayed;

arrangement information management table updating processing circuitry configured to determine areas for which sets of the image data or the display data that have been determined to be displayed are displayed, and to update an arrangement information management table where transmission data information that indicates whether each of the sets of the image data or the display data that have been determined to be displayed is image data or display data, the terminal information and the base names are associated with the areas;

data type determination processing circuitry configured to determine whether each of the sets of the image data or the display data that have been determined to be displayed corresponding to the areas registered with the arrangement information management table is display data, based on the transmission data information;

base name synthesizing processing circuitry configured to read the base names that include base names associated with the terminal information or the transmission data information transmitted together with the sets of the image data or the display data from the relay apparatuses, and to synthesize the base names with the sets of the image data or the display data that have been determined to be displayed corresponding to the areas; and image display control processing circuitry configured to, based on the arrangement information management table, determine the areas of the sets of the image data or the display data that have been determined to be displayed with which the base names are synthesized, and arrange the areas according to the change of the layout to display the display screen page, wherein:

sets of image data are sets of data that indicate images photographed by transmission terminals, and sets of display data are sets of material data that are displayed on external displays, and the image display control processing circuitry is further configured to synthesize base names with a plurality of sets of the image data or the display data that have been determined to be displayed for a case where the plurality of sets of image data or display data are displayed, and not to synthesize a base name with a single set of display data that has been determined to be displayed for a case where only the single set of display data is displayed.

2. The transmission terminal according to claim 1, wherein:

as the terminal information, terminal information of the transmission terminal transmitting the image data or the display data is registered;

as the transmission data information, identification information of data transmitted by the relay apparatus including the type of the image data or the display data is registered; and as the area, identification of the area is registered.

3. A method of communicating between a transmission terminal and other transmission terminals via relay apparatuses, comprising:

determining sets of image data or display data to be displayed, for a case where a change of a layout in a display screen page generated when a conference is started is detected;

acquiring, from a base name management table where base names are associated with corresponding terminal information, base names associated with terminal information of the transmission terminals corresponding to the sets of the image data or the display data that have been determined to be displayed;

determining areas for which sets of the image data or the display data that have been determined to be displayed are displayed, and updating an arrangement information management table where transmission data information that indicates whether each of the sets of the image data or the display data that have been determined to be displayed is image data or display data, the terminal information and the base names are associated with the areas;

determining whether each of the sets of the image data or the display data that have been determined to be displayed corresponding to the areas registered with the arrangement information management table is display data, based on the transmission data information;

reading the base names that include base names associated with the terminal information or the transmission data information transmitted together with the sets of the image data or the display data from the relay apparatuses, and synthesizing the base names with the sets of the image data or the display data that have been determined to be displayed corresponding to the areas; and determining the areas of the sets of the image data or the display data that have been determined to be displayed with which the names are synthesized, and arranging the areas according to the change of the layout to display the display screen page, based on the arrangement information management table, wherein:

sets of image data are sets of data that indicate images photographed by transmission terminals, and sets of display data are sets of material data that are displayed on external displays, and the determining the areas of the sets further includes synthesizing base names with a plurality of sets of the image data or the display data that have been determined to be displayed for a case where the plurality of sets of image data or display data are displayed, and not to synthesize a base name with a single set of display data that has been determined to be displayed for a case where only the single set of display data is displayed.

4. The method according to claim 3, wherein:

as the terminal information, terminal information of the transmission terminal transmitting the image data or the display data is registered;

as the transmission data information, identification information of data transmitted by the relay apparatus including the type of the image data or the display data is registered; and as the area, identification of the area is registered.

* * * * *